(12) United States Patent
Kim et al.

(10) Patent No.: US 10,321,439 B2
(45) Date of Patent: Jun. 11, 2019

(54) METHOD FOR DEVICE-TO-DEVICE COMMUNICATION IN WIRELESS COMMUNICATION SYSTEM AND DEVICE THEREFOR

(71) Applicant: LG ELECTRONICS INC., Seoul (KR)

(72) Inventors: Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 15/501,431

(22) PCT Filed: Aug. 3, 2015

(86) PCT No.: PCT/KR2015/008112
§ 371 (c)(1),
(2) Date: Feb. 2, 2017

(87) PCT Pub. No.: WO2016/021902
PCT Pub. Date: Feb. 11, 2016

(65) Prior Publication Data
US 2017/0230956 A1    Aug. 10, 2017

Related U.S. Application Data

(60) Provisional application No. 62/032,620, filed on Aug. 3, 2014.

(51) Int. Cl.
*H04L 5/00* (2006.01)
*H04B 1/713* (2011.01)
(Continued)

(52) U.S. Cl.
CPC ........ *H04W 72/0406* (2013.01); *H04B 1/713* (2013.01); *H04L 5/00* (2013.01);
(Continued)

(58) Field of Classification Search
CPC . H04W 72/0406; H04B 1/713; H04B 1/7136; H04B 1/7143; H04B 2001/71367;
(Continued)

(56) References Cited

U.S. PATENT DOCUMENTS

| | | | |
|---|---|---|---|
| 2010/0111139 A1* | 5/2010 | Arnott | H04B 1/713 375/133 |
| 2012/0082125 A1 | 4/2012 | Huang | |
| 2015/0271846 A1* | 9/2015 | Kowalski | H04W 72/14 370/329 |

FOREIGN PATENT DOCUMENTS

| KR | 20130065002 | 6/2013 |
|---|---|---|
| KR | 20140017563 | 2/2014 |

OTHER PUBLICATIONS

PCT International Application No. PCT/KR2015/008112, International Search Report dated Dec. 17, 2015, 2 pages.
(Continued)

*Primary Examiner* — Ian N Moore
*Assistant Examiner* — Brian T Le
(74) *Attorney, Agent, or Firm* — Lee, Hong, Degerman, Kang & Waimey

(57) ABSTRACT

Disclosed are a method for device-to-device (D2D) communication in a wireless communication system and a device therefor. Particularly, the method for performing D2D communication in a wireless communication system comprises the steps of: receiving, by a first terminal from a base station, downlink control information including resource allocation information for D2D transmission; transmitting, by the first terminal to a second terminal, D2D control information on a physical sidelink control channel (PSCCH) on the basis of the resource allocation information for the D2D transmission; and transmitting, by the first terminal to the second terminal, D2D data on a physical sidelink shared channel (PSSCH) on the basis of the
(Continued)

resource allocation information for the D2D transmission, wherein frequency hopping can occur between a resource of the PSCCH for a first transmission of the D2D control information and a resource of the PSCCH for a second transmission of the D2D control information.

20 Claims, 60 Drawing Sheets

(51) Int. Cl.
  *H04W 28/20*  (2009.01)
  *H04W 72/04*  (2009.01)
  *H04W 76/14*  (2018.01)
(52) U.S. Cl.
  CPC ....... *H04W 72/0453* (2013.01); *H04W 76/14* (2018.02); *H04W 28/20* (2013.01)
(58) Field of Classification Search
  CPC ........... H04B 2001/71365; H04B 2001/71362; H04B 2201/713
  See application file for complete search history.

(56) References Cited

OTHER PUBLICATIONS

Ericsson, "On Scheduling Assignments and Receiver Behaviour," R1-141391, 3GPP TSG-RAN WG1 Meeting #76bis, Apr. 2014, 6 pages.
Alcatel-Lucent Shanghai Bell et al, "Design of Scheduling Assignment", R1-142050, 3GPP TSG RAN WG1 Meeting #77, May 2014, 4 pages.
Korean Intellectual Property Office Application No. 10-2017-7003558, Office Action dated Aug. 28, 2018, 7 pages.
Ericsson, "On resource allocation for D2D communication", 3GPP TSG RAN WG1 Meeting #76bis, R1-141390, Apr. 2014, 6 pages.
QUALCOMM, "eNB resource allocation for D2D broadcast communication", 3GPP TSG RAN WG1 Meeting #76bis, R1-141451, Apr. 2014, 6 pages.
Korean Intellectual Property Office Application No. 10-2017-7003558, Notice of Allowance dated Feb. 26, 2019, 3 pages.
Cea, et al., "D2D physical channels and signals", 3GPP TSG RAN WG1 Meeting #77, R1-142295, May 2014, 5 pages.
Ericsson, "D2D Physical Channels Design", 3GPP TSG RAN WG1 Meeting #77, R1-142398, May 2014, 10 pages.
Alcatel-Lucent, et al., "Design of Scheduling Assignment", 3GPP TSG RAN WG1 Meeting #77, R1-142050, May 2014, 4 pages.

* cited by examiner

[FIG. 1]
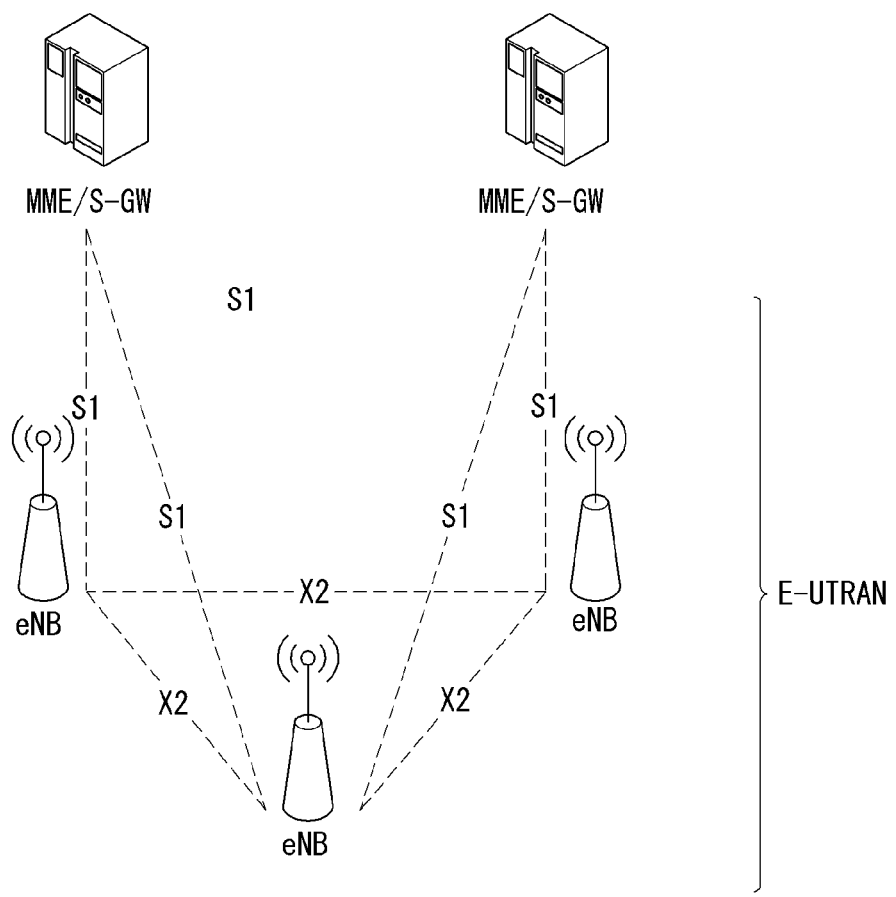

[FIG. 2]
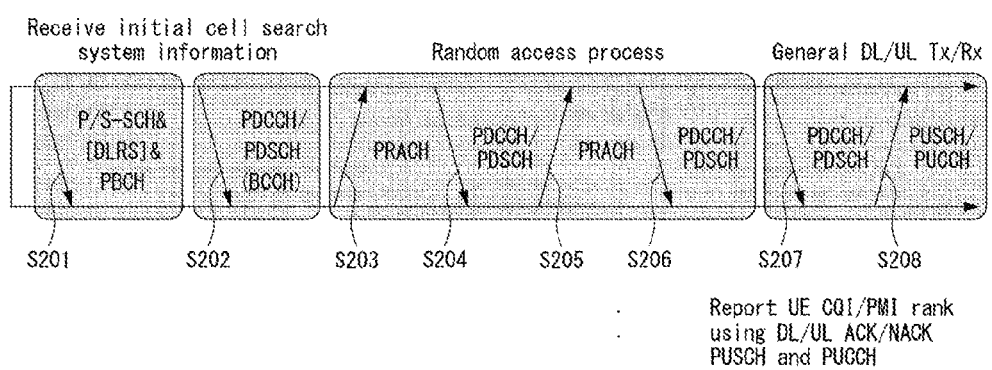

[FIG. 3]
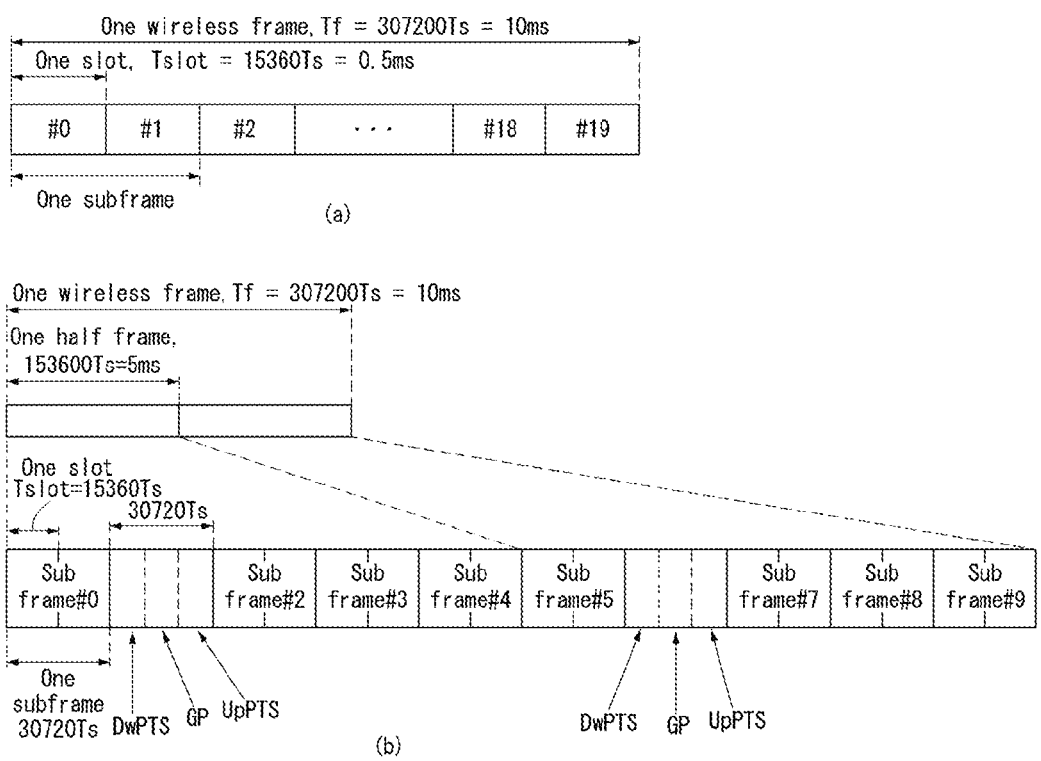

[FIG. 4]
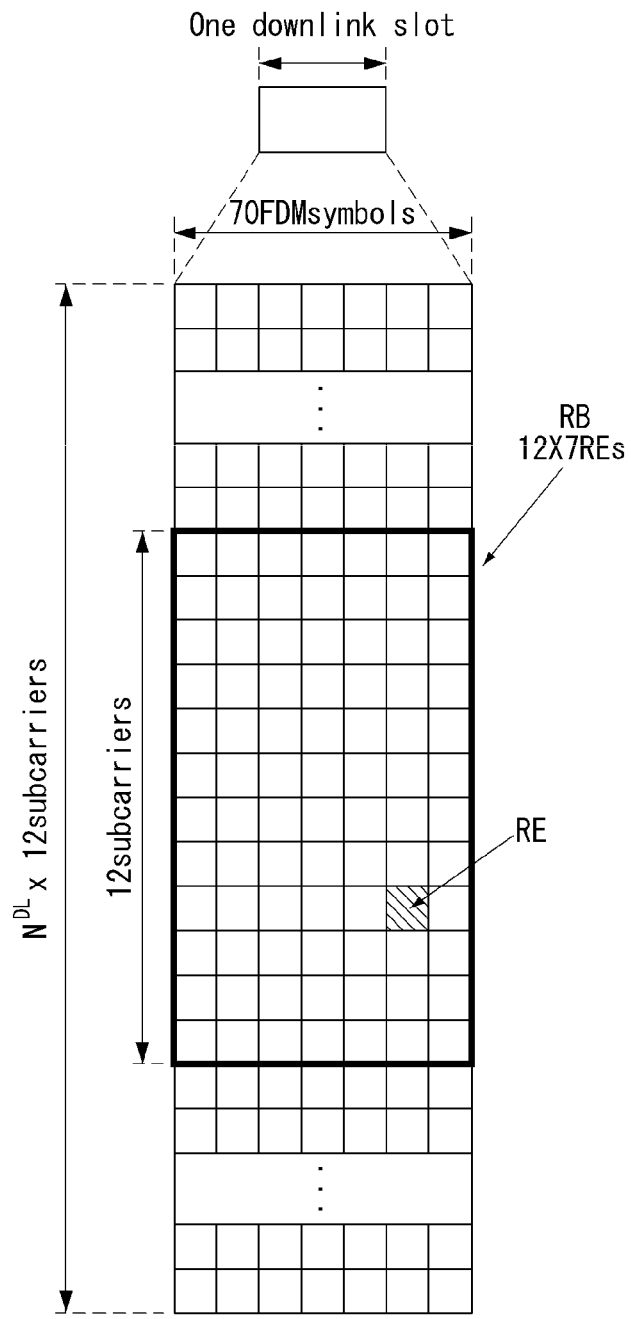

[FIG. 5]
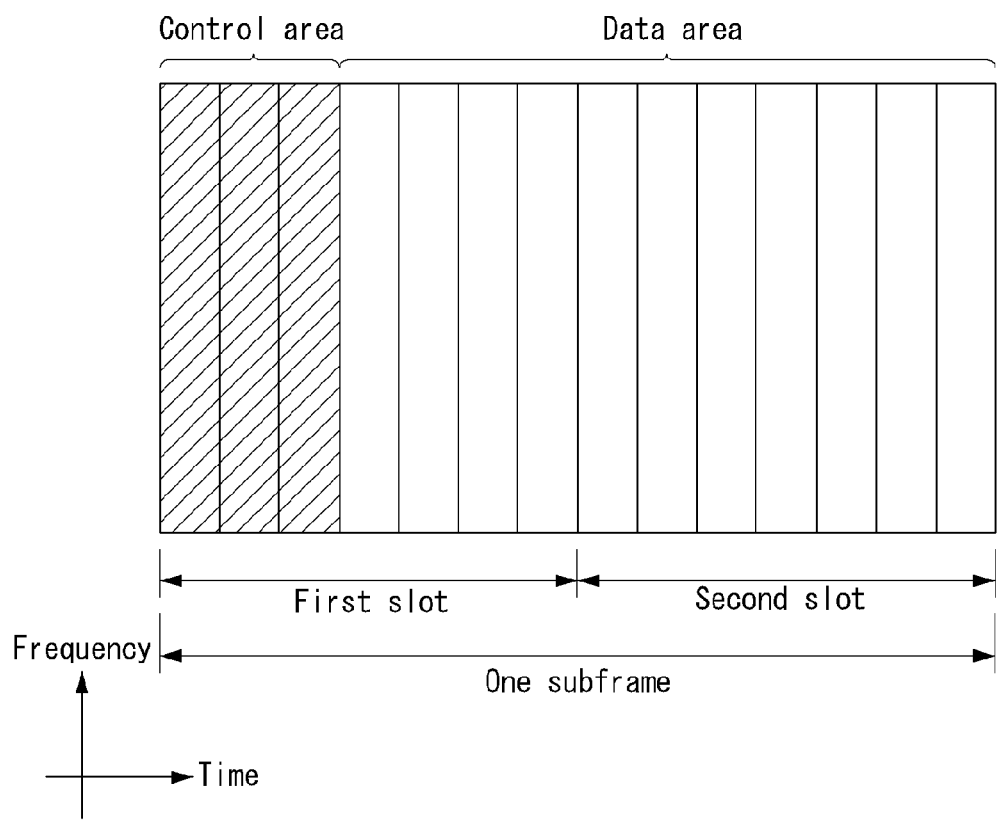

[FIG. 6]
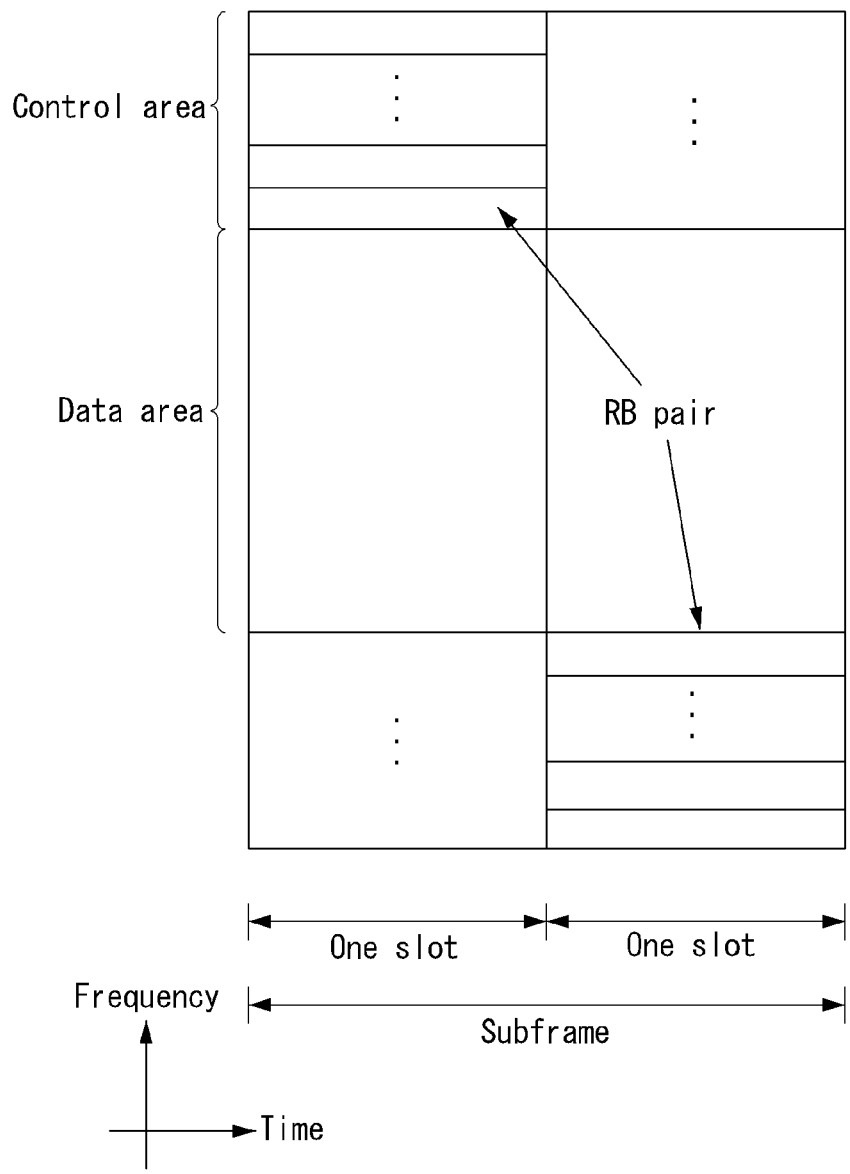

【FIG. 7】

| CIF (3) | 0/1A | FH | Resource block assignment | MCS/RV (5) | NDI | TPC(2) | DM RS CS(3) | DAI(2) | CQI req. | SRS | RAT |

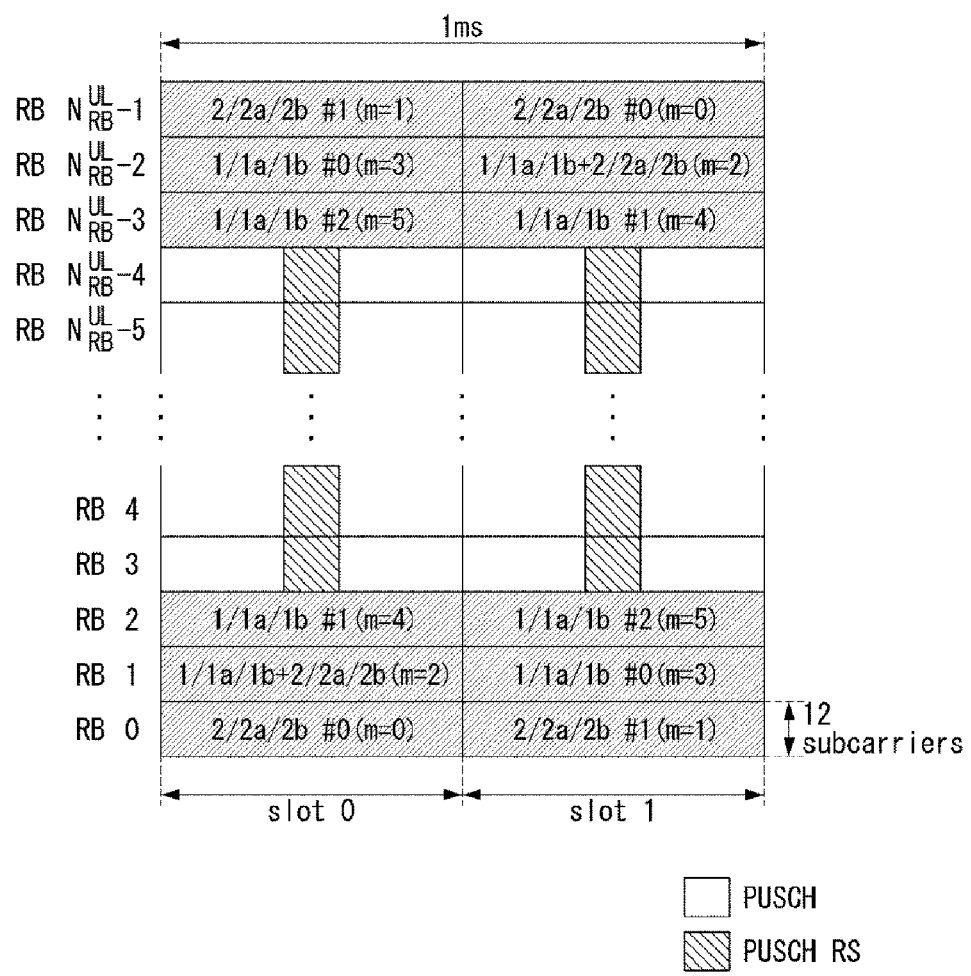
[FIG. 8]

[FIG. 9]
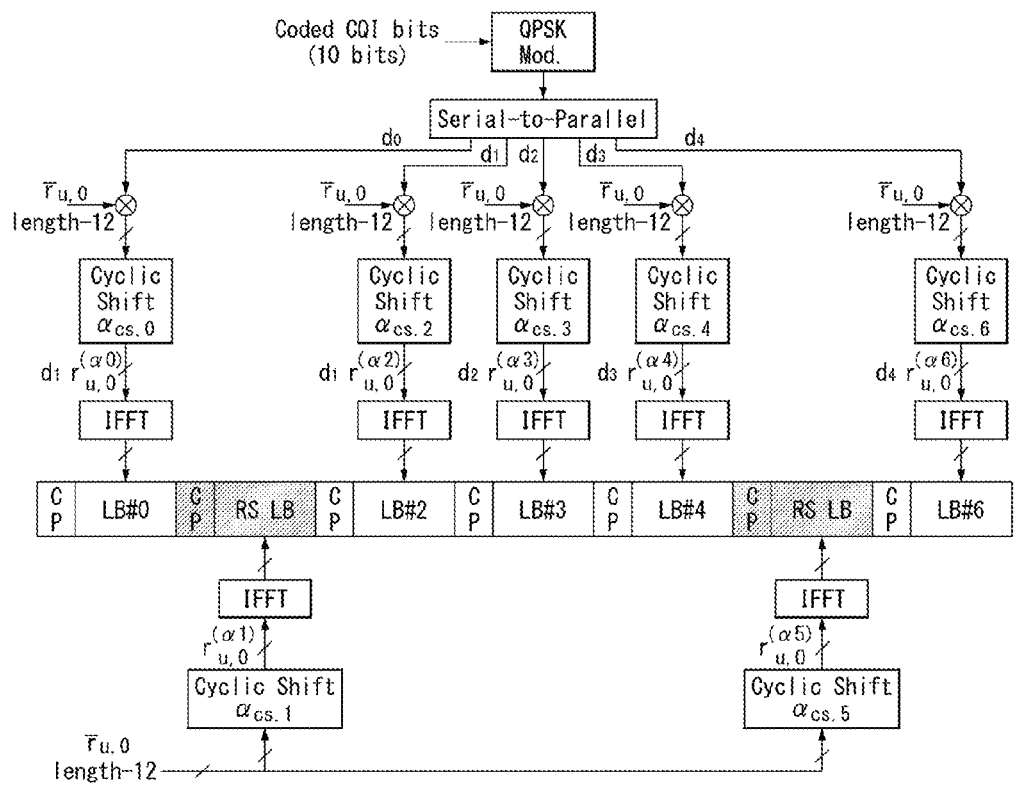

[FIG. 10]
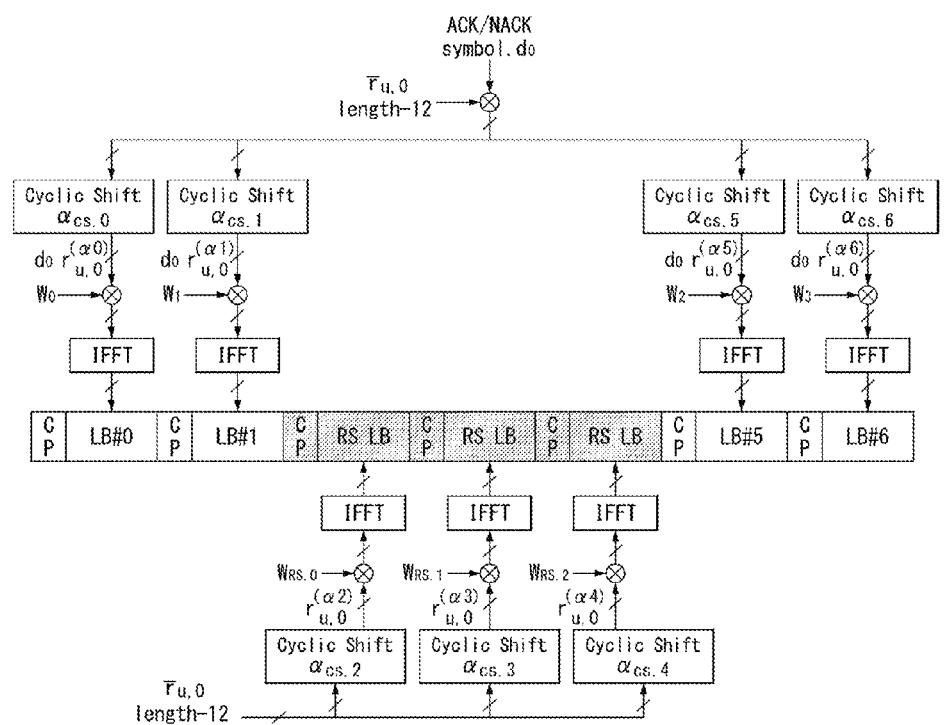

[FIG. 11]
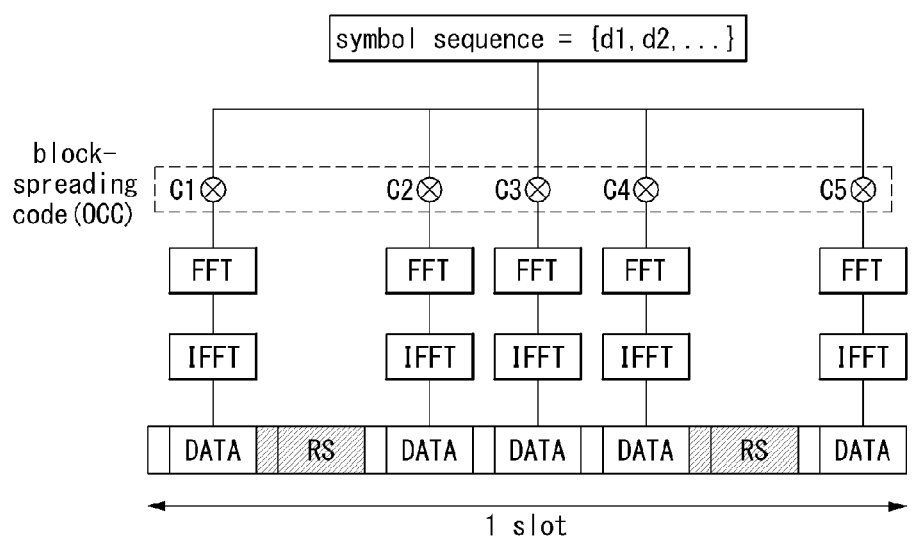

[FIG. 12]
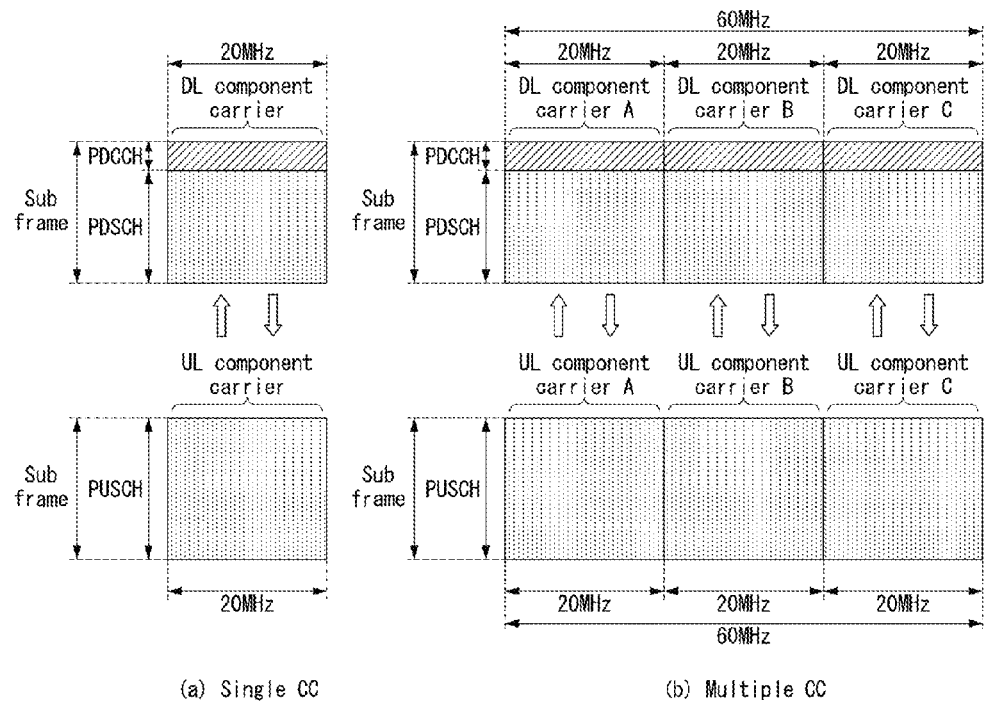
(a) Single CC
(b) Multiple CC

[FIG. 13]
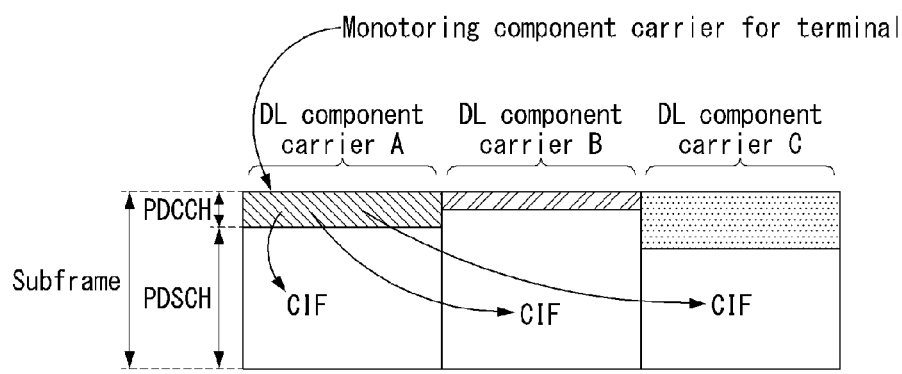
[FIG. 14]
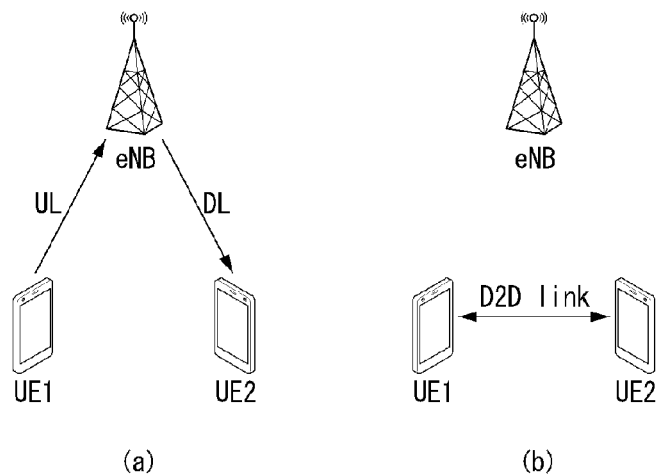
(a)            (b)

【FIG. 15】
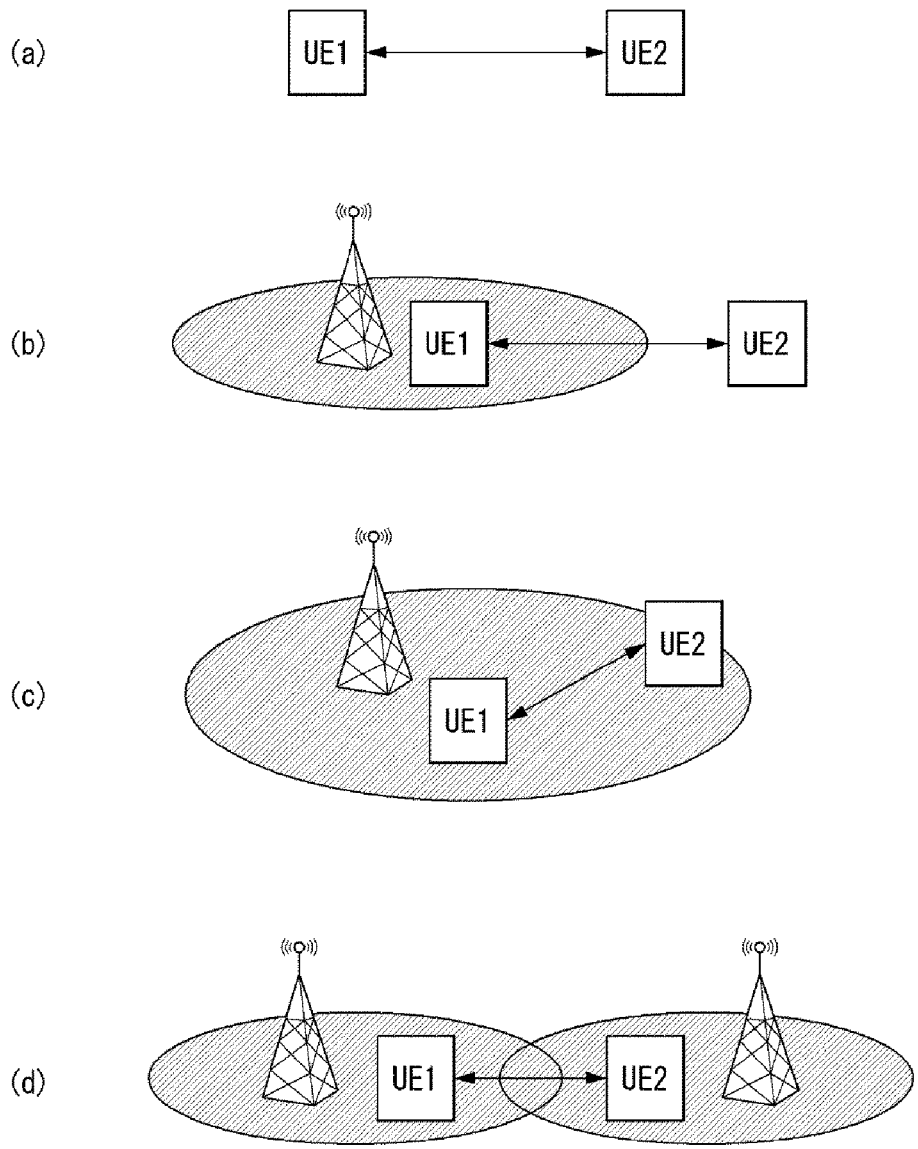

[FIG. 16]
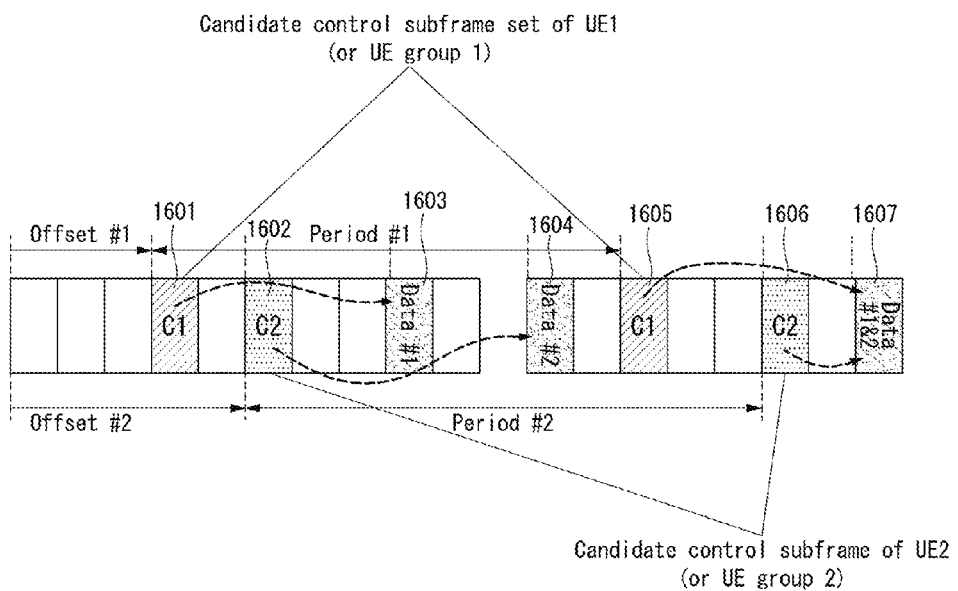

[FIG. 17]
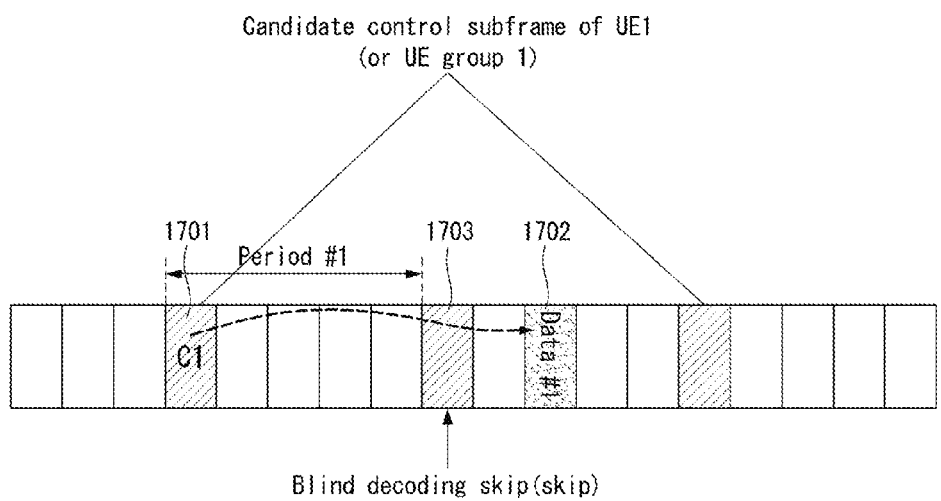

[FIG. 18]
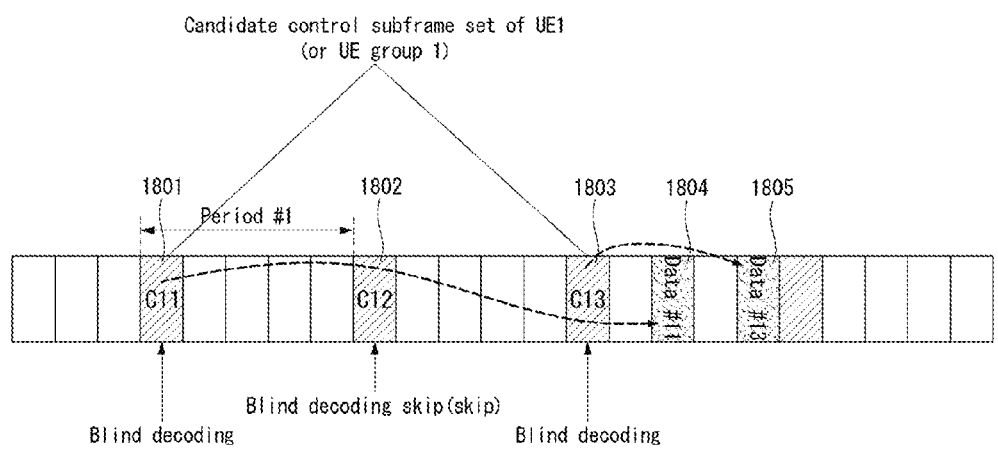

[FIG. 19]
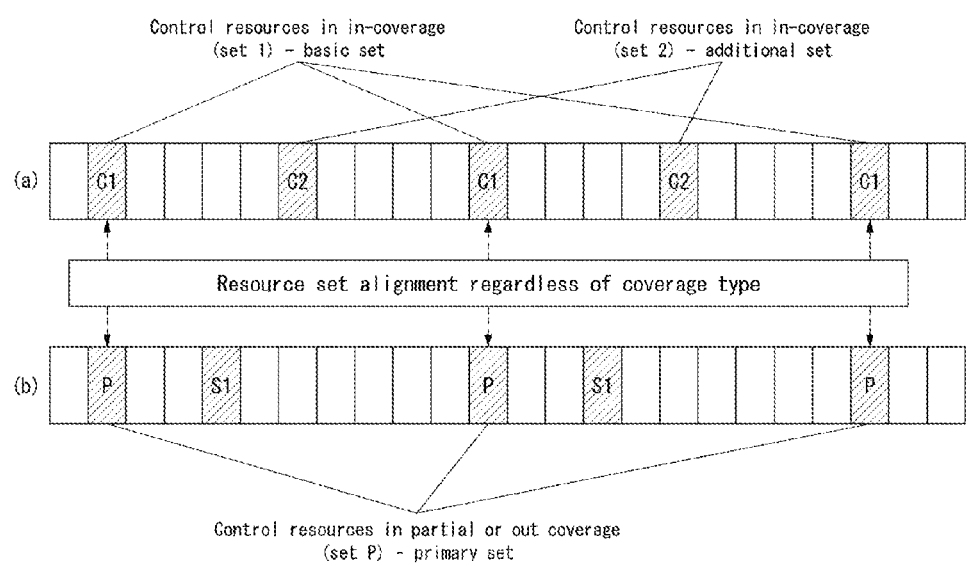

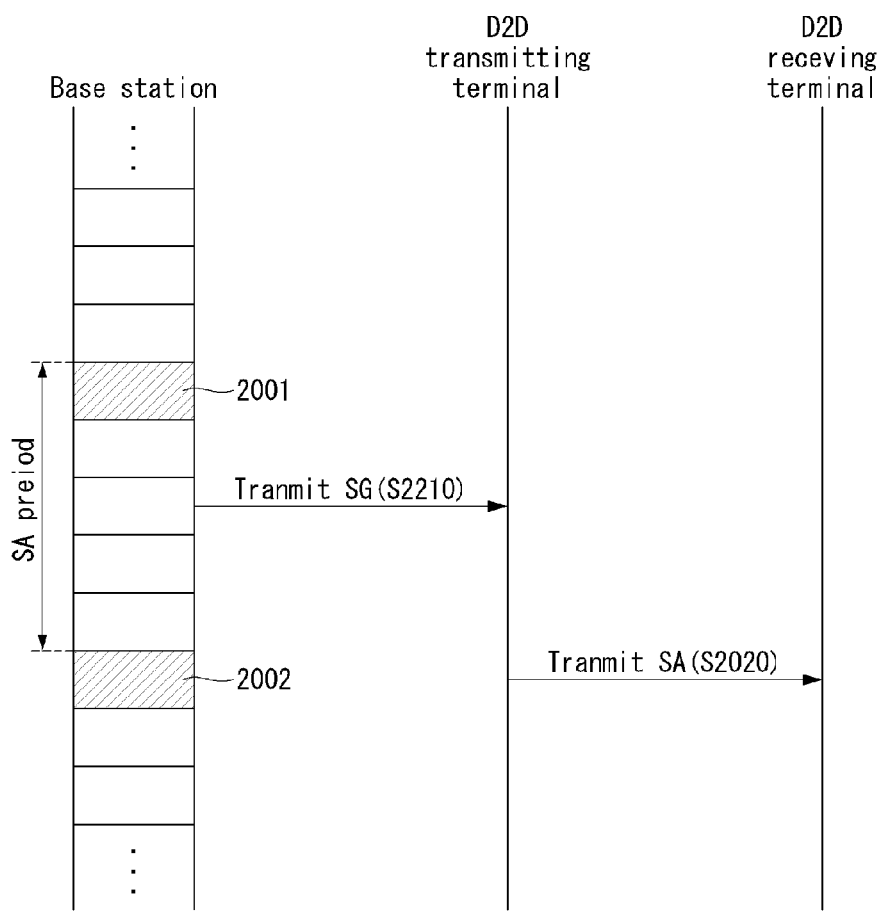
[FIG. 20]

[FIG. 21]
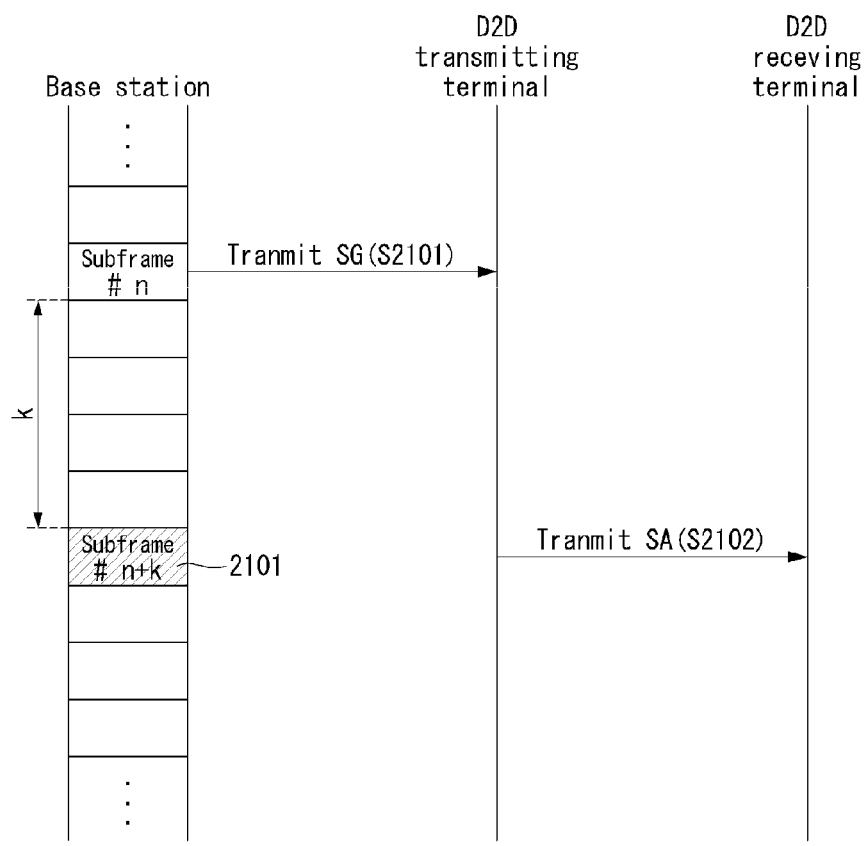

[FIG. 22]
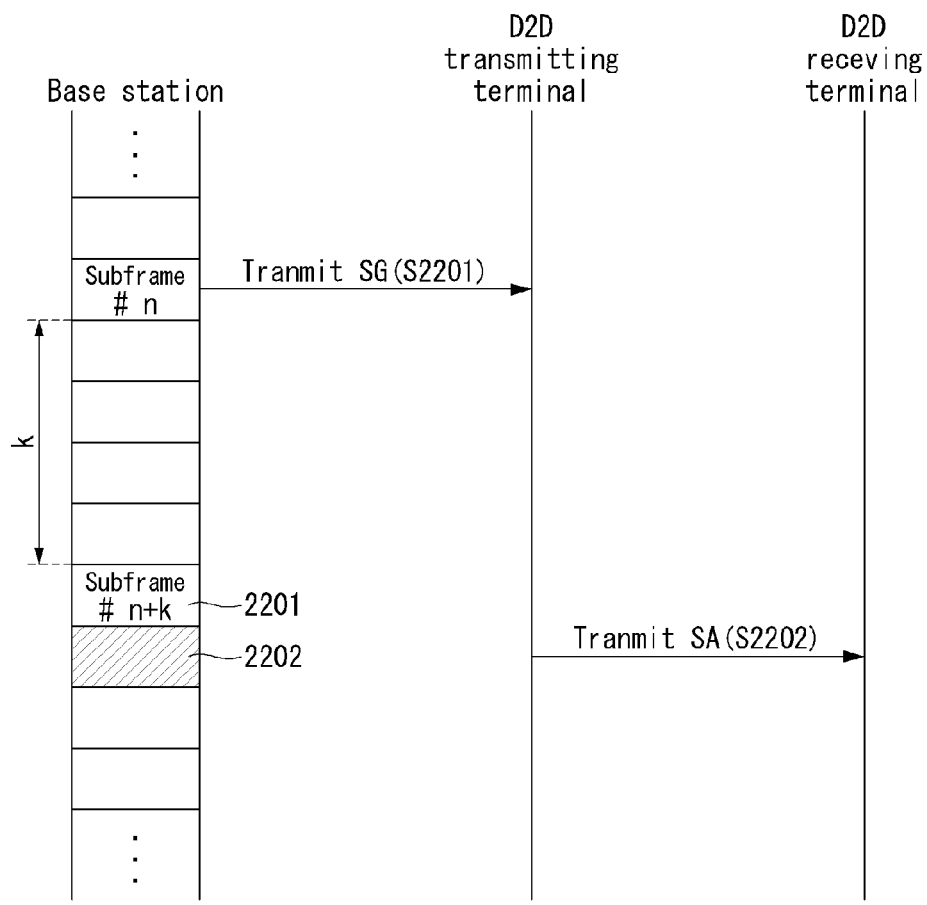

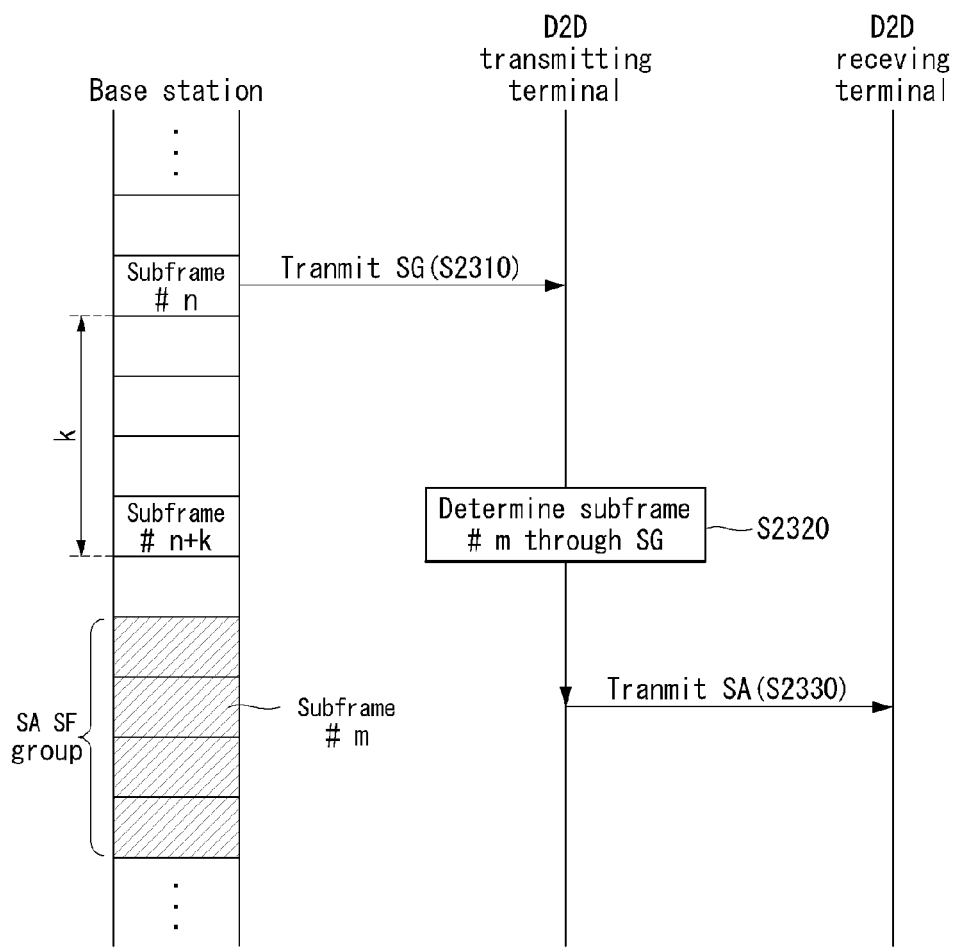
[FIG. 23]

[FIG. 24]
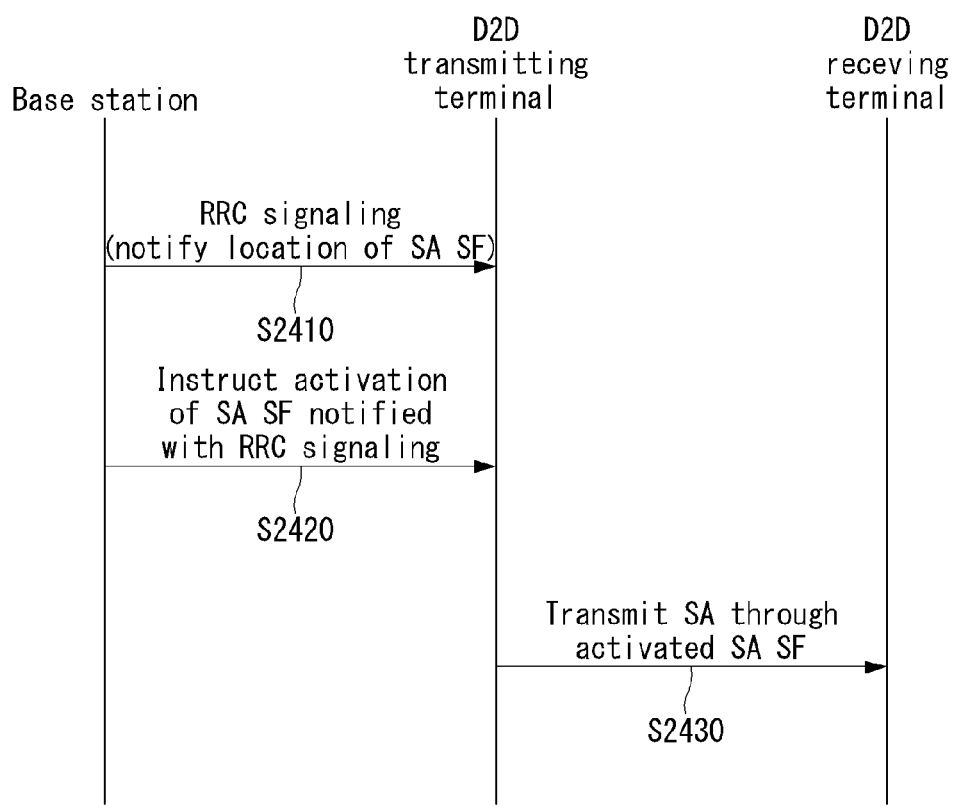

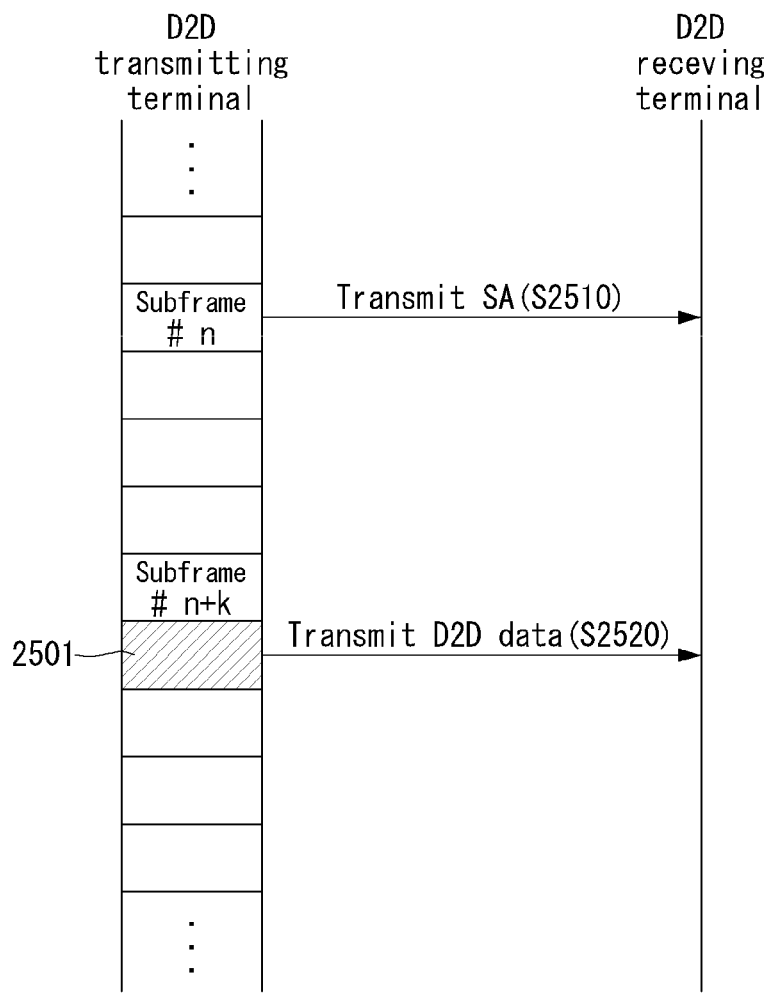
[FIG. 25]

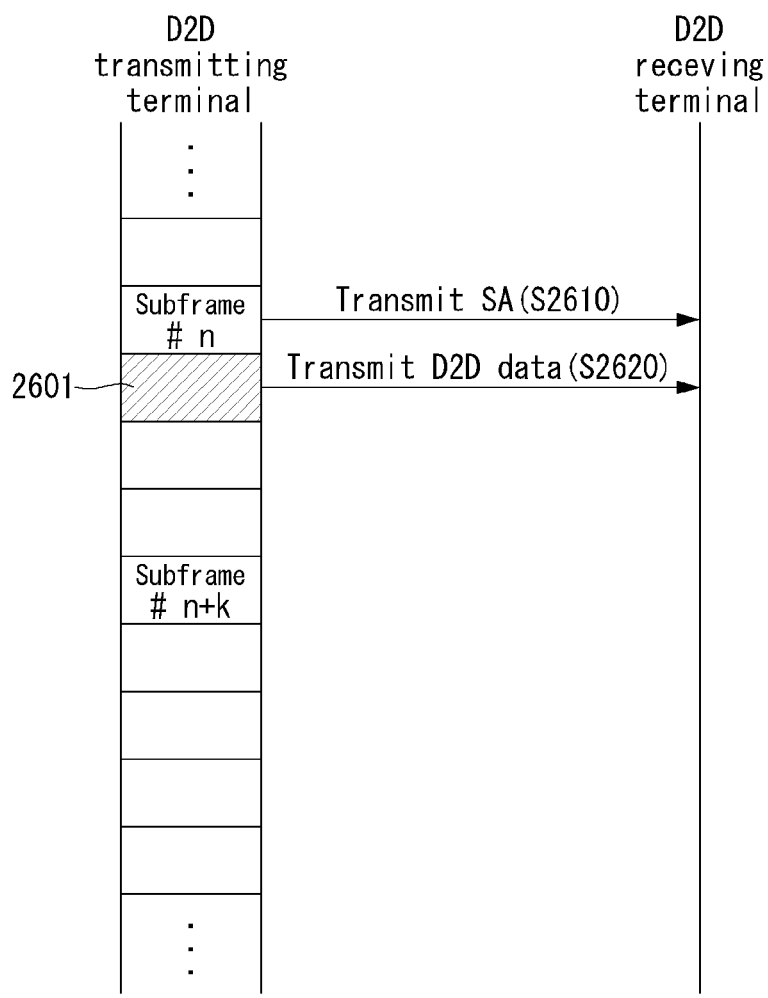

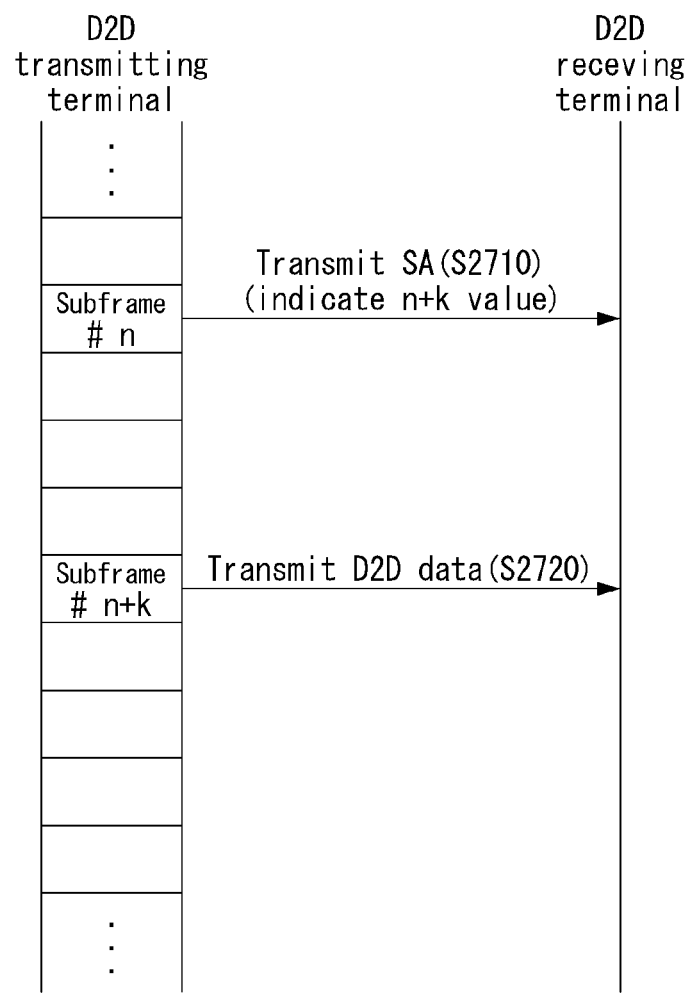

[FIG. 28]
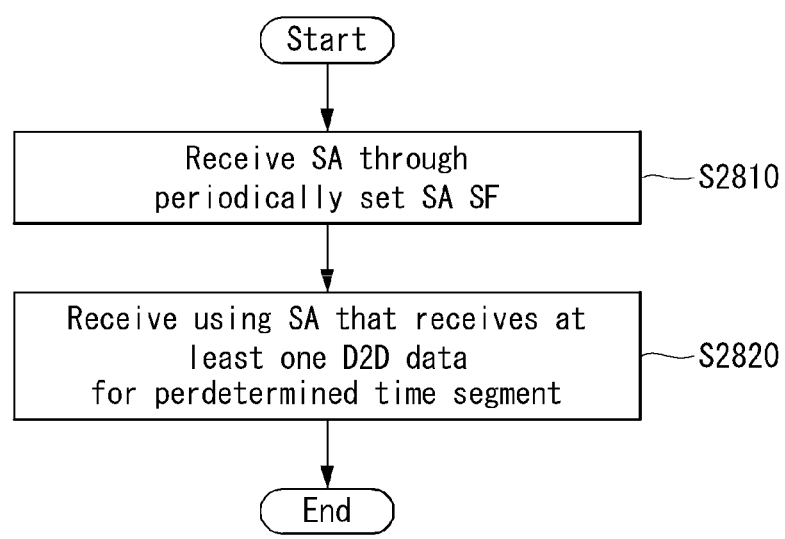

[FIG. 29]
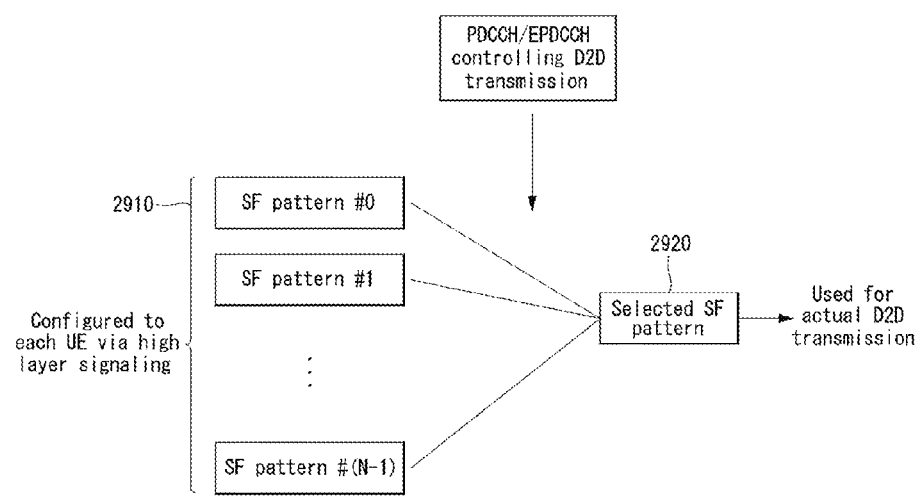

[FIG. 30]
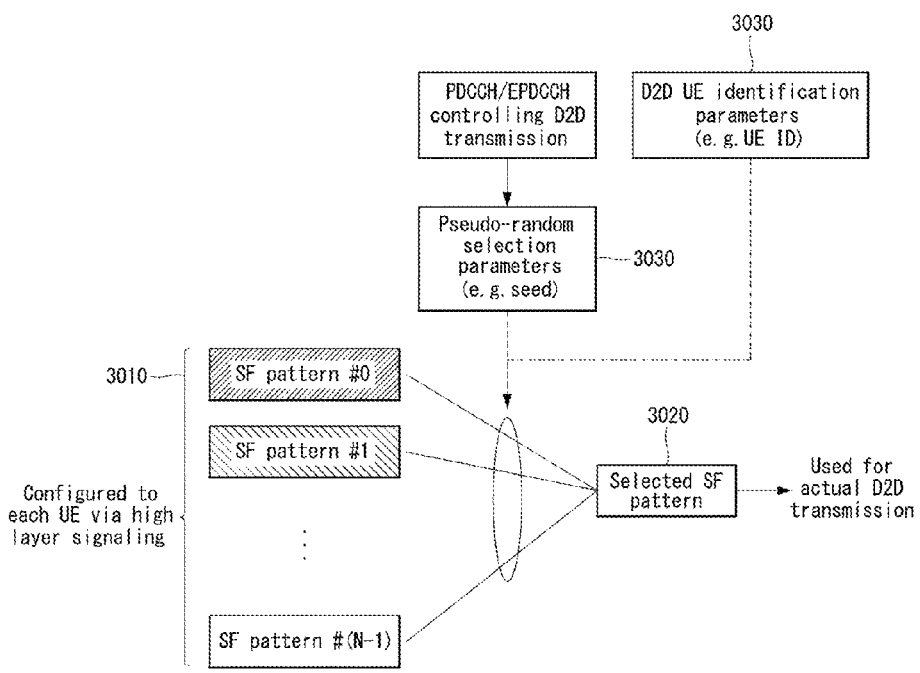

【FIG. 31】
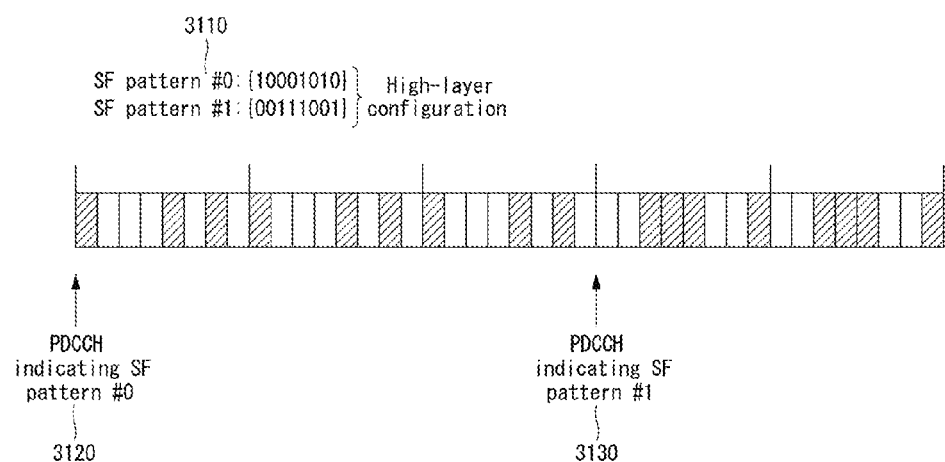

[FIG. 32]
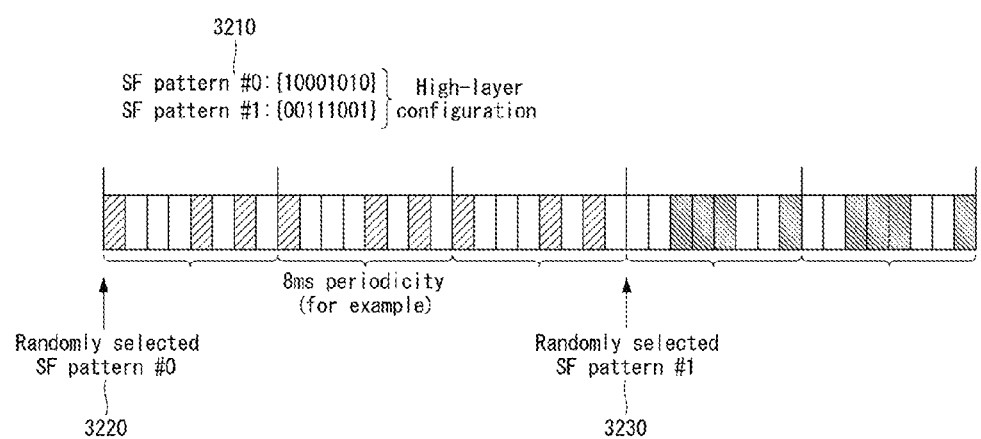

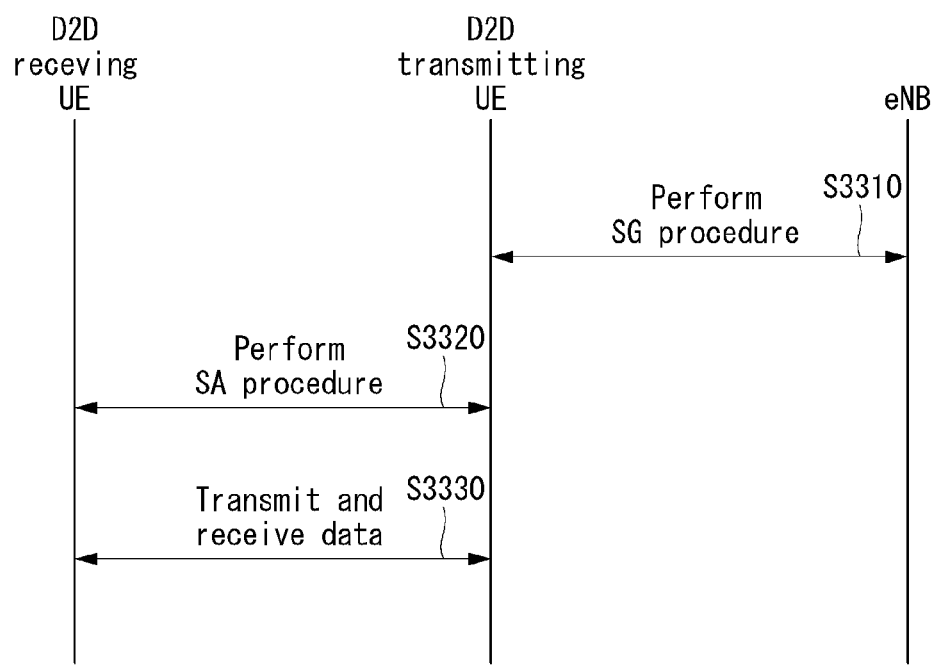
[FIG. 33]

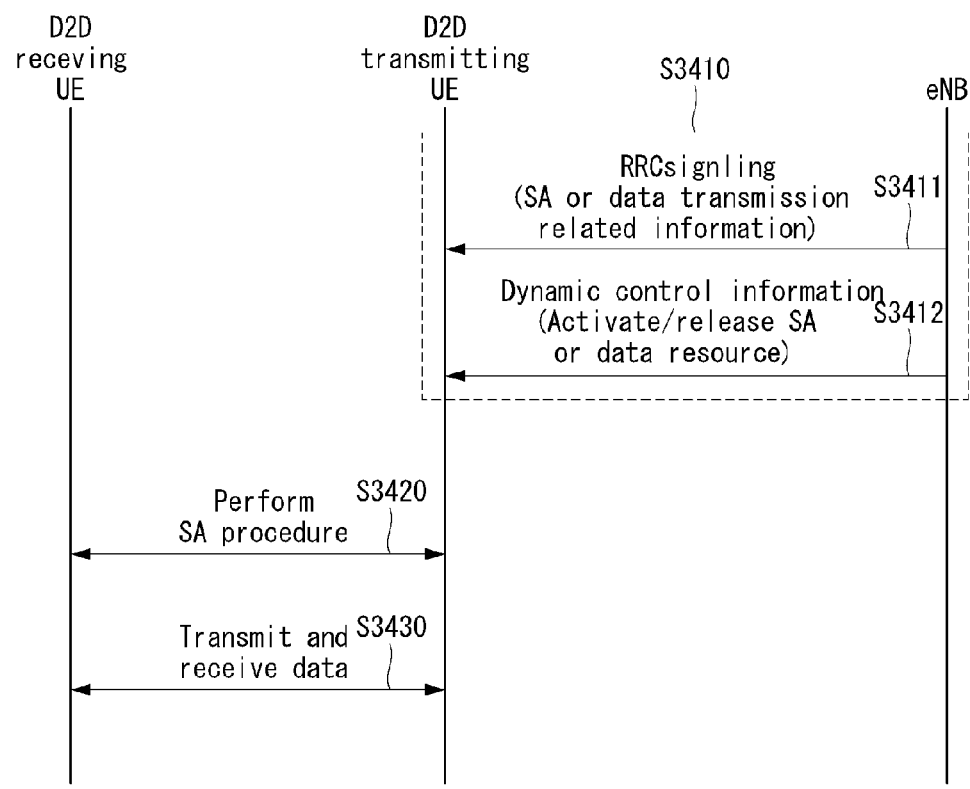

[FIG. 35]
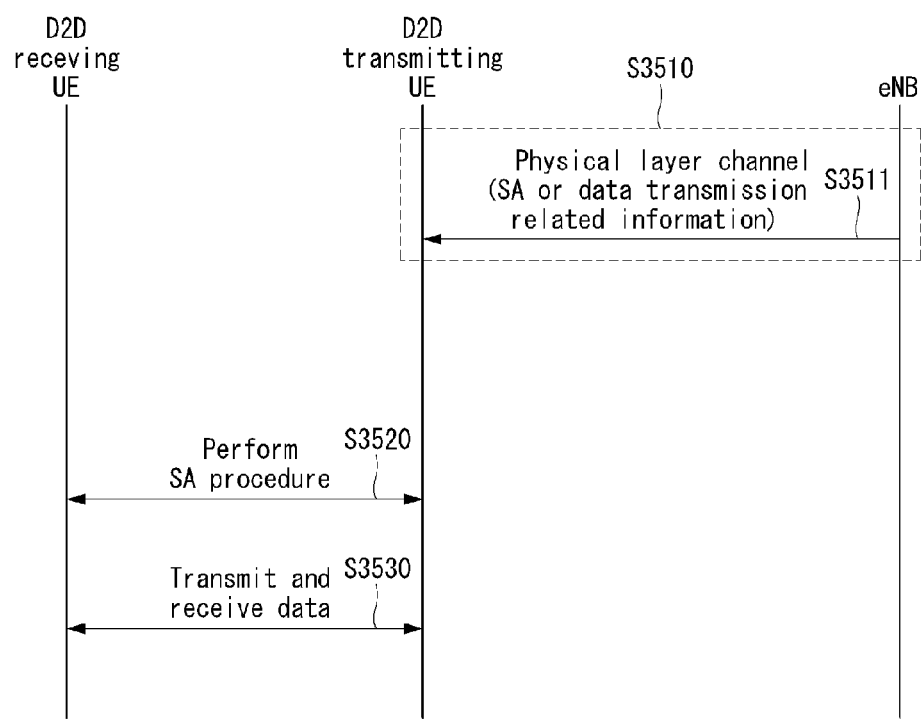

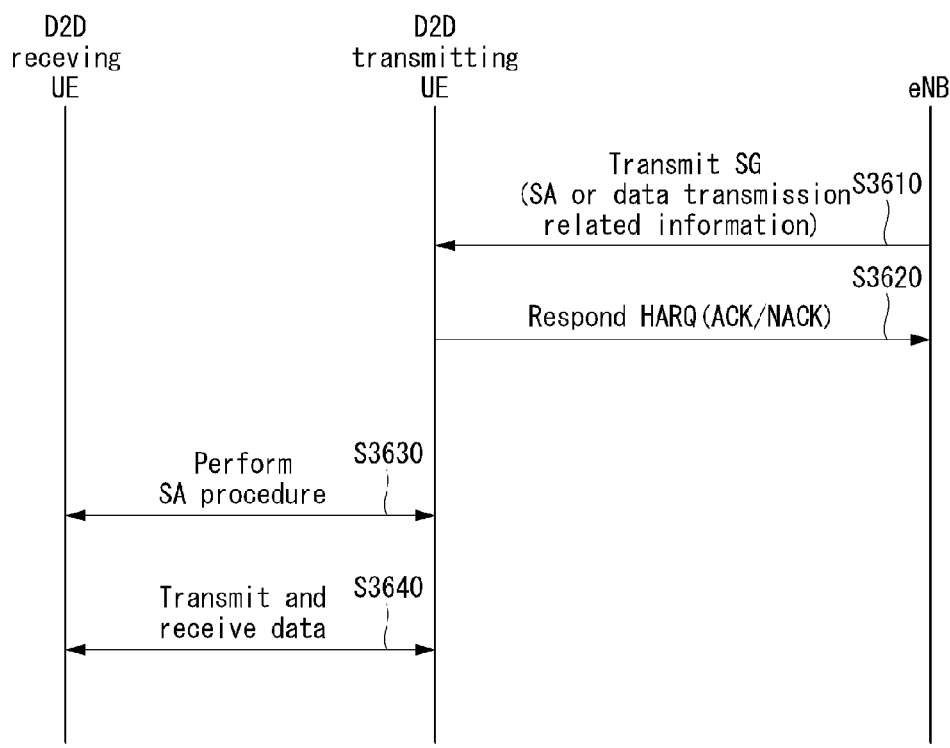
[FIG. 36]

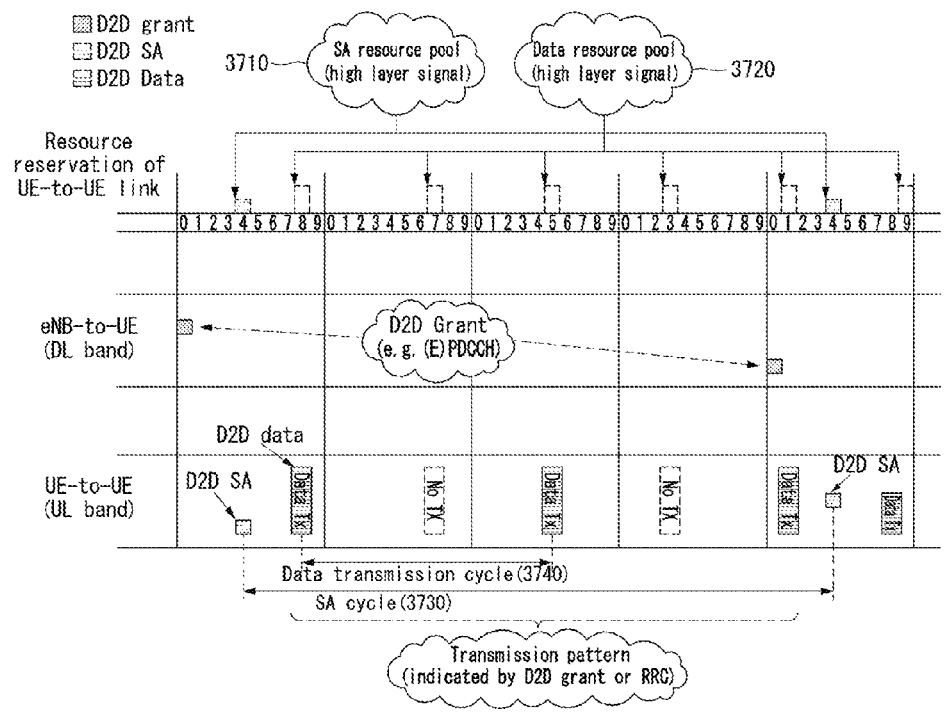
[FIG. 37]

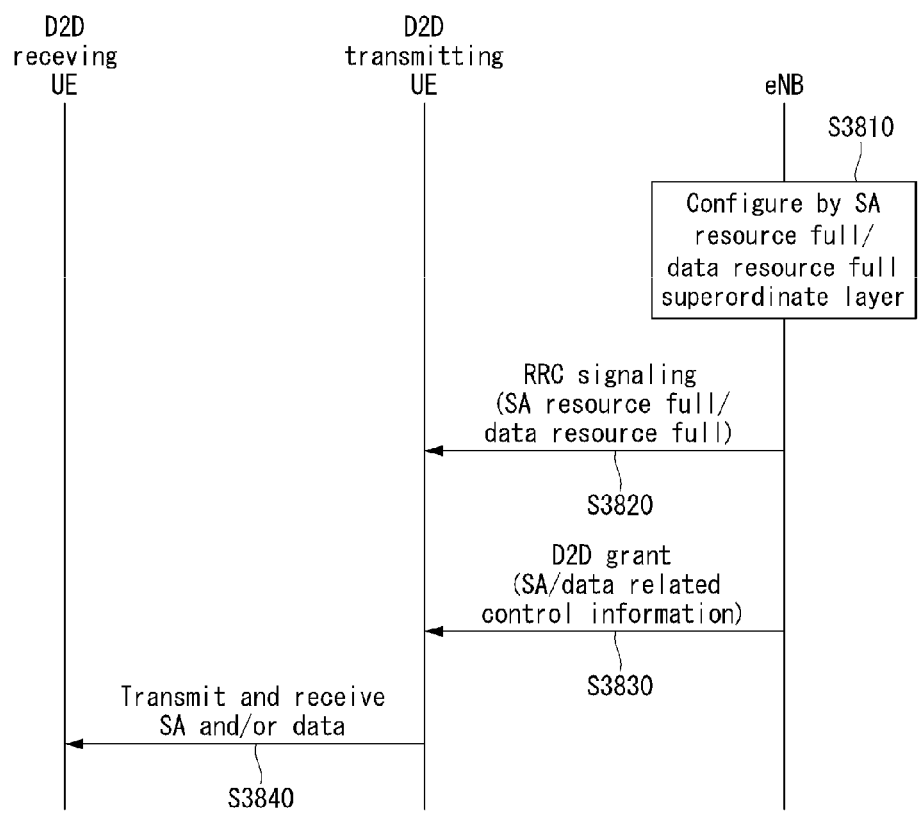
[FIG. 38]

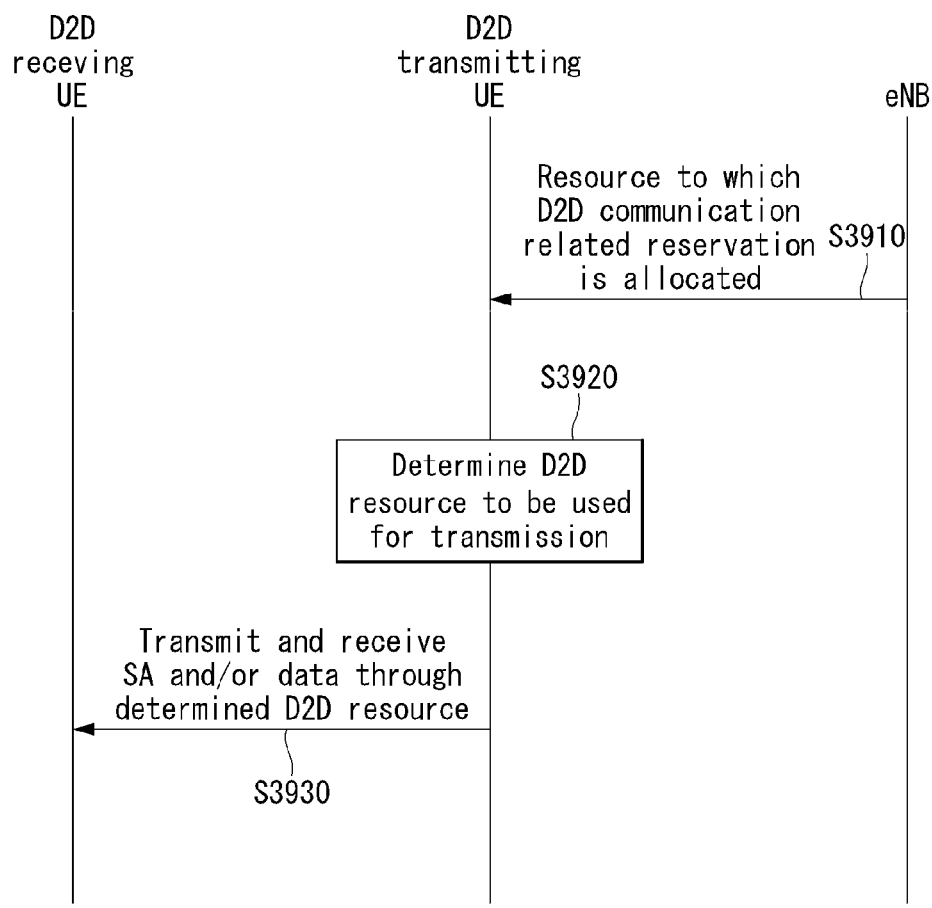
[FIG. 39]

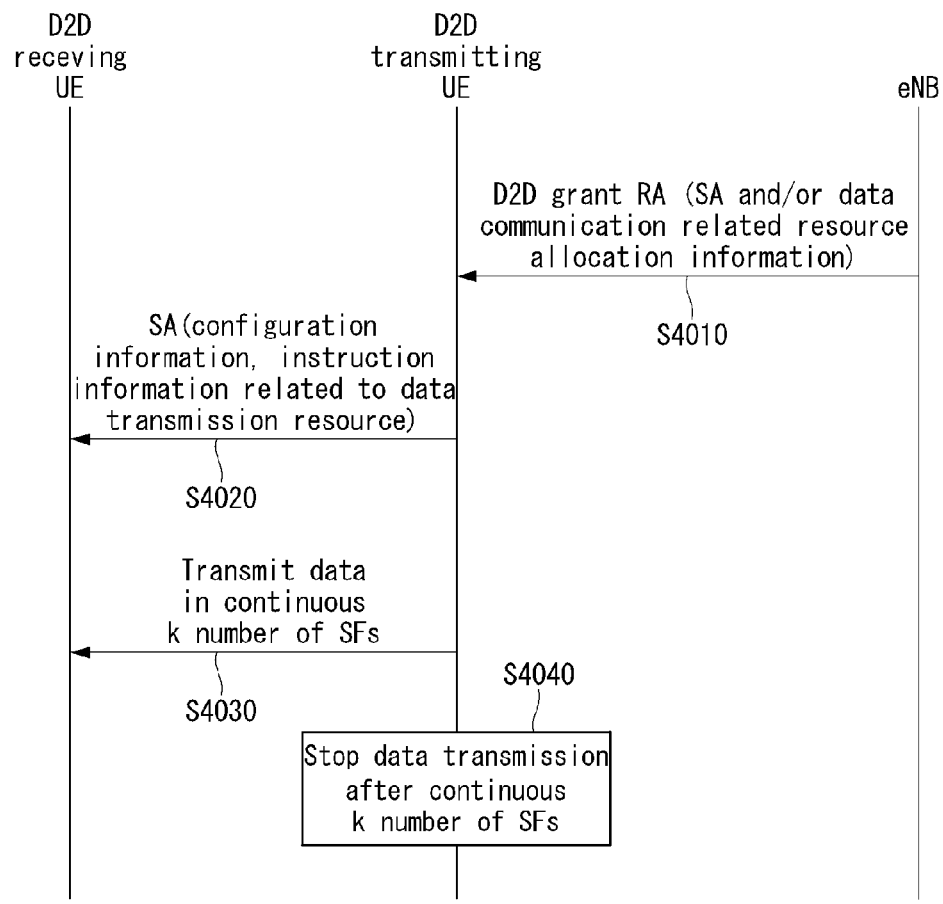
[FIG. 40]

[FIG. 41]
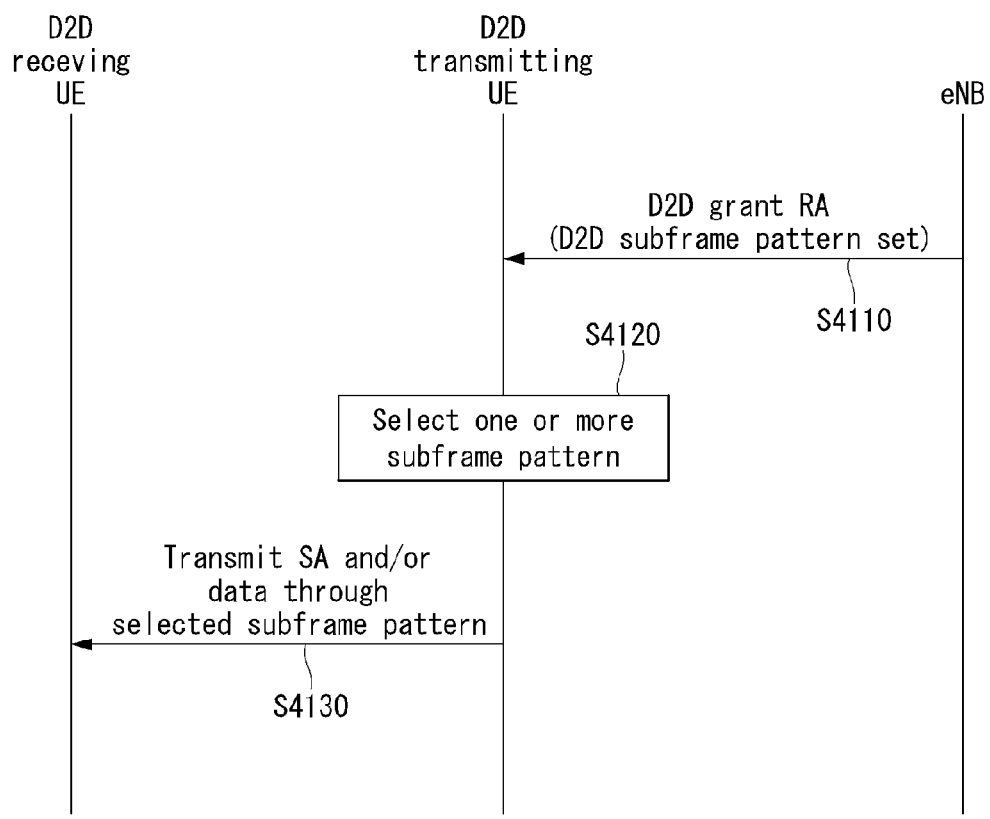

【FIG. 42】
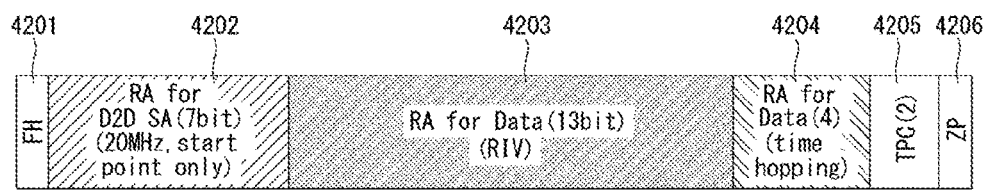

[FIG. 43]
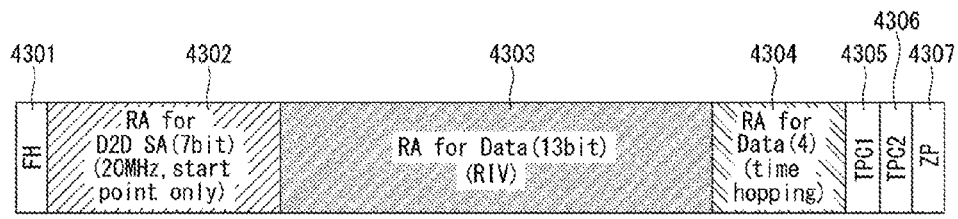

[FIG. 44]
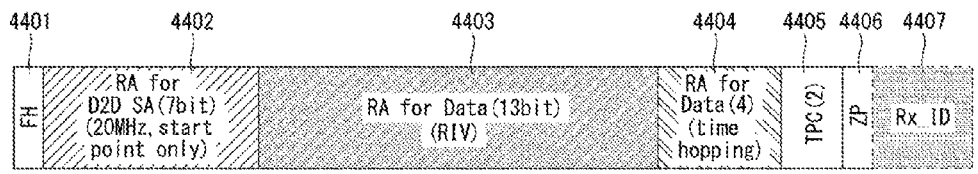

[FIG. 45]
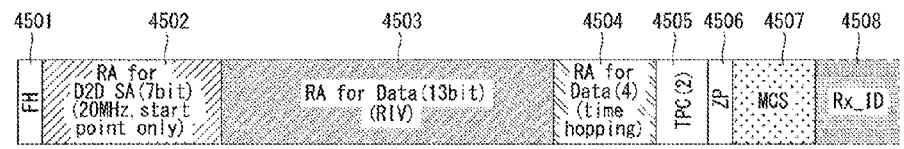

[FIG. 46]
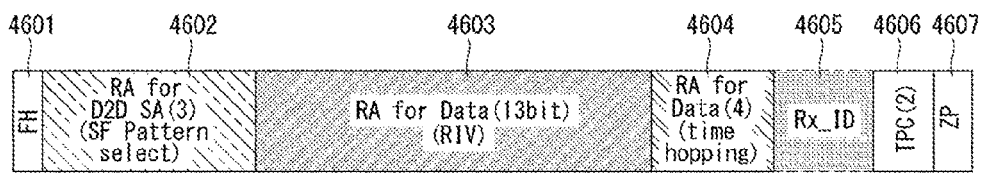

[FIG. 47]
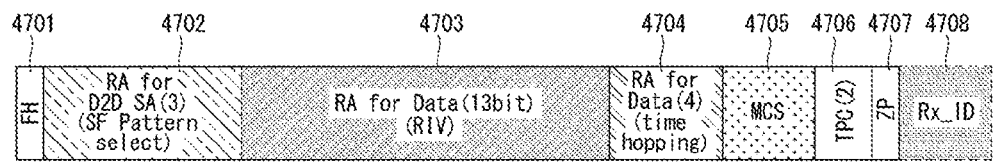

【FIG. 48】
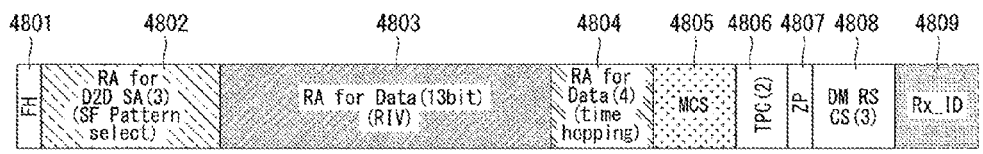

[FIG. 49]
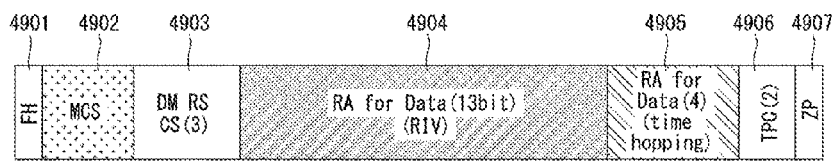

[FIG. 50]
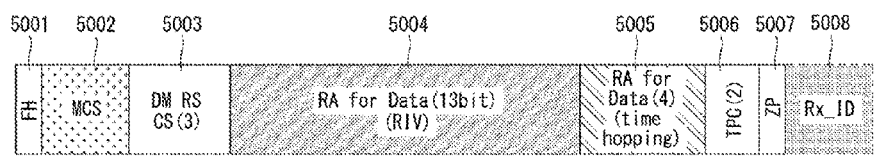

[FIG. 51]
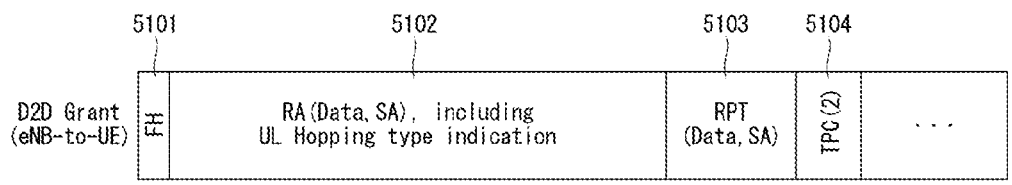

[FIG. 52]
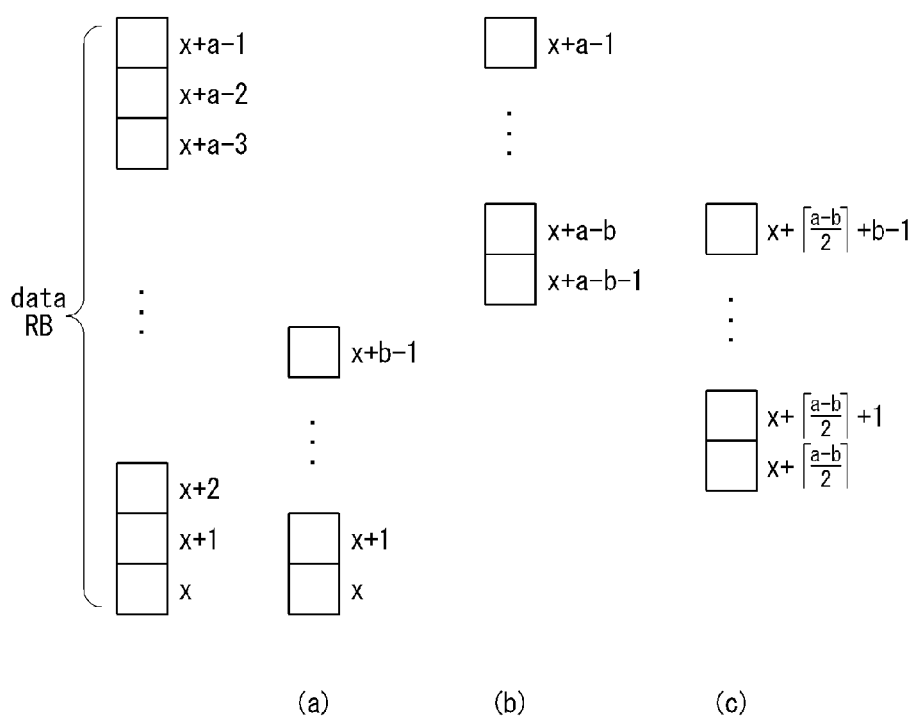

[FIG. 53]

(a) RIV=16

| length \ start | 0 | 1 | 2 | 3 | 4 |
|---|---|---|---|---|---|
| 1 | 0 | 1 | 2 | 3 | 4 |
| 2 | 5 | 6 | 7 | 8 | 9 |
| 3 | 10 | 11 | 12 | 13 | 14 |
| 4 | 15 | 16 | 17 | 18 | 19 |
| 5 | 20 | 21 | 22 | 23 | 24 |

| 0 | 1 | 2 | 3 | 4 | (data)

5301

(b) RIV=4

| length \ start | 0 | 1 | 2 |
|---|---|---|---|
| 1 | 0 | 1 | 2 |
| 2 | 3 | 4 | 5 |
| 3 | 6 | 7 | 8 |

| 0 | 1 | 2 | 3 | 4 | (SA)

5302

[FIG. 54]
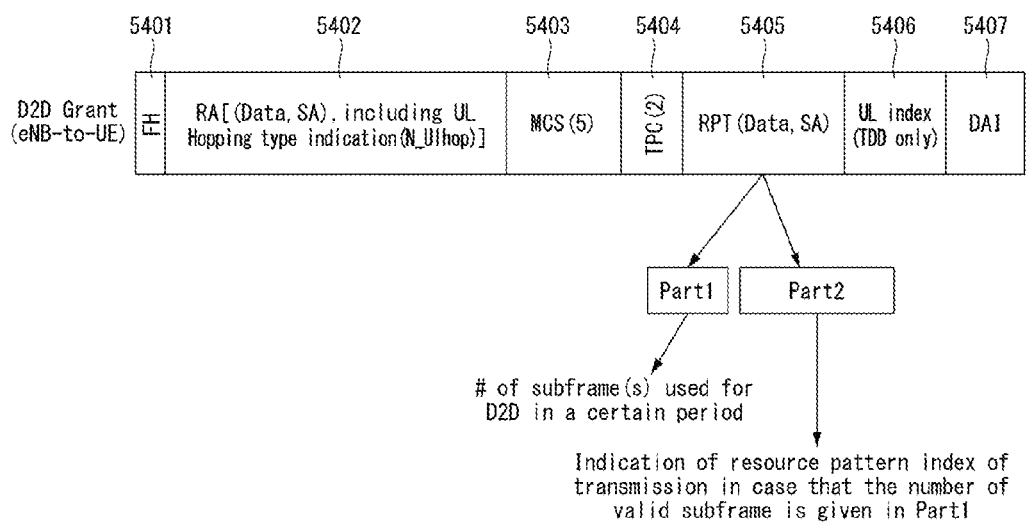

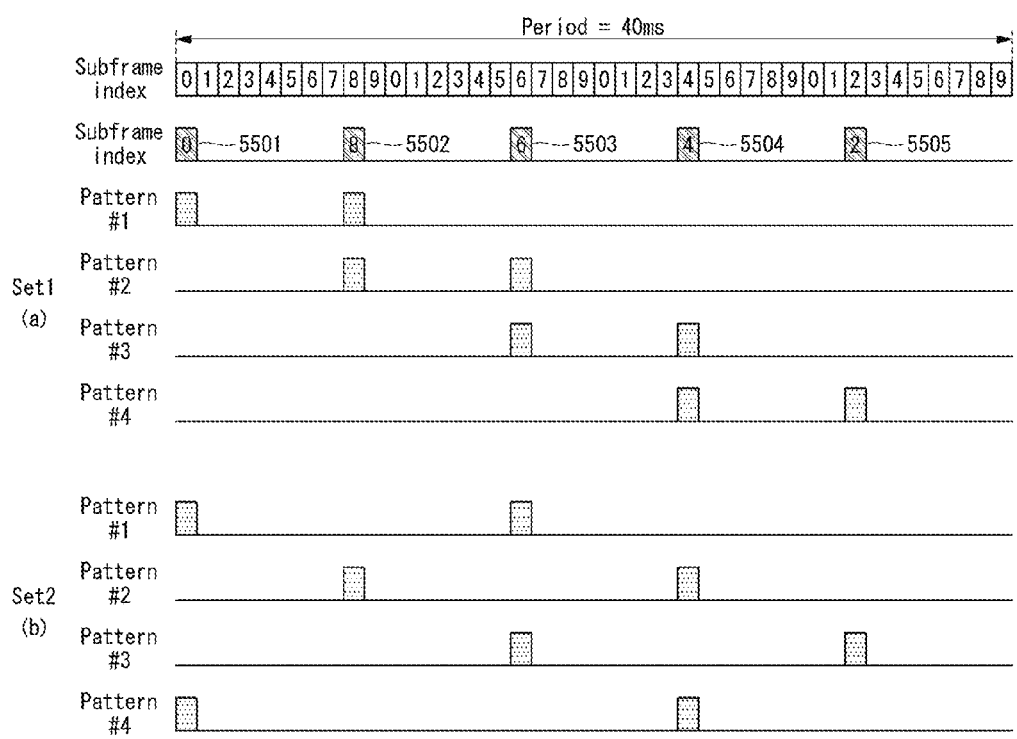
[FIG. 55]

[FIG. 56]
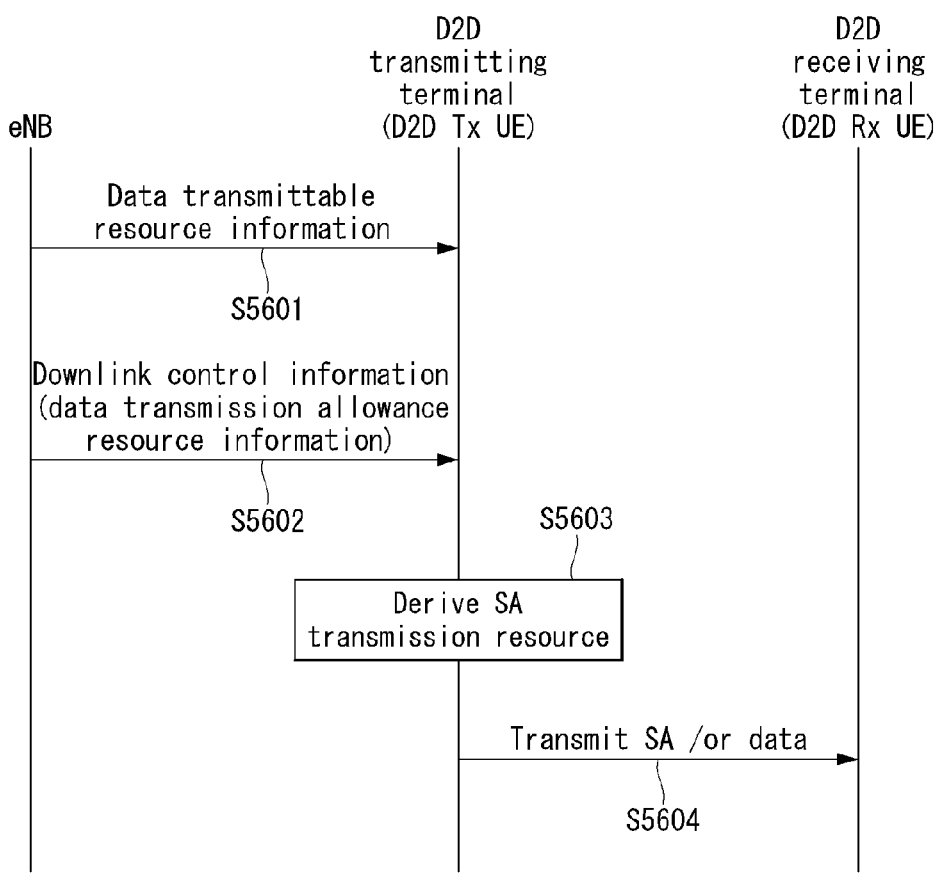

[FIG. 57]
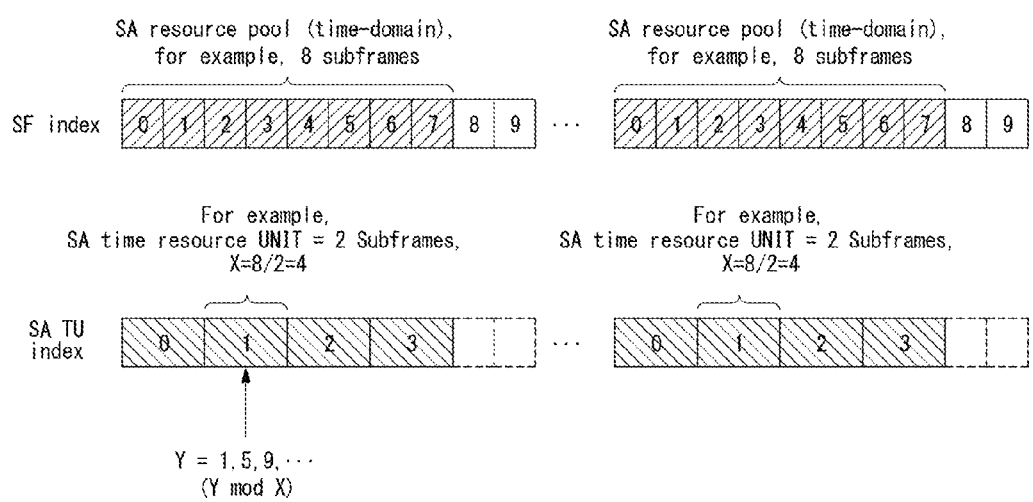

[FIG. 58]
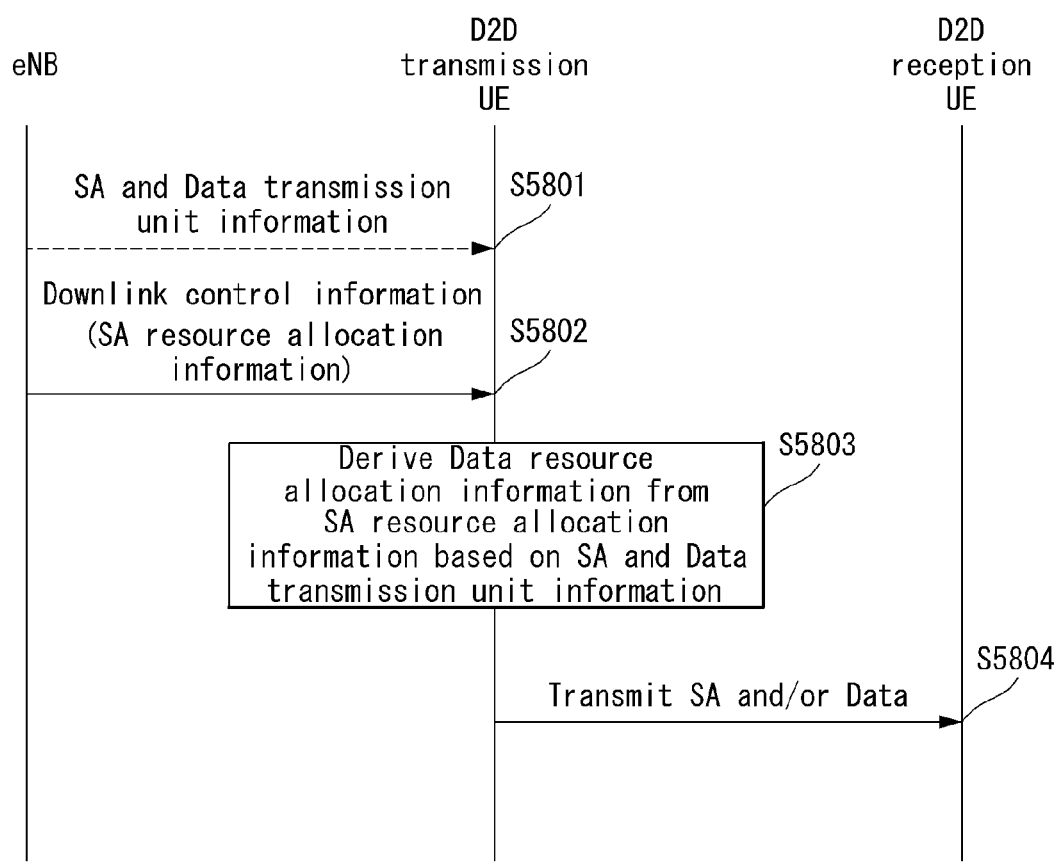

[FIG. 59]
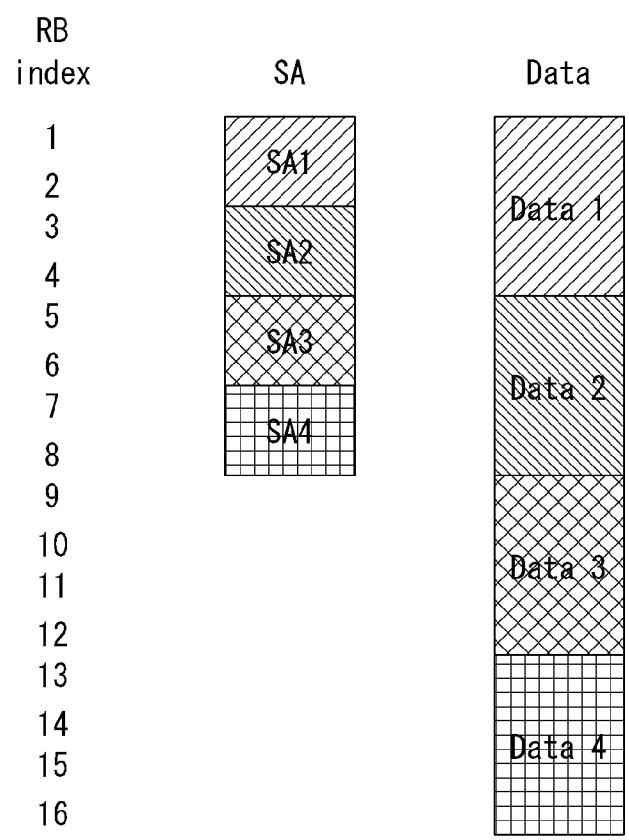

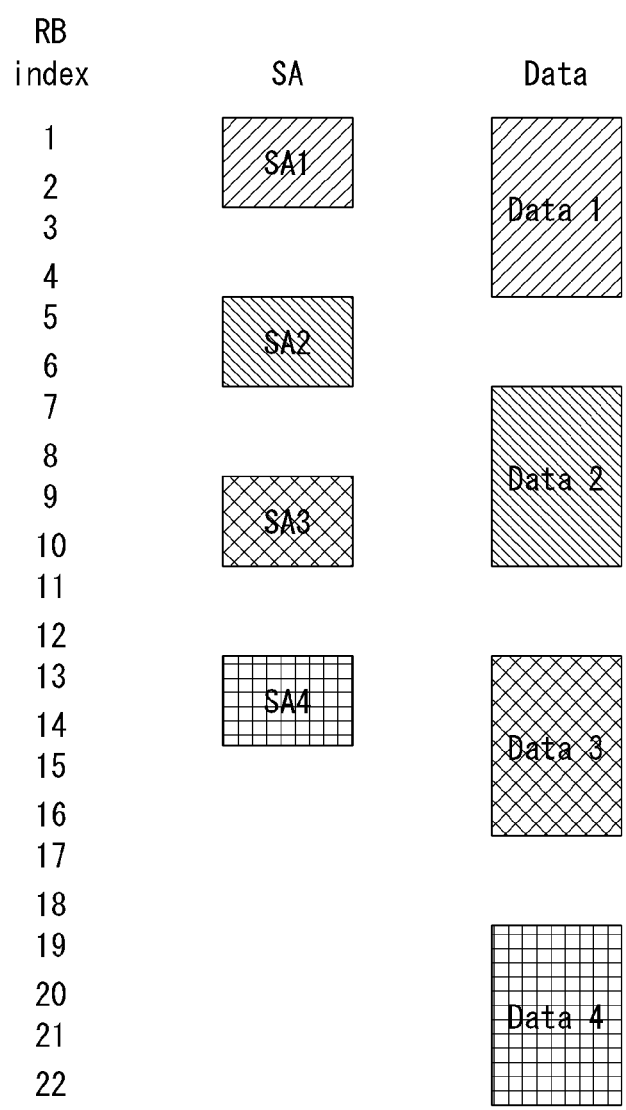
[FIG. 60]

[FIG. 61]
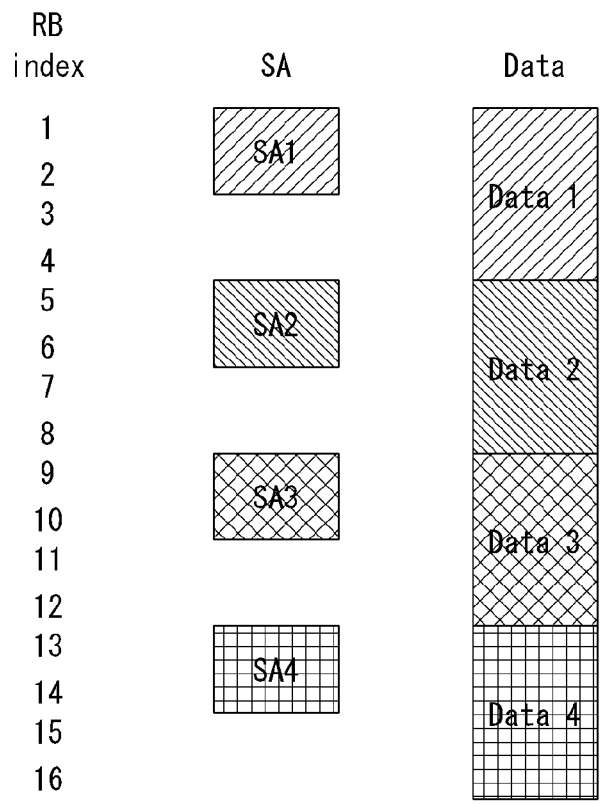
[FIG. 62]
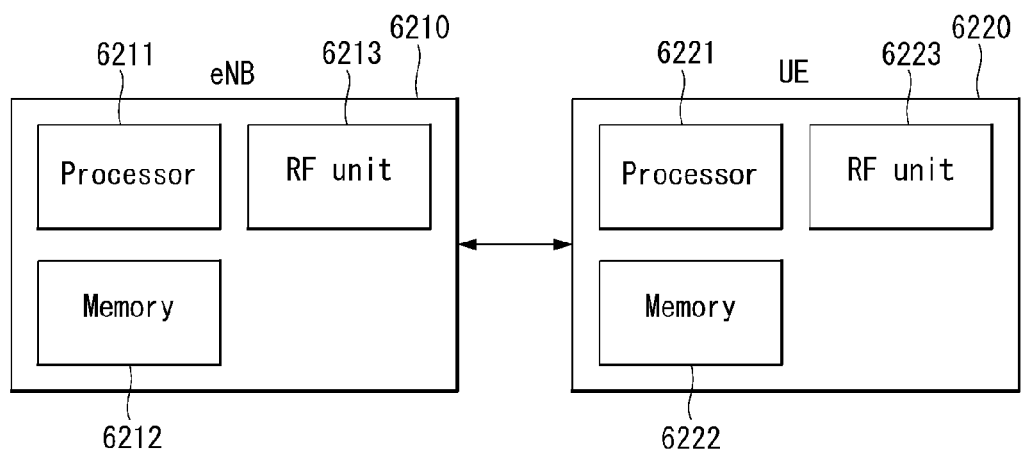

METHOD FOR DEVICE-TO-DEVICE COMMUNICATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/008112, filed on Aug. 3, 2015, which claims the benefit of U.S. Provisional Application No. 62/032,620, filed on Aug. 3, 2014, the contents of which are all hereby incorporated by reference herein in their entirety.

TECHNICAL FIELD

The present invention relates to wireless communication systems, and more particularly, to a method for performing or supporting a Device-to-Device (D2D) communication and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

There has been a difficulty in configuring downlink control information related to D2D communication in a single downlink control information format due to a large amount of control information, because both scheduling assignment and D2D direct communication data transmission that a D2D transmission UE send to a D2D reception UE need to be scheduled.

Moreover, transmitting downlink control information for scheduling assignment and D2D direct communication data transmissions each assumes a heavy signaling burden.

In addition, an object of the present invention is to propose a method for reliably transmitting a scheduling assignment transmitted from a D2D transmission UE to a D2D reception UE.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

According to an aspect of the present invention, a method for performing a Device-to-Device (D2D) communication in a wireless communication system may include receiving, by a first user equipment, downlink control information including resource allocation information for a D2D transmission from a base station, transmitting, by the first user equipment, D2D control information on a Physical Sidelink Control Channel (PSCCH) based on the resource allocation information for the D2D transmission to a second user equipment, and transmitting, by the first user equipment, D2D data on a Physical Sidelink Shared Channel (PSSCH) based on the resource allocation information for the D2D transmission to the second user equipment, where frequency hopping may be performed between the PSCCH resource for the first transmission of the D2D control information and the PSCCH resource for the second transmission of the D2D control information.

According to another aspect of the present invention, a first user equipment for performing a Device-to-Device (D2D) communication in a wireless communication system may include a radio frequency (RF) unit for transmitting and receiving a wireless signal, and a processor for controlling the first user equipment, where the processor is configured to perform: receiving, by a first user equipment, downlink control information including resource allocation information for a D2D transmission from a base station, transmitting, by the first user equipment, D2D control information on a Physical Sidelink Control Channel (PSCCH) based on the resource allocation information for the D2D transmission to a second user equipment; and transmitting, by the first user equipment, D2D data on a Physical Sidelink Shared Channel (PSSCH) based on the resource allocation information for the D2D transmission to the second user equipment, where frequency hopping may be performed between the PSCCH resource for the first transmission of the D2D control information and the PSCCH resource for the second transmission of the D2D control information.

Preferably, the frequency hopping may apply a Physical Uplink Shared Channel (PUSCH) hopping scheme using one or more parameters of a subframe index in which the D2D control information is transmitted, an identifier of the first user equipment and an identifier of the second user equipment.

Preferably, a bandwidth of the frequency hopping may be configured according to an attribute of the first user equipment or the second user equipment.

Preferably, a frequency hopping scheme may be configured according to a repeated transmission number of the D2D control information.

Preferably, different hopping schemes may be determined for each of different D2D control information.

Preferably, the resource allocation information for the D2D transmission may include the resource allocation information of the PSCCH only, and the PSSCH resource may be derived from the resource allocation information of the PSCCH based on a transmission unit of the D2D control information and a transmission unit of the D2D data.

Preferably, the first user equipment may receive the transmission unit of the D2D control information and the transmission unit of the D2D data from the base station.

Preferably, a multiple relation between a resource block (RB) index of the PSSCH and an RB index of the PSSCH may be determined depending on a multiple relation between the transmission unit of the D2D control information and the transmission unit of the D2D data.

Preferably, when a resource gap is configured between the transmission units of the D2D control information and/or between the transmission units of the D2D data, the PSSCH resource may be derived by considering the resource gap.

Preferably, the transmission unit of the D2D control information and/or the transmission unit of the D2D data may be configured as a multiple of a resource block group.

Preferably, the transmission unit of the D2D control information and/or the transmission unit of the D2D data may be configured as a resource block group size predetermined according to a bandwidth allocated for the D2D communication.

Preferably, the transmission unit of the D2D data may be configured as a resource block group, and the transmission unit of the D2D control information may be configured as a predetermined position in the resource block group.

Preferably, the downlink control information may include a first resource allocation field and a second resource allocation field, and the first resource allocation field may include the resource allocation information of the PSCCH for the first transmission of the D2D control information, and the second resource allocation field includes the resource allocation information of the PSCCH for other transmission than the first transmission of the D2D control information.

Preferably, the downlink control information may include a first resource allocation field and a second resource allocation field, and the first resource allocation field may include the resource allocation information of the PSCCH for all types of transmissions of the D2D control information, and the second resource allocation field includes the transmission unit of the D2D control information.

Technical Effects

According to an embodiment of the present invention, by appropriately configuring fields comprising downlink control information, downlink control information that schedules both scheduling assignment and D2D direct communication data that transmit from a D2D transmitting terminal to a D2D receiving terminal can be smoothly transmitted and received.

In addition, according to an embodiment of the present invention, a D2D transmission UE repeatedly transmits a scheduling assignment by hopping in time and/or frequency, it is available to reliably transmit the scheduling assignment to a D2D reception UE.

The effect of the present invention is not limited to the above-described effects and the other objects will be understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

FIG. 1 shows an example of the network structure of E-UTRAN (evolved universal terrestrial radio access network) to which the present invention may be applied.

FIG. 2 is a diagram for explaining physical channels used in a 3GPP LTE/LTE-A system to which the present invention may be applied and a typical signal transmission method using them.

FIG. 3 shows the structure of a radio frame in a wireless communication system to which an embodiment of the present invention may be applied.

FIG. 4 is a diagram illustrating a resource grid for one downlink slot in a wireless communication system to which an embodiment of the present invention may be applied.

FIG. 5 shows the structure of a downlink subframe in a wireless communication system to which an embodiment of the present invention may be applied.

FIG. 6 shows the structure of an uplink subframe in a wireless communication system to which an embodiment of the present invention may be applied.

FIG. 7 is a diagram illustrating the structure of DCI format 0 in a wireless communication system to which the present invention may be applied.

FIG. 8 shows an example of a form in which the PUCCH formats are mapped to the PUCCH region of the uplink physical resource block in a wireless communication system to which an embodiment of the present invention may be applied.

FIG. 9 shows the structure of a CQI channel in the case of a normal CP in a wireless communication system to which an embodiment of the present invention may be applied.

FIG. 10 shows the structure of an ACK/NACK channel in the case of a normal CP in a wireless communication system to which an embodiment of the present invention may be applied.

FIG. 11 shows an example in which 5 SC-FDMA symbols are generated and transmitted during one slot in a wireless communication system to which an embodiment of the present invention may be applied.

FIG. 12 shows an example of component carriers and a carrier aggregation in a wireless communication system to which an embodiment of the present invention may be applied.

FIG. 13 shows an example of the structure of a subframe according to cross-carrier scheduling in a wireless communication system to which an embodiment of the present invention may be applied.

FIG. 14 is a diagram conceptually illustrating D2D communication in a wireless communication system to which an embodiment of the present invention may be applied.

FIG. 15 shows an example of various scenarios of D2D communication to which a method proposed in this specification may be applied.

FIG. 16 is a diagram showing an example of a method for transmitting and receiving D2D control information and D2D data, which is proposed according to an embodiment of the present invention.

FIG. 17 is a diagram showing another example of a method for transmitting and receiving D2D control information and D2D data, which is proposed according to an embodiment of the present invention.

FIG. 18 is a diagram showing yet another example of a method for transmitting and receiving D2D control information and D2D data, which is proposed according to an embodiment of the present invention.

FIG. 19 is a diagram showing an example of a method for configuring D2D control information depending on D2D transmission mode, which is proposed according to an embodiment of the present invention.

FIG. 20 is a diagram illustrating an example of the timing relationship between SG reception and SA transmission in a D2D UE, which is proposed in this specification.

FIGS. 21 and 22 are a flowchart illustrating an example of the timing relation between SG reception and SA transmission in D2D UE, which is proposed according to an embodiment of the present invention.

FIG. 23 is a diagram showing another example of the timing relation between SG reception and SA transmission in D2D UE, which are proposed according to an embodiment of the present invention.

FIG. 24 is a diagram showing yet another example of the timing relation between SG reception and SA transmission in D2D UE, which is proposed according to an embodiment of the present invention.

FIG. 25 is a diagram showing an example of the timing relation between D2D SA transmission and D2D data transmission, which is proposed according to an embodiment of the present invention.

FIG. 26 is a diagram showing another example of the timing relation between D2D SA transmission and D2D data transmission, which are proposed according to an embodiment of the present invention.

FIG. 27 is a diagram showing yet another example of the timing relation between D2D SA transmission and D2D data transmission, which is proposed according to an embodiment of the present invention.

FIG. 28 is a flowchart illustrating an example of a method for transmitting and receiving D2D data, which is proposed according to an embodiment of the present invention.

FIGS. 29 to 32 are diagrams showing examples of methods for providing notification of the locations of SA resources or D2D data resources or both, which are proposed according to embodiments of the present invention.

FIG. 33 is a flowchart illustrating an example of a UE scheduling method for D2D transmission, which is proposed according to an embodiment of the present invention.

FIG. 34 is a diagram showing an example of a UE scheduling method for D2D transmission using RRC signaling, which is proposed according to an embodiment of the present invention.

FIG. 35 is a diagram showing an example of a UE scheduling method for D2D transmission using a physical layer channel, which is proposed according to an embodiment of the present invention.

FIG. 36 is a flowchart illustrating an example of a method for performing an HARQ procedure for an SG, which is proposed in this specification.

FIG. 37 is a diagram showing a D2D operation procedure proposed in this specification and an example of a signaling transmission/reception method related thereto.

FIGS. 38 to 41 are flowcharts showing examples of a method for transmitting downlink control information according to an embodiment of the present invention.

FIGS. 42 to 50 are diagrams illustrating a downlink control information format according to an embodiment of the present invention.

FIG. 51 is a diagram illustrating a downlink control information format according to an embodiment of the present invention.

FIG. 52 is a diagram illustrating a method of deriving a resource block for SA transmission according to an embodiment of the present invention.

FIG. 53 is a diagram illustrating a method of designating a resource block for transmitting a D2D signal according to an embodiment of the present invention.

FIG. 54 is a diagram illustrating a downlink control information format according to an embodiment of the present invention.

FIG. 55 is a diagram illustrating a subframe pattern set according to an embodiment of the present invention.

FIG. 56 is a flowchart illustrating a method of transmitting and receiving downlink control information according to an embodiment of the present invention.

FIG. 57 is a diagram exemplifying a method for indicating a time domain resource for the D2D scheduling grant according to an embodiment of the present invention.

FIG. 58 is a diagram exemplifying a method for a D2D communication according to an embodiment of the present invention.

FIGS. 59 to 61 are diagrams exemplifying a method for indicating the resource for the D2D data according to an embodiment of the present invention.

FIG. 62 is a block diagram illustrating a configuration of a wireless communication device according to an embodiment of the present invention.

BEST MODE FOR INVENTION

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts 01-DMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General Wireless Communication System to which the Present Invention may be Applied FIG. 1 shows an example of the network structure of E-UTRAN (evolved universal terrestrial radio access network) to which the present invention may be applied.

An E-UTRAN system is an advanced version of the existing UTRAN system, and may be a 3GPP LTE/LTE-A system, for example. E-UTRAN consists of eNBs that provide a control plane protocol and a user plane protocol to UEs, and the eNBs are connected via the X2 interface. The X2 user plane interface X2-U is defined between the eNBs. The X2-U interface provides non-guaranteed delivery of user plane PDUs (packet data units). The X2 control plane interface X2-CP is defined between two neighbor eNBs. The X2-CP performs the following functions: context transfer between eNBs, control of user plane tunnels between a source eNB and a target eNB, transfer of handover-related messages, uplink load management and the like. An eNB is connected to user equipment UE through a radio interface and is connected to an Evolved Packet Core (EPC) through the S1 interface. The S1 user plane interface (S1-U) is defined between the eNB and the serving gateway (S-GW). The SI control plane interface (S1-MME) is defined between the eNB and the MME (Mobility Management Entity). The S1 interface performs the following functions: EPS (Enhanced Packet System) Bearer Service Management function, NAS (Non-Access Stratum) Signaling Transport function, Network Sharing Function, MME Load balancing Function and the like. The S1 interface supports many-to-many relations between eNBs and MMEs/S-GWs.

FIG. 2 is a diagram for explaining physical channels used in a 3GPP LTE/LTE-A system to which the present invention may be applied and a typical signal transmission method using them.

When a UE is powered on from off or enters a new cell, the UE performs an initial cell search such as synchronization with an eNB (S201). To this end, the UE receives a primary synchronization channel (P-SCH) and a secondary synchronization channel (S-SCH) from the eNB to synchronization with the eNB and acquire information such as a cell ID (identifier).

Thereafter, the UE may acquire broadcast information within the cell by receiving a physical broadcast channel from the eNB. In the initial cell search step, the UE may monitor a downlink channel state by receiving downlink reference signals (DL RS).

Upon completion of the initial cell search procedure, the UE may acquire more detailed system information by receiving a physical downlink control channel (PDCCH) and a physical downlink shared channel (PDSCH) based on PDCCH information.

Afterwards, the UE may perform a random access procedure (S203 to S206) to complete the connection to the eNB. To this end, the UE may transmit a preamble through a physical random access channel (PRACH) (S203) and receive a response message to the preamble through the PDCCH and the PDSCH corresponding to the PDCCH (S204). In the case of contention-based random access, the UE may perform a contention resolution procedure such as transmission (S205) of an additional PRACH signal and reception (S206) of a PDCCH signal and a PDSCH signal corresponding to the PDCCH signal.

After performing the above-described procedures, the UE may receive a PDCCH signal and/or a PDSCH signal (S207), as a general uplink/downlink signal transmission procedure, and may then receive a physical uplink shared channel (PUSCH) signal and/or a physical uplink control channel (PUCCH) signal (S208).

Control information the UE sends to the eNB is collectively referred to as uplink control information (UCI). The UCI includes HARQ(Hybrid Automatic Retransmit reQuest)-ACK(Acknowledge)/NACK(Non-Acknowledge), SR (Scheduling Request), CQI (Channel Quality Indicator), PMI (Precoding Matrix Indicator), RI (Rank Indication), etc.

In an LTE/LTE-A system, the UCI is generally carried on the PUCCH. However, when control information and traffic data are to be transmitted simultaneously, the UCI may also be carried on the PUSCH. Additionally, the UCI may be aperiodically carried on the PUSCH according to a request/indication from the network.

FIG. 3 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 3(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 3(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

The structure of a radio frame is only one example. The number of subcarriers included in a radio frame or the number of slots included in a subframe and the number of OFDM symbols included in a slot may be changed in various ways.

FIG. 4 is a diagram illustrating a resource grid for one downlink slot in a wireless communication system to which an embodiment of the present invention may be applied.

Referring to FIG. 4, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NDL included in a downlink slot depends on a downlink transmission bandwidth.

The structure of an uplink slot may be the same as that of a downlink slot.

FIG. 5 shows the structure of a downlink subframe in a wireless communication system to which an embodiment of the present invention may be applied.

Referring to FIG. 5, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 6 shows the structure of an uplink subframe in a wireless communication system to which an embodiment of the present invention may be applied.

Referring to FIG. 6, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

PDCCH(Physical Downlink Control Channel)

Control information carried on the PDCCH is referred to as downlink control information (DCI). In the PDCCH, the size and purpose of control information may vary depending upon a DCI (downlink control indicator) format, and the size may also vary depending upon the coding rate.

Table 2 shows DCI in accordance with DCI format.

TABLE 2

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 2, DCI formats may include a format 0 for PUSCH scheduling, a format 1 for scheduling of one PDSCH codeword, a format 1A for compact scheduling of one PDSCH codeword, a format 1C for very compact scheduling of DL-SCH, a format 2 for PDSCH scheduling in closed-loop spatial multiplexing mode, a format 2A for PDSCH scheduling in open-loop spatial multiplexing mode, formats 3 and 3A for transmission of a TPC (transmission power control) command for an uplink channel, and a format 4 for PUSCH scheduling within one uplink cell in a multi-antenna port transmission mode.

The DCI format 1A may be used for PDSCH scheduling regardless of which transmission mode is set for UE.

The DCI format may be applicable independently for each UE, and PDCCHs of multiple UEs can be simultaneously multiplexed within a single subframe. The PDCCH consists of one control channel element (CCE) or an aggregation of several contiguous CCEs. The CCE is a logical assignment unit used to provide the PDCCH with a coding rate depending on a radio channel status. The CCE corresponds to 9 sets of REGs each including 4 resource elements. An eNB may use {1, 2, 4, 8} CCEs to configure one PDCCH signal. Here, {1, 2, 4, 8} are referred to as CCE aggregation levels. The number of CCEs used to transmit a specific PDCCH is determined by the eNB according to channel state. A PDCCH configured according to each UE is interleaved and mapped to a control channel region of each subframe and according to a CCE-to-RE mapping rule. The PDCCH position may depend on the number of OFDM symbols for a control channel of each subframe, the number of PHICH groups, transmit antenna, frequency shift, etc.

As described above, channel coding is performed independently on multiplexed PDCCHs of UEs and cyclic redundancy check (CRC) is applied thereto. The CRC is masked with each UE's ID such that each UE can receive a PDCCH allocated thereto. However, the eNB does not provide information about the location of a PDCCH corresponding to a UE in a control region assigned in a subframe. To receive a control channel transmitted from the eNB, the UE finds the PDCCH assigned thereto by monitoring a set of PDCCH candidates in a subframe because the UE cannot be aware of the location of the PDCCH and the CCE set aggregation level or DCI format used for the PDCCH. This is called blinding decoding (BD). Blind decoding may also be called blind detection or blind search. Blind decoding is a method by which a UE de-masks a CRC with the ID thereof and checks for a CRC error to confirm whether the corresponding PDCCH is a control channel for the UE.

Hereinafter, information carried in DCI format 0 will be described.

FIG. 7 is a diagram illustrating the structure of DCI format 0 in a wireless communication system to which the present invention may be applied.

DCI format 0 is used for scheduling a PUSCH in an uplink cell.

Table 3 shows information carried in DCI format 0.

TABLE 3

| Format 0 (Release 8) | Format 0 (Release 10) |
| --- | --- |
|  | Carrier Indicator (CIF) |
| Flag for format 0/format 1A differentiation | Flag for format 0/format 1A differentiation |
| Hopping flag (FH) | Hopping flag (FH) |
| Resource block assignment (RIV) | Resource block assignment (RIV) |
| MCS and RV | MCS and RV |
| NDI (New Data Indicator) | NDI (New Data Indicator) |
| TPC for PUSCH | TPC for PUSCH |
| Cyclic shift for DM RS | Cyclic shift for DM RS |
| UL index (TDD only) | UL index (TDD only) |
| Downlink Assignment Index (DAI) | Downlink Assignment Index (DAI) |

TABLE 3-continued

| Format 0 (Release 8) | Format 0 (Release 10) |
| --- | --- |
| CSI request (1 bit) | CSI request (1 or 2 bits: 2 bit is for multi carrier) SRS request Resource allocation type (RAT) |

Referring to FIG. 7 and Table 3, information carried in DCI format 0 is as follows:

1) Carrier indicator—0 or 3 bit
2) Flag for format 0 and format 1 differentiation—1 bit. Value 0 indicates DCI format 0 and value 1 indicates format 1A.
3) Frequency hopping flag—1 bit. In this field, the MSB (Most Significant bit) of the corresponding resource allocation may be used for multi-cluster allocation if needed.
4) Resource block assignment and hopping resource allocation—$\lceil \log_2(N_{RB}^{UL}(N_{RB}^{UL}+1)/2) \rceil$ bits.

Here, in single-cluster allocation, in PUSCH hopping, in order to acquire a value (i.e., hopping information) of $\tilde{n}_{PRB}^{(i)}$, the NUL_hop number of most significant bits (MSBs) are used. A $(\lceil \log_2(N_{RB}^{UL}(N_{RB}^{UL}+1)/2) \rceil - N_{UL\_hop})$ bit provides resource allocation of a first slot within an uplink subframe. Here, a detailed description of a value (i.e., hopping information) of $\tilde{n}_{PRB}^{(i)}$ will be described later.

For non-hopping PUSCH in single-cluster allocation, $(\lceil \log_2(N_{RB}^{UL}(N_{RB}^{UL}+1)/2) \rceil)$ bits provide resource allocation in the uplink subframe. For non-hopping PUSCH in multi-cluster allocation, resource allocation information is obtained from the concatenation of the frequency hopping flag field and the resource block assignment and hopping resource allocation field, and $$\left\lceil \log_2\left(\binom{\lceil N_{RB}^{UL}/P+1 \rceil}{4}\right)\right\rceil$$

bits provide resource allocation in the uplink subframe, where the value of P depends on the number of downlink resource blocks.

5) MCS (Modulation and coding scheme) and RV (Redundancy Version)—5 bits.
6) New data indicator (NDI)—1 bit.
7) TPC (Transmit Power Control) command for PUSCH—2 bits.
8) CS (Cyclic Shift) for DMRS (demodulation reference signal) and OC/OCC (orthogonal cover/orthogonal cover code) index—3 bits.
9) UL index—2 bits. This field is present only for TDD operation with uplink-downlink configuration 0.
10) DAI (Downlink Assignment Index)—2 bits. This field is present only for TDD operation with uplink-downlink configurations 1-6.
11) CSI (Channel State Information) request—1 or 2 bits. The 2-bit field applies only when the corresponding DCI is UE-specifically mapped by C-RNTI (Cell-RNT1) to UEs that are configured with one or more downlink cells.
12) SRS (Sounding Reference Signal) request—0 or 1 bit. This field can only be present only when the scheduling PUSCH is UE-specifically mapped by C-RNTI.
13) Resource Allocation type—1 bit.

If the number of information bits in DCI format 0 is less than the payload size of DCI format 1A (including any padding bits appended to DCI format 1A), zeros shall be appended to DCI format 0 until the payload size equals that of DCI format 1A.

Uplink Resource Allocation

For a PDCCH/EPDCCH(enhanced PDCCH) that transfers an uplink DCI format (e.g., DCI format 0/4), two uplink resource allocation methods are supported.

The uplink DCI format supports a method of indicating one resource formed with a continuous resource block with uplink resource allocation (resource allocation type 0), and a method of indicating two resources formed with continuous resource blocks with uplink resource allocation (resource allocation type 1).

When a resource allocation type bit does not exist at the uplink DCI format (i.e., DCI format 0), only a resource allocation type 0 is supported.

However, when a resource allocation type bit exists at the uplink DCI format (i.e., DCI format 4), if the resource allocation type bit has a value '0', a resource allocation type 0 is indicated, and in other case, a resource allocation type 1 is indicated. The UE analyzes a resource allocation field according to a resource allocation type bit within a PDCCH/EPDCCH that transfers the detected uplink DCI format.

The entire of two uplink resource allocation types indicates a Virtual Resource Block (VRB). The VRB represents a virtual unit resource block for transmission of a data channel or a control channel. One VRB may be mapped to one PRB or one VRB may be mapped to a plurality of PRBs.

The VRB may be classified into types of a Localized Virtual Resource Block (LVRB) and a Distributed Virtual Resource Block (DVRB). One LVRB is mapped to one PRB, and a PRB to which different LVRBs are mapped is not overlapped. However, one DVRB is mapped to some REs within a plurality of PRBs.

First, resource allocation information according to an uplink resource allocation type 0 indicates a virtual resource block (VRB) index $n_{VRB}$ continuously allocated to a scheduled UE. A resource allocation field within scheduling grant includes a resource indication value (RIV) corresponding to a start resource block $RB_{START}$ and a length $L_{CRBs}$ of a continuously allocated resource block.

When $(L_{CRBs}-1) \leq \lfloor N_{RB}^{UL}/2 \rfloor$ is satisfied, the RIV is defined to Equation 1, and in other case, the RIV is defined to Equation 2.

Here, $N_{RB}^{UL}$ represents the number of an entire resource block (RB) at an uplink bandwidth.

$$RIV = N_{RB}^{UL}(L_{CRBs}-1) + RB_{START} \quad \text{[Equation 1]}$$

$$RIV = N_{RB}^{UL}(N_{RB}^{UL}-L_{CRBs}+1) + (N_{RB}^{UL}-1-RB_{START}) \quad \text{[Equation 2]}$$

Next, resource allocation information of an uplink resource allocation type 1 indicates two resource block sets to a scheduled UE. Here, each set includes one or more continuous resource block group (RBG).

A size of the RBG is determined according to an uplink bandwidth, as shown in Table 4.

TABLE 4

| System Bandwidth $N_{RB}^{UL}$ | RBG Size (P) |
| --- | --- |
| ≤10 | 1 |
| 11-26 | 2 |
| 27-63 | 3 |
| 64-110 | 4 |

Referring to Table 4, in a smallest bandwidth (≤10), because an RBG size is a single resource block, a resource can be allocated in a resource block unit. However, in a largest bandwidth (64-110), four resource blocks form one group.

A resource allocation field within scheduling grant includes a combinatorial index r.

In a resource allocation type 1, a start point and an end point of two resource block sets formed with a continuous resource block in a frequency form are indicated as an index.

In order words, a combinatorial index r for indicating resource allocation is defined to Equation 3 to correspond to a start RBG index $s_0$ and a final RBG index $s_1-1$ of a resource block set 1 and a start RBG index $s_2$ and a final RBG index $s_3-1$ of a resource block set 2.

$$r = \sum_{i=0}^{M-1} \binom{N - s_i}{M - i}$$  [Equation 3]

In Equation 3, M=4 and N=⌈$N_{RB}^{UL}$/P⌉+1.

In single-cluster allocation, two types of PUSCH frequency hopping is supported. However, in multi-cluster allocation, PUSCH frequency hopping is not supported, and in this case, by disposing two clusters at an appropriate location, frequency diversity may be obtained.

When the frequency hopping (FH) field of 1 bit is set to 1 in the corresponding PDCCH/EPDCCH that carries DCI format 0 and the uplink resource block assignment is type 1, a UE perform the PUSCH frequency hopping. Otherwise, the PUSCH hopping is not performed.

The UE that performs the PUSCH frequency hopping determines a PUSCH Resource Allocation (RA) for the first slot S1 of a subframe from a resource allocation field in the latest PDCCH/EPDCCH that carries DCI format 0 for the same transport block. Here, the first slot S1 of a subframe includes the lowest index PRB $n_{PRB}^{S1}(n)$ in subframe n.

In the case that the PDCCH/EPDCCH for the same transport block is not existed, the UE determines the hopping type based on the followings:

The hopping information in the latest semi-persistent scheduling grant PDCCH/EPDCCH, when an initial PUSCH for the same transport block is semi-persistently scheduled The random access response grant for the same transport block, when a PUSCH is initiated by the random access response grant The resource allocation field in DCI format 0 excludes 1 or 2 bits used for the hopping information indicated in Table 5 below. Here, the number of PUSCH resource blocks is defined as Equation 4 below.

$$N_{RB}^{PUSCH} = \begin{cases} N_{RB}^{UL} - \tilde{N}_{RB}^{HO} - & \text{Type 1 } PUSCH \\ (N_{RB}^{UL} \bmod 2) & \text{hopping} \\ N_{RB}^{UL} & \text{Type 2 } N_{sb} = 1 \\ & PUSCH \text{ hopping} \\ N_{RB}^{UL} - \tilde{N}_{RB}^{HO} & \text{Type 2 } N_{sb} > 1 \\ & PUSCH \text{ hopping} \end{cases}$$  [Equation 4]

In PUSCH hopping types 1 and 2, N_RB^HO is given by the high layer signaling (e.g., RRC signaling). When N_RB^HO is an odd number, $\tilde{N}_{RB}^{HO}=N_{RB}^{HO}+1$, and otherwise, $\tilde{N}_{RB}^{HO}=N_{RB}^{HO}$. The size of a resource allocation field in DCI formats is y=⌈$\log_2(N_{RB}^{UL}(N_{RB}^{UL}+1)/2)$⌉−$N_{UL\_hop}$ except the case of 1 or 2 bits. Herein, N_UL_hop is 1 or 2 bits. The number of consecutive RBs that may be granted by a user of PUSCH hopping type 1 is limited to ⌊$2^y/N_{RB}^{UL}$⌋. The number of consecutive RBs that may be granted by a user of PUSCH hopping type 2 is limited to min(L⌊$2^y/N_{RB}^{UL}$⌋, ⌊$N_{RB}^{PUSCH}/N_{sb}$⌋). Here, the number of sub-bands N_sb is given by the high layer signaling (e.g., RRC signaling).

A UE performs the PUSCH frequency hopping using a type between two available PUSCH frequency hopping types based on the hopping information in an uplink scheduling grant.

As described above, a UE acquires the value of $\tilde{n}_{PRB}^{(i)}$ (i.e., hopping information) using N_UL_hop most significant bits (MSBs) in the resource block field in the uplink scheduling grant.

Table 5 exemplifies the number N_UL_hop of hipping bits according to a system bandwidth.

TABLE 5

| System BW $N_{RB}^{UL}$ | #Hopping bits for 2nd slot RA (N_UL_hop) |
|---|---|
| 6-49 | 1 |
| 50-110 | 2 |

Referring to Table 5, when the uplink bandwidth is 6 to 49, 1 bit is allocated as the number N_UL_hop of hipping bits for the second slot. When the uplink bandwidth is 50 to 110, 2 bits are allocated as the number N_UL_hop of hipping bits for the second slot.

Depending on the parameter 'Hopping-mode' provided by the high layer, the hopping mode is determined on whether the PUSCH frequency hopping is "inter-subframe" hopping or "intra-subframe" hopping.

First, when describing PUSCH frequency hopping type 1, in the first slot of subframe i to which a resource is allocated, the lowest index n_PRB^S1(i) in a physical block is defined as $n_{PRB}^{S1}(i)=\tilde{n}_{PRB}^{S1}(i)+\tilde{N}_{RB}^{HO}/2$. Herein, $n_{PRB}^{S1}(i)=RB_{START}$, and the RB_START is obtained by the uplink scheduling grant as described above.

In addition, in the second slot of subframe i to which a resource is allocated, the lowest index n_PRB(i) is defined as $n_{PRB}(i)=\tilde{n}_{PRB}(i)+\tilde{N}_{RB}^{HO}/2$. Herein, the hopping bit (1 or 2 bits) of PUSCH hopping type 1 indicated by Table 5 determines the value of $\tilde{n}_{PRB}(i)$ as represented in Table 6 below. In Table 6, N_RB^PUSCH means the number of RBs allocated for the PUSCH transmission.

That is, the physical resource block set used for the PUSCH transmission includes L_CRBs consecutive resource block from PRB index n_PRB^S1(i) in the first slot, and includes L_CRBs consecutive resource block from PRB index n_PRB(i) in the second slot. Herein, L_CRBs is obtained from the uplink scheduling grant as described above.

Table 6 exemplifies the definition of a hopping bit of PDCCH/EPDCCH DCI format 0.

TABLE 6

| System BW $N_{RB}^{UL}$ | Number of Hopping bits | Information in hopping bits | $\tilde{n}_{PRB}(i)$ |
|---|---|---|---|
| 6-49 | 1 | 0 | (⌊$N_{RB}^{PUSCH}/2$⌋ + $\tilde{n}_{PRB}^{S1}(i)$)mod $N_{RB}^{PUSCH}$ |
|  |  | 1 | Type 2 PUSCH Hopping |

TABLE 6-continued

| System BW $N_{RB}^{UL}$ | Number of Hopping bits | Information in hopping bits | $\tilde{n}_{PRB}(i)$ |
|---|---|---|---|
| 50-110 | 2 | 00 | $(\lfloor N_{RB}^{PUSCH}/4 \rfloor + \tilde{n}_{PRB}^{S1}(i)) \mod N_{RB}^{PUSCH}$ |
| | | 01 | $(-\lfloor N_{RB}^{PUSCH}/4 \rfloor + \tilde{n}_{PRB}^{S1}(i)) \mod N_{RB}^{PUSCH}$ |
| | | 10 | $(\lfloor N_{RB}^{PUSCH}/2 \rfloor + \tilde{n}_{PRB}^{S1}(i)) \mod N_{RB}^{PUSCH}$ |
| | | 11 | Type 2 PUSCH Hopping |

Referring to Table 6, in the case that the hopping bits are configured as 1 bit, PUSCH frequency hopping type 2 is performed when the hopping bit has the value '1'. And, the frequency hopping is performed as much as ½ of the uplink bandwidth in the second slot when the hopping bit has the value '0'.

In the case that the hopping bits are configured as 2 bits, PUSCH frequency hopping type 2 is performed when the hopping bit has the value '11'. The frequency hopping is performed as much as ¼, −¼ and ½ of the uplink bandwidth in the second slot when the hopping bit has the value '00', '01' and '10', respectively.

Next, when describing PUSCH frequency hopping type 2, the set of physical resource blocks that are going to be used for a transmission in slot n_s is determined according to a predetermined pattern together with the scheduling grant.

For PUSCH frequency hopping type 2, in the whole uplink bandwidth (except the resource block in which a PUCCH is transmitted), a set of sub-bands that include consecutive resource blocks of a predetermined size is defined. Here, the number of sub-bands is given by the high layer signaling (e.g., RRC signaling).

In the case that a system frame number is not acquired by a UE, the UE does not transmit a PUSCH using PUSCH frequency hopping type 2.

And, the VRBs allocated by the uplink scheduling grant are mapped to the corresponding PRBs according to the predetermined hopping pattern based on the sub-bands. For example, when the value of a hopping pattern is 1, the VRB is mapped to the PRB which is shifted as much as a sub-band.

In this case, different shifts may be configured to the hopping pattern for each slot.

In addition, a mirroring pattern of a sub-band unit may be preconfigured additionally to the hopping pattern. When the mirroring is 'on' state, the index of VRB is set in an inverse order in comparison with the slot in which the mirroring is 'off' state. Owing to this, the PRB is mapped in an inverse order.

PUCCH(Physical Uplink Control Channel)

The Uplink Control Information (UCI) transmitted through a PUCCH can include Scheduling Request (SR), HARQ ACK/NACK information, and downlink channel measurement information as shown below.

SR (Scheduling Request): used for requesting uplink UL-SCH resources. SR is transmitted by On-Off Keying (OOK) scheme.

HARQ ACK/NACK: a signal responding to a downlink data packet on a PDSCH. This signal indicates whether a downlink data packet has successfully received or not. ACK/NACK 1 bit is transmitted in response to a single downlink codeword while ACK/NACK 2 bits are transmitted in response to two downlink codewords.

CSI (Channel State Information): feedback information about a downlink channel. CSI can include at least one of a Channel Quality Indicator (CQI), a Rank Indicator (RI), a Precoding Matrix Indicator (PMI), and a Precoding Type Indicator (PTI). For each subframe, 20 bits are used to represent the CSI.

HARQ ACK/NACK information may be generated depending on whether a downlink data packet on a PDSCH has been successfully decoded. In an existing wireless communication system, 1 bit is transmitted as ACK/NACK information with respect to the transmission of downlink single codeword, and 2 bits are transmission as ACK/NACK information with respect to the transmission of downlink 2 codewords.

Channel measurement information denotes feedback information related to a Multiple Input Multiple Output (MIMO) scheme and may include a Channel Quality Indicator (CQI), a Precoding Matrix Index (PMI), and a Rank Indicator (RI). Such channel measurement information may be commonly called a CQI.

In order to transmit a CQI, 20 bits may be used in each subframe.

A PUCCH may be modulated using a Binary Phase Shift Keying (BPS K) scheme and a Quadrature Phase Shift Keying (QPSK) scheme. Control information for a plurality of UEs may be transmitted through a PUCCH. If Code Division Multiplexing (CDM) is performed in order to distinguish the signals of UEs from each other, a Constant Amplitude Zero Autocorrelation (CAZAC) sequence of a length 12 is mostly used. The CAZAC sequence has a characteristic in that a constant size (amplitude) is maintained in a time domain and a frequency domain. Accordingly, the CAZAC sequence has a property suitable for increasing coverage by lowering the Peak-to-Average Power Ratio (PAPR) or Cubic Metric (CM) of UE. Furthermore, ACK/NACK information about downlink data transmission transmitted through a PUCCH is covered using an orthogonal sequence or an Orthogonal Cover (OC).

Furthermore, control information transmitted through a PUCCH may be distinguished from each other using a cyclically shifted sequence having a different Cyclic Shift (CS) value. The cyclically shifted sequence may be generated by cyclically shifting a base sequence by a specific CS amount. The specific CS amount is indicated by a CS index. The number of available CSs may be different depending on delay spread of a channel A variety of types of sequences may be used as the base sequence, and the CAZAC sequence is an example of the sequences.

Furthermore, the amount of control information that may be transmitted by UE in one subframe may be determined depending on the number of SC-FDMA symbols which may be used to send the control information (i.e., SC-FDMA symbols other than SC-FDMA symbols which are used to send a Reference Signal (RS) for the coherent detection of a PUCCH).

In a 3GPP LTE system, a PUCCH is defined as a total of 7 different formats depending on control information that is transmitted, a modulation scheme, and the amount of control information. The attributes of Uplink Control Information (UCI) transmitted according to each PUCCH format may be summarized as in Table 7 below.

TABLE 7

| PUCCH Format | Uplink Control Information (UCI) |
|---|---|
| Format 1 | Scheduling Request(SR) (unmodulated waveform) |
| Format 1a | 1-bit HARQ ACK/NACK with/without SR |
| Format 1b | 2-bit HARQ ACK/NACK with/without SR |

TABLE 7-continued

| PUCCH Format | Uplink Control Information (UCI) |
|---|---|
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

The PUCCH format 1 is used for SR-only transmission. In the case of SR-only transmission, a not-modulated waveform is applied. This is described in detail later.

The PUCCH format 1a or 1b is used to send HARQ ACK/NACK. If HARQ ACK/NACK is solely transmitted in a specific subframe, the PUCCH format 1a or 1b may be used. Alternatively, HARQ ACK/NACK and an SR may be transmitted in the same subframe using the PUCCH format 1a or 1b.

PUCCCH format 2 is used for transmission of CQI, and PUCCH format 2a or 2b is used for transmission of CQI and HARQ ACK/NACK. In the case of extended CP, PUCCH format 2 may be used for transmission of CQI and HARQ ACK/NACK.

PUCCH format 3 is used for carrying an encoded UCI of 48 bits. PUCCH format 3 can carry HARQ ACK/NACK about a plurality of serving cells, SR (if exists), and a CSI report about one serving cell.

FIG. 8 shows an example of a form in which the PUCCH formats are mapped to the PUCCH region of the uplink physical resource block in a wireless communication system to which an embodiment of the present invention may be applied.

In FIG. 8, $N_{RB}^{UL}$ is indicative of the number of RBs in uplink, and $0, 1, \ldots, N_{RB}^{UL}-1$ means the number of physical RBs. Basically, a PUCCH is mapped to both edges of an uplink frequency block. As shown in FIG. 8, the PUCCH format 2/2a/2b is mapped to a PUCCH region indicated by m=0, 1. This may represent that the PUCCH format 2/2a/2b is mapped to RBs located at a band edge. Furthermore, the PUCCH format 2/2a/2b and the PUCCH format 1/1a/1b may be mixed and mapped to a PUCCH region indicated by m=2. Furthermore, the PUCCH format 1/1a/1b may be mapped to a PUCCH region indicated by m=3, 4, 5. UEs within a cell may be notified of the number $N_{RB}^{(2)}$ of PUCCH RBs which may be used by the PUCCH format 2/2a/2b through broadcasting signaling.

The PUCCH format 2/2a/2b is described below. The PUCCH format 2/2a/2b is a control channel for transmitting channel measurement feedback (i.e., a CQI, a PMI, and an RI).

The report cycle of channel measurement feedback (hereinafter commonly called "CQI information") and a frequency unit (or frequency resolution) to be measured may be controlled by an eNB. In a time domain, a periodic or aperiodic CQI report may be supported. The PUCCH format 2 may be used for a periodic report, and a PUSCH may be used for an aperiodic report. In the case of an aperiodic report, an eNB may instruct UE to carry an individual CQI report on a resource scheduled to transmit uplink data.

FIG. 9 shows the structure of a CQI channel in the case of a normal CP in a wireless communication system to which an embodiment of the present invention may be applied.

The SC-FDMA symbols 1 and 5 (i.e., the second and the sixth symbols) of the SC-FDMA symbols 0 to 6 of one slot are used to transmit a demodulation reference signal (DMRS), and the remaining SC-FDMA symbols of the SC-FDMA symbols 0 to 6 of the slot may be used to CQI information. Meanwhile, in the case of an extended CP, one SC-FDMA symbol (SC-FDMA symbol 3) is used for DMRS transmission.

In the PUCCH format 2/2a/2b, modulation by a CAZAC sequence is supported, and a QPSK-modulated symbol is multiplied by a CAZAC sequence of a length 12. A Cyclic Shift (CS) of the sequence is changed between a symbol and a slot. Orthogonal covering is used for a DMRS.

A reference signal (DMRS) is carried on 2 SC-FDMA symbols that belong to 7 SC-FDMA symbols included in one slot and that is spaced at 3 SC-FDMA symbols. CQI information is carried on the remaining 5 SC-FDMA symbols of the 7 SC-FDMA symbols. Two RSs are used in one slot in order to support high-speed UE. Furthermore, UEs are distinguished from each other using Cyclic Shift (CS) sequences. CQI information symbols are modulated into all SC-FDMA symbols and transferred. The SC-FDMA symbols consist of one sequence. That is, UE modulates a CQI using each sequence and sends the CQI.

The number of symbols which may be transmitted in one TTI is 10, and the modulation of CQI information is determined up to QPSK. If QPSK mapping is used for an SC-FDMA symbol, a CQI value of 10 bits may be carried on one slot because a CQI value of 2 bits may be carried on the SC-FDMA symbol. Accordingly, a CQI value having a maximum of 20 bits may be carried on one subframe. Frequency domain spread code is used to spread CQI information in a frequency domain.

A CAZAC sequence (e.g., ZC sequence) of a length 12 may be used as the frequency domain spread code. Control channels may be distinguished from each other by applying CAZAC sequences having different cyclic shift values. IFFT is performed on frequency domain-spread CQI information.

12 different UEs may be subjected to orthogonal multiplexing on the same PUCCH RB by 12 cyclic shifts having the same interval. In the case of a normal CP, a DMRS sequence on the SC-FDMA symbols 1 and 5 (on an SC-FDMA symbol 3 in the case of an extended CP) are similar to a CQI signal sequence on a frequency domain, but modulation, such as CQI information, is not applied to the DMRS sequence.

UE may be semi-statically configured by higher layer signaling so that it periodically reports different CQI, PMI and RI Types on PUCCH resources indicated by PUCCH resource indices $n_{PUCCH}^{(1,\tilde{p})}$, $n_{PUCCH}^{(2,\tilde{p})}$ and $n_{PUCCH}^{(3,\tilde{p})}$. In this case, the PUCCH resource index $n_{PUCCH}^{(2,\tilde{p})}$ is information indicative of a PUCCH region that is used to transmit the PUCCH format 2/2a/2b and the value of a Cyclic Shift (CS) to be used.

Hereinafter, the PUCCH format 1a and 1b is described below.

In the PUCCH format 1a/1b, a symbol modulated using a BPSK or QPSK modulation scheme is multiplied by a CAZAC sequence of a length 12. For example, the results of a modulation symbol d(0) by a CAZAC sequence r(n)(n=0, 1, 2, . . . , N−1) of a length N become y(0), y(1), y(2), . . . , y(N−1). The symbols y(0), . . . , y(N−1) may be called a block of symbols. After the modulation symbol is multiplied by the CAZAC sequence, block-wise spread using an orthogonal sequence is applied.

A Hadamard sequence of a length 4 is used for common ACK/NACK information, and a Discrete Fourier Transform (DFT) sequence of a length 3 is used for shortened ACK/NACK information and a reference signal.

In the case of an extended CP, a Hadamard sequence of a length 2 is used in a reference signal.

FIG. 10 shows the structure of an ACK/NACK channel in the case of a normal CP in a wireless communication system to which an embodiment of the present invention may be applied.

FIG. 10 illustrates a PUCCH channel structure for transmitting HARQ ACK/NACK without a CQI.

A Reference Signal (RS) is carried on 3 contiguous SC-FDMA symbol that belong to 7 SC-FDMA symbols included in one slot and that are placed in a middle portion, and an ACK/NACK signal is carried on the remaining 4 SC-FDMA symbols of the 7 SC-FDMA symbols.

Meanwhile, in the case of an extended CP, an RS may be carried on 2 contiguous symbols placed in the middle of one slot. The number and positions of symbols used in an RS may be different depending on control channels, and the number and positions of symbols used in an ACK/NACK signal associated with the control channels may be changed depending on the number and positions of symbols used in the RS.

ACK information (not-scrambled state) of 1 bit and 2 bits may be represented as one HARQ ACK/NACK modulation symbol using respective BPSK and QPSK modulation schemes. Positive ACK (ACK) may be encoded as "1", and negative ACK (NACK) may be encoded as "0".

When a control signal is to be transmitted within an allocated bandwidth, two-dimensional spreading is applied in order to increase multiplexing capacity. That is, in order to increase the number of UEs or the number of control channels that may be multiplexed, frequency domain spreading and time domain spreading are used at the same time.

In order to spread an ACK/NACK signal in a frequency domain, a frequency domain sequence is used as a base sequence. A Zadoff-Chu (ZC) sequence which is one of CAZAC sequences, may be used as the frequency domain sequence. For example, by applying a different Cyclic Shift (CS) to a ZC sequence which is a base sequence, different UEs or different control channels may be multiplexed. The number of CS resources supported in a SC-FDMA symbol for PUCCH RBs for transmitting HARQ ACK/NACK is configured by a cell-specific upper layer signaling parameter $\Delta_{shift}^{PUCCH}$.

An ACK/NACK signal spread in a frequency domain is spread in a time domain using orthogonal spreading code. A Walsh-Hadamard sequence or DFT sequence may be used as the orthogonal spreading code. For example, an ACK/NACK signal may be spread for 4 symbols using an orthogonal sequence w0, w1, w2, or w3 of a length 4. Furthermore, an RS is also spread using an orthogonal sequence of a length 3 or length 2. This is called Orthogonal Covering (OC).

A plurality of UEs may be multiplexed using a Code Division Multiplexing (CDM) method using CS resources in a frequency domain and OC resources in a time domain, such as those described above. That is, ACK/NACK information and RSs of a large number of UEs may be multiplexed on the same PUCCH RB.

The number of spreading code supported for ACK/NACK information is restricted by the number of RS symbols with respect to such time domain spreading CDM. That is, the multiplexing capacity of an RS is smaller than the multiplexing capacity of ACK/NACK information because the number of SC-FDMA symbols for RS transmission is smaller than the number of SC-FDMA symbols for ACK/NACK information transmission.

For example, in the case of a normal CP, ACK/NACK information may be transmitted in 4 symbols. 3 pieces of orthogonal spreading code not 4 are used for ACK/NACK information. The reason for this is that only 3 pieces of orthogonal spreading code may be used for an RS because the number of symbols for RS transmission is limited to 3.

In case that 3 symbols of one slot may be used for RS transmission and 4 symbols of the slot may be used for ACK/NACK information transmission in a subframe of a normal CP, for example, if 6 Cyclic Shifts (CSs) may be used in a frequency domain and 3 Orthogonal Cover (OC) resources may be used in a time domain, HARQ ACK from a total of 18 different UEs may be multiplexed within one PUCCH RB. In case that 2 symbols of one slot are used for RS transmission and 4 symbols of one slot are used for ACK/NACK information transmission in a subframe of an extended CP, for example, if 6 CSs may be used in a frequency domain and 2 OC resources may be used in a time domain, HARQ ACK from a total of 12 different UEs may be multiplexed within one PUCCH RB.

The PUCCH format 1 is described below. A Scheduling Request (SR) is transmitted in such a way as to make a request or does not make a request that UE is scheduled. An SR channel reuses an ACK/NACK channel structure in the PUCCH format 1a/1b and consists of an On-Off Keying (OKK) method based on an ACK/NACK channel design. An RS is not transmitted in the SR channel. Accordingly, a sequence of a length 7 is used in the case of a normal CP, and a sequence of a length 6 is used in the case of an extended CP. Different cyclic shifts or orthogonal covers may be allocated to an SR and ACK/NACK. That is, in order to send a positive SR, UE sends HARQ ACK/NACK through a resource allocated for the SR. In order to send a negative SR, UE sends HARQ ACK/NACK through a resource allocated for ACK/NACK.

An enhanced-PUCCH (e-PUCCH) format is described below. An e-PUCCH may correspond to the PUCCH format 3 of an LTE-A system. A block spreading scheme may be applied to ACK/NACK transmission using the PUCCH format 3.

Unlike in the existing PUCCH format 1 series or 2 series, the block spreading scheme is a method of modulating control signal transmission using an SC-FDMA method. As shown in FIG. 10, a symbol sequence may be spread in a time domain using Orthogonal Cover Code (OCC) and transmitted. By using OCC, the control signals of a plurality of UEs may be multiplexed on the same RB. In the case of the PUCCH format 2, one symbol sequence is transmitted in a time domain, and the control signals of a plurality of UEs are multiplexed using a Cyclic Shift (CS) of a CAZAC sequence. In contrast, in the case of a block spreading-based PUCCH format (e.g., the PUCCH format 3), one symbol sequence is transmitted in a frequency domain, and the control signals of a plurality of UEs are multiplexed using time domain spreading using OCC.

FIG. 11 shows an example in which 5 SC-FDMA symbols are generated and transmitted during one slot in a wireless communication system to which an embodiment of the present invention may be applied.

FIG. 11 shows an example in which 5 SC-FDMA symbols (i.e., a data part) are generated using OCC of a length=5 (or SF=5) in one symbol sequence during 1 slot and transmitted. In this case, 2 RS symbols may be used during the 1 slot.

In the example of FIG. 11, the RS symbols may be generated from a CAZAC sequence to which a specific CS value has been applied and may be transmitted in a form in which a specific OCC may be applied (or multiplied) to a plurality of RS symbols. Furthermore, in the example of FIG. 8, assuming that 12 modulation symbols are used in each OFDM symbol (or SC-FDMA symbol) and each of the modulation symbols is generated by QPSK, a maximum number of bits capable of being transmitted in one slot are 12×2=24 bits. Accordingly, a total number of bits capable of being transmitted in 2 slots are 48 bits. As described above, if a PUCCH channel structure using a block spreading method is used, control information having an extended size compared to the existing PUCCH format 1 series and 2 series can be transmitted.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnection-Reconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 12 shows an example of component carriers and a carrier aggregation in a wireless communication system to which an embodiment of the present invention may be applied.

FIG. 12a shows the structure of a single carrier used in an LTE system. A component carrier includes a DL CC and an UL CC. One component carrier may have a frequency range of 20 MHz.

FIG. 12b shows the structure of a carrier aggregation used in an LTE-A system. FIG. 12b shows an example in which 3 component carriers each having a frequency size of 20 MHz have been aggregated. Three DL CCs and three UL CCs have been illustrated in FIG. 12, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Cross Carrier Scheduling

In a carrier aggregation system, there are two methods, that is, a self-scheduling method and a cross-carrier scheduling method form the point of view of scheduling for a carrier or a serving cell. Cross-carrier scheduling may also be called cross-component carrier scheduling or cross-cell scheduling.

Cross-carrier scheduling means that a PDCCH (DL grant) and a PDSCH are transmitted in different DL CCs or that a PUSCH transmitted according to a PDCCH (UL grant) transmitted in a DL CC is transmitted through an UL CC different from an UL CC that is linked to the DL CC through which the UL grant has been received.

Whether cross-carrier scheduling will be performed may be activated or deactivate in a UE-specific way, and each UE may be notified through high layer signaling (e.g., RRC signaling) semi-statically.

If cross-carrier scheduling is activated, there is a need for a Carrier Indicator Field (CIF) providing notification that a PDSCH/PUSCH indicated by a PDCCH is transmitted through which DL/UL CC. For example, a PDCCH may allocate a PDSCH resource or PUSCH resource to any one of a plurality of component carriers using a CIF. That is, if a PDCCH on a DL CC allocates a PDSCH or PUSCH resource to one of multi-aggregated DL/UL CCs, a CIF is configured. In this case, a DCI format of LTE-A Release-8 may be extended according to the CIF. In this case, the configured CIF may be fixed to a 3-bit field, and the position of the configured CIF may be fixed regardless of the size of the DCI format. Furthermore, a PDCCH structure (resource mapping based on the same coding and the same CCE) of LTE-A Release-8 may be reused.

In contrast, if a PDCCH on a DL CC allocates a PDSCH resource on the same DL CC or allocates a PUSCH resource on a single-linked UL CC, a CIF is not configured. In this case, the same PDCCH structure (resource mapping based on the same coding and the same CCE) and DCI format as those of LTE-A Release-8 may be used.

If cross-carrier scheduling is possible, UE needs to monitor a PDCCH for a plurality of pieces of DCI in the control region of a monitoring CC based on a transmission mode and/or bandwidth corresponding to each CC. Accordingly, there is a need for the configuration of a search space and PDCCH monitoring capable of supporting such monitoring.

In a carrier aggregation system, a UE DL CC set is indicative of a set of DL CCs scheduled so that UE receives a PDSCH. A UE UL CC set is indicative of a set of UL CCs scheduled so that UE transmits a PUSCH. Furthermore, a PDCCH monitoring set is indicative of a set of one or more DL CCs for performing PDCCH monitoring. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. DL CCs included in a PDCCH monitoring set may be configured so that self-scheduling for a linked UL CC is always possible. Such a UE DL CC set, UE UL CC set, and PDCCH monitoring set may be configured in a UE-specific, UE group-specific, or cell-specific way.

If cross-carrier scheduling is deactivated, it means that a PDCCH monitoring set is always the same as UE DL CC set. In this case, there is no indication, such as separate signaling for a PDCCH monitoring set. However, if cross-carrier scheduling is activated, a PDCCH monitoring set may be defined in a UE DL CC set. That is, in order to schedule a PDSCH or PUSCH for UE, an eNB transmits a PDCCH through a PDCCH monitoring set only.

FIG. 13 shows an example of the structure of a subframe according to cross-carrier scheduling in a wireless communication system to which an embodiment of the present invention may be applied.

FIG. 13 shows an example in which 3 DL CCs are aggregated in a DL subframe for LTE-A UE and a DL CC "A" has been configured as a PDCCH monitoring DL CC. IF a CIF is not used, each DL CC may send a PDCCH for scheduling its PDSCH without a CIF. In contrast, if a CIF is used through higher layer signaling, only the single DL CC "A" may send its PDSCH or a PDCCH for scheduling a PDSCH of a different CC using the CIF. In this case, the DL CCs "B" and "C" not configured as PDCCH monitoring DL CCs do not send a PDCCH.

D2D(Device-to-Device) Communication

Device-to-Device (D2D) communication technology refers to direct communication between geographically adjacent UEs without going through an infrastructure such as an eNB.

For D2D communication technology, commercially available technologies such as Wi-Fi direct and Bluetooth that mainly use an unlicensed frequency band have been developed. However, the development and standardization of D2D communication technologies using a licensed frequency band are under way with the aim of improving the utilization of cellular systems.

In general, D2D communication is limitedly used as a term indicative of communication between things or thing intelligence communication. In an embodiment of the present invention, however, D2D communication may include all types of communication between a variety of types of devices having a communication function, such as smart phones and personal computers, in addition to simple devices having a communication function.

FIG. 14 is a diagram conceptually illustrating D2D communication in a wireless communication system to which an embodiment of the present invention may be applied.

FIG. 14a shows an existing communication method based on an eNB. UE1 may send data to an eNB in uplink, and the eNB may send data to UE2 in downlink. Such a communication method may be called an indirect communication method through an eNB. An Un link (i.e., a link between eNBs or a link between an eNB and a relay node, which may be called a backhaul link), that is, a link defined in an existing wireless communication system, and/or an Uu link (i.e., a link between an eNB and UE or a link between a relay node and UE, which may be called an access link) may be related to the indirect communication method.

FIG. 14b shows a UE-to-UE communication method, that is, an example of D2D communication. The exchange of data between UEs may be performed without the intervention of an eNB. Such a communication method may be called a direct communication method between devices. The D2D direct communication method has advantages of reduced latency and the use of lesser radio resources compared to the existing indirect communication method through an eNB.

FIG. 15 shows an example of various scenarios of D2D communication to which a method proposed in this specification may be applied.

A scenario for D2D communication may be basically divided into (1) an out-of-coverage network, (2) a partial-coverage network, and (3) an in-coverage network depending on where UE1 and UE2 are placed within cell coverage (i.e., in-coverage) and out of cell coverage (i.e. out-of-coverage).

The in-coverage network may be divided into an in-coverage-single-cell and an in-coverage-multi-cell depending on the number of cells corresponding to coverage of an eNB.

FIG. 15(a) shows an example of an out-of-coverage network scenario for D2D communication.

The out-of-coverage network scenario means that D2D communication is performed between D2D UEs without control of an eNB.

From FIG. 15(a), it may be seen that only UE1 and UE2 are present and the UE1 and the UE2 perform direct communication.

FIG. 15(b) shows an example of a partial-coverage network scenario for D2D communication.

The partial-coverage network scenario means that D2D communication is performed between D2D UE placed within network coverage and D2D UE placed out of the network coverage.

From FIG. 15(b), it may be seen that UE1 placed within network coverage and UE2 placed out of the network coverage perform communication.

FIG. 15(c) shows an example of an in-coverage-single-cell scenario, and FIG. 15(d) shows an example of an in-coverage-multi-cell scenario.

The in-coverage network scenario means that D2D UEs perform D2D communication through control of an eNB within network coverage.

In FIG. 15(c), UE1 and UE2 are placed within the same network coverage (or cell) and perform D2D communication under the control of an eNB.

In FIG. 15(d), UE1 and UE2 are placed within network coverage, but are placed within different network coverage. Furthermore, the UE1 and the UE2 perform D2D communication under the control of eNBs managing each of network coverage.

D2D communication is described in more detail below.

D2D communication may be performed in the scenarios of FIG. 15, but may be commonly performed within network coverage (in-coverage) and out of network coverage (out-of-coverage). A link used for D2D communication (i.e., direct communication between UEs) may be called a D2D link, a directlink, or a sidelink, but is hereinafter generally called a sidelink, for convenience of description.

Sidelink transmission may be performed in an uplink spectrum in the case of FDD and may be performed in an uplink (or downlink) subframe in the case of TDD. Time Division Multiplexing (TDM) may be used for the multiplexing of sidelink transmission and uplink transmission.

Sidelink transmission and uplink transmission are not occurred at the same time. Sidelink transmission is not occurred in a sidelink subframe which partially or generally overlaps an uplink subframe or UpPTS used for uplink transmission. Furthermore, the transmission and reception of a sidelink are also not occurred at the same time.

The structure of an uplink physical resource may be identically used as the structure of a physical resource used for sidelink transmission. However, the last symbol of a sidelink subframe includes a guard period and is not used for sidelink transmission.

A sidelink subframe may include an extended Cyclic Prefix (CP) or a normal CP.

D2D communication may be basically divided into discovery, direct communication, and synchronization.

Discovery

D2D discovery may be applied within network coverage (including an inter-cell and an intra-cell). In inter-cell discovery, both synchronous and asynchronous cell deployments may be taken into consideration. D2D discovery may be used for various commercial purposes, such as advertising, issuing coupons, and finding friends, to UE within a proximity region.

If UE1 has a role of sending a discovery message, the UE1 sends a discovery message, and UE2 receives the discovery message. The transmission and reception roles of the UE1 and the UE2 may be changed. Transmission from the UE1 may be received by one or more UE(s), such as the UE2.

The discovery message may include a single MAC PDU. In this case, the single MAC PDU may include a UE ID and an application ID.

A physical sidelink discovery channel (PSDCH) may be defined as a channel for sending the discovery message. The structure of a PUSCH may be reused as the structure of the PSDCH.

Two types Type 1 and Type 2 may be used as a resource allocation method for D2D discovery.

In the case of Type 1, an eNB may allocate a resource for sending a discovery message in a non-UE-specific way.

To be specific, a radio resource pool comprising a plurality of subframe sets and a plurality of resource block sets for transmitting and receiving a discovery message within a specific period (in what follows, 'discovery period') is allocated, and a discovery transmitting UE selects a specific resource within the radio resource pool in an arbitrary manner and transmits a discovery message.

The periodic discovery resource pool can be allocated for transmission of a discovery signal in a semi-static manner. The configuration information of a discovery resource pool for discovery transmission includes a discovery period, a subframe set which can be used for transmission of a discovery signal within the discovery period, and information about a resource block set. The configuration information of the discovery resource pool can be transmitted to the UE through upper layer signaling. In the case of an in-coverage UE, the discovery resource pool for discovery transmission is set up by an eNB and can be informed to the UE through RRC signaling (for example, System Information Block (SIB)).

The discovery resource pool allocated for discovery within one discovery period can be multiplexed to a time-frequency resource block of the same size through TDM and/or FDM scheme, where the time-frequency resource block of the same size can be called a 'discovery resource'. A discovery resource can be set as one subframe unit and include two Physical Resource Blocks (PRBs) per slot in each subframe. One UE can use one discovery resource for transmission of a discovery MAC PDU.

Also, a UE can transmit a discovery signal repeatedly within a discovery period for transmission of one transport block. Transmission of a MAC PDU by one UE can be repeated (for example, four times) contiguously or non-contiguously within the discovery period (namely radio resource pool). The transmission times of a discovery signal for one transmission block can be transmitted to the UE through upper layer signaling.

UE may randomly select a first discovery resource in a discovery resource set which may be used for the repetitive transmission of an MAC PDU and may determine the remaining discovery resources in relation to the first discovery resource. For example, a specific pattern may be previously determined, and a next discovery resource may be determined according to the predetermined specific pattern depending on the position of a discovery resource first selected by UE. Alternatively, UE may randomly select each discovery resource within a discovery resource set which may be used for the repetitive transmission of an MAC PDU.

In the case of Type 2, a resource for discovery message transmission is allocated in a UE-specific way. Type 2 is subdivided into Type-2A and Type-2B. Type-2A is a method of allocating, by an eNB, a resource at the instance at which UE sends a discovery message within a discovery cycle, and Type-2B is a method of allocating resources semi-persistently.

In the case of Type-2B, RRC_CONNECTED UE requests an eNB to allocate a resource for the transmission of a D2D discovery message through RRC signaling. Furthermore, the eNB may allocate the resource through RRC signaling. When the UE transits to an RRC IDLE state or when the eNB withdraws resource allocation through RRC signaling, the UE releases the most recently allocated transmission resource. As described above, in the case of Type-2B, a radio resource may be allocated through RRC signaling, and the activation/deactivation of an allocated radio resource may be determined by a PDCCH.

A radio resource pool for receiving a discovery message may be configured by an eNB, and UE may be notified of the configured radio resource pool through RRC signaling (e.g., a System Information Block (SIB)).

Discovery message reception UE monitors both the aforementioned discovery resource pools of Type 1 and Type 2 in order to receive a discovery message.

2) Direct Communication

The region to which D2D direct communication is applied includes a network coverage edge area (i.e., edge-of-coverage) in addition to inside and outside network coverage (i.e., in-coverage and out-of-coverage). D2D direct communication may be used for purposes, such as Public Safety (PS).

If UE1 has a role of direct communication data transmission, the UE1 sends direct communication data, and UE2 receives the direct communication data. The transmission and reception roles of the UE1 and the UE2 may be changed. The direct communication transmission from the UE1 may be received by one or more UE(s), such as the UE2.

D2D discovery and D2D communication may be independently defined without being associated with each other. That is, in groupcast and broadcast direct communication, D2D discovery is not required. If D2D discovery and D2D direct communication are independently defined as described above, UEs do not need to perceive adjacent UE. In other words, in the case of groupcast and broadcast direct communication, all reception UEs within a group are not required to be adjacent to each other.

A physical sidelink shared channel (PSSCH) may be defined as a channel for sending D2D direct communication data. Furthermore, a physical sidelink control channel (PSCCH) may be defined as a channel for sending control information (e.g., Scheduling Assignment (SA), a transmission format for direct communication data transmission, etc) for D2D direct communication. The structure of a PUSCH may be reused as the structures of the PSSCH and the PSCCH.

Two types of mode 1 and mode 2 may be used as a resource allocation method for D2D direct communication.

Mode 1 refers to a method of scheduling, by an eNB, data for D2D direct communication by UE or a resource used for UE to send control information. Mode 1 is applied to in-coverage.

An eNB configures a resource pool for D2D direct communication. In this case, the resource pool for D2D communication may be divided into a control information pool and a D2D data pool. When an eNB schedules control information and a D2D data transmission resource within a pool configured for transmission D2D UE using a PDCCH or ePDCCH(enhanced PDCCH), the transmission D2D UE sends control information and D2D data using the allocated resource.

Transmission UE requests a transmission resource from an eNB. The eNB schedules a resource for sending control information and D2D direct communication data. That is, in the case of mode 1, the transmission UE needs to be in the RRC_CONNECTED state in order to perform D2D direct communication. The transmission UE sends a scheduling request to the eNB, and a Buffer Status Report (BSR) procedure is performed so that the eNB may determine the amount of resources requested by the transmission UE.

Reception UEs monitors a control information pool. When decoding control information related to reception UE, the reception UE may selectively decode D2D data transmission related to corresponding control information. The reception UE may not decode a D2D data pool based on a result of the decoding of the control information.

Mode 2 refers to a method of randomly selecting, by UE, a specific resource in a resource pool in order to send data or control information for D2D direct communication. Mode 2 is applied to out-of-coverage and/or edge-of-coverage.

In mode 2, a resource pool for sending control information and/or a resource pool for sending D2D direct communication data may be pre-configured or may be configured semi-statically. UE is supplied with a configured resource pool (time and frequency) and selects a resource for D2D communication transmission in the resource pool. That is, the UE may select a resource for control information transmission in a control information resource pool in order to send control information. Furthermore, the UE may select a resource in a data resource pool in order to send D2D direct communication data.

In D2D broadcast communication, control information is transmitted by broadcasting UE. Control information is explicitly and/or implicitly indicative of the position of a resource for data reception in relation to a physical channel (i.e., a PSSCH) on which D2D direct communication data is carried.

3) Synchronization

A D2D Synchronization Signal/sequence (D2DSS) can be used by a UE to obtain time-frequency synchronization. In particular, since the eNB is unable to control a UE located beyond network coverage, a new signal and procedure can be defined to establish synchronization among UEs. A D2D synchronization signal can be called a sidelink synchronization signal.

A UE transmitting a D2D synchronization signal periodically can be called a D2D synchronization source or a sidelink synchronization source. In case a D2D synchronization source is an eNB, the structure of a D2D synchronization signal being transmitted can be identical to that of PSS/SSS. In case the D2D synchronization source is not an eNB (for example, a UE or GNSS (Global Navigation Satellite System)), the structure of a D2D synchronization signal being transmitted can be newly defined.

The D2D synchronization signal is transmitted periodically with a period not shorter than 40 ms. Each UE can have a physical-layer D2D synchronization identity. The physical-layer D2D synchronization identifier may be called a physical-layer sidelink synchronization identity or simply a D2D synchronization identifier.

The D2D synchronization signal includes a D2D primary synchronization signal/sequence and a D2D secondary synchronization signal/sequence. These signals can be called a primary sidelink synchronization signal and a secondary sidelink synchronization signal, respectively.

Before transmitting a D2D synchronization signal, the UE may first search for a D2D synchronization source. If a D2D synchronization source is found, the UE can obtain time-frequency synchronization through a D2D synchronization signal received from the D2D synchronization source found. And the corresponding UE can transmit the D2D synchronization signal.

Moreover, a channel for transmitting necessary information to be used for device-to-device communication as well as for synchronization may be required, and a channel for this purpose may be defined. Such a channel may be referred to as PD2DSCH (Physical D2D Synchronization Channel) or PSBCH (Physical Sidelink Broadcast Channel In D2D communication, direct communication between two devices is described below as an example, for clarity, but the scope of the present invention is not limited thereto. The same principle described in an embodiment of the present invention may be applied to D2D communication between a plurality of two or more devices.

Hereinafter, methods for transmitting D2D control information or D2D data or both, which are proposed according to embodiments of the present invention, are described in detail. Hereinafter, in describing the present invention, the D2D control information may be referred to as D2D Scheduling Assignment (SA) or simply SA, and also D2D data may also be simply referred to as Data.

As described above, D2D link may be represented as a sidelink

Furthermore, D2D control information may be represented as Sidelink Control Information (SCI), and the D2D control information may be transmitted and received through a physical sidelink control channel (PSCCH).

Furthermore, D2D data may be transmitted and received through a physical sidelink shared channel (PSSCH), and the transmission/reception of the D2D data may be represented as the transmission and reception of PSSCHs.

In performing D2D communication, D2D control information may be defined in order for D2D UE to demodulate D2D data.

As described above, the D2D control information may be represented as SCI, and the D2D control information and the SCI are interchangeably used hereinafter.

In this case, the D2D control information may be transmitted through a channel (or as a separate signal) separate from a D2D communication channel through which the D2D data is delivered As described above, the D2D communication channel may be represented as a PSSCH, and the D2D communication channel and the PSSCH are interchangeably used hereinafter.

Furthermore, methods to be described hereinafter may be identically applied when control information required to deliver a D2D discovery message is separately transmitted.

The D2D control information may include some of or the entire information, such as a New Data Indicator (NDI), Resource Allocation (RA) (or a resource configuration), a Modulation and Coding Scheme/Set (MCS), a Redundancy Version (RV), and a Tx UE ID.

The D2D control information may have a different combination of pieces of information depending on a scenario to which the D2D communication is applied.

In general, control information (CI) may be decoded prior to a data channel because it is used to demodulate the data channel.

Accordingly, pieces of UE that receive the control information may need to be aware the location of time and frequency resources through which the control information is transmitted and related parameters for the demodulation of the data channel For example, in an LTE (-A) system, in the case of a PDCCH, a UE ID-based hashing function is used by a transmission stage (e.g., an eNB) and a reception stage (e.g., UE) in common so that the UE can be aware that the PDCCH will be transmitted at a specific location of specific symbols of each subframe.

Furthermore, in an LTE (-A) system, in the case of a BCH, an eNB and UE share information, indicating that system information is delivered in a specific symbol of a specific subframe (SF) in a cycle of 40 ms, in advance.

As described above, in order for UE to properly obtain the control information, demodulation-related information (or parameter) of the control information may need to be sufficiently delivered to the UE in advance.

Likewise, in a system supporting D2D communication, in order for D2D UE to successfully demodulate D2D control information, a parameter related to the transmission of the D2D control information may need to be shared by the D2D UE in advance.

The parameter related to the transmission of the D2D control information may include, for example, a subframe/slot index, a symbol index, or an RB index.

Furthermore, the parameter related to the transmission of the D2D control information may be the DCI of a specific format and may be obtained through a PDCCH from an eNB or another D2D UE.

The DCI of the specific format means a newly defined DCI format and may be, for example, a DCI format 5.

In an embodiment, the D2D control information may be designated to be transmitted in all of subframes designated as D2D subframes (i.e., subframes designated for D2D transmission), a series of subframes (a set of subframes or a subframe set) that belong to all the subframes and that has a specific index, or a subframe set having a specific cycle.

Such potential transmission subframe or subframe set of the D2D control information may be recognized by UE in advance through (higher layer) signaling or based on UE-specific information (e.g., a UE ID) in such a manner that the UE may autonomously calculate the transmission subframe or subframe set.

Furthermore, a resource region in which a D2D data channel is delivered and a resource region in which D2D control information is delivered may be differently configured in a time domain.

That is, the D2D control information may be defined to be transmitted in a designated time unit, that is, periodically (or while hopping in a designated time-frequency domain pattern). The D2D data channel may be defined to be delivered only in a resource region indicated by the D2D control information.

Unlike a method for transmitting D2D control information and D2D data together, the method means a method in which a case where the D2D control information is transmitted and a case where D2D data is transmitted are independently operated.

Specifically, if the D2D control information and the D2D data are separately transmitted, (1) parameters (e.g., scrambling, CRC, CRC masking, or demodulation sequence generation parameters) applied to the D2D control information and the D2D data are independently set or (2) a parameter applied to the D2D data is indicated through the D2D control information.

In the case of (2), D2D UE attempts (e.g., explicit or blind decoding) monitoring and decoding at the D2D control information using a potential parameter in a (potential) resource (i.e., subframe or subframe set) in which the D2D control information is reserved to be transmitted and does not perform decoding attempts at the D2D control information in a resource region other than the potential resource.

In this case, there is an advantage in that power consumption of UE can be reduced.

Furthermore, if UE demodulates D2D data, the UE has only to demodulate only designated information at a designated point using a parameter and D2D data resource region information obtained through the D2D control information. Accordingly, there is an advantage in that power consumption of UE can be reduced.

In an embodiment for implementing the aforementioned methods, a method for performing, by pieces of UE, blind search (or decoding) on a specific resource region in order to obtain D2D control information at a specific point of time and decoding D2D control information matched with each of the pieces of UE is described below.

In this case, whether D2D control information is matched with each of the pieces of UE may be implemented based on UE-specific information or UE group-specific (UE group-common) information.

That is, only corresponding UE may perform (blind) decoding on D2D control information by applying UE-specific scrambling or CRC masking to the D2D control information, or all of a plurality of pieces of UE (or a group or all) may decode the D2D control information by applying UE-group common scrambling or CRC masking to the D2D control information.

Accordingly, UE or a UE group may obtain information related to D2D data demodulation from D2D control information that has been successfully decoded.

The D2D control information (or SCI) includes a parameter (in this case, including a parameter obtained through blind search from a given D2D control channel set in addition to a predetermined parameter) used in a D2D control channel (PSCCH) in addition to explicit information included in D2D control information.

The parameter used in the D2D control channel may include scrambling, CRC masking, use resource information, and reference signal related parameters.

Accordingly, UE may not perform blind decoding on D2D data.

In other words, UE or a UE group performs blind decoding on D2D control information through a specific parameter at a specific point of time using its own unique information or based on previously (higher-layer) signaled information in order to obtain the D2D control information.

Through such blind decoding, the UE or UE group may obtain both scheduling information related to data demodulation and various parameters used to generate and transmit a D2D control channel (or control information).

Accordingly, the UE or UE group uses the parameter related to the D2D control channel and the decoded scheduling information to decode and demodulate a D2D data channel.

In this case, the D2D data channel may be represented as a physical sidelink shared channel (PSSCH).

The scheduling information may refer to explicit information, such as resource allocation information, an NDI, an MCS, or a Tx UE ID required to demodulate D2 data.

Furthermore, as described above the scheduling information may be represented as Sidelink Control Information (SCI).

UE is not required to perform parameter blind search, such as that performed on a D2D control channel (or a PSCCH) with respect to a D2D data channel (PSSCH), because it uses a parameter through blind search with respect to the D2D control channel without any change or uses a new parameter generated based on the parameter to generate the D2D data channel.

In another embodiment, a D2D control channel and a D2D data channel may be transmitted in the same subframe (from the standpoint of UE or a UE group) or may be implemented to have different cycles in time.

That is, such a method is a method for performing, by UE, blind decoding on a D2D control channel in a specific subframe and demodulating the D2D data of the same subframe based on corresponding information.

In this case, it is assumed that the UE will not perform blind decoding on the D2D data.

Instead, the UE may perform blind decoding on only the D2D control channel so that blind decoding complexity is dependent on only a D2D control channel in a corresponding subframe.

That is, the UE performs blind decoding on only D2D control information in the corresponding subframe.

If UE has to perform blind decoding on D2D data, when D2D control information and D2D data are transmitted in the same subframe, a problem in that the UE' blind decoding trials suddenly increases may be generated.

In this case, the number of pieces of UE capable of detecting D2D control information through blind decoding in a specific subframe may be limited.

That is, if the transmission periods of D2D control information and D2D data are fixed, there may be a case where the D2D control information and the D2D data are transmitted in the same subframe in some situations depending on their cycles.

In this case, if there is a limit to blind decoding trials in a corresponding subframe, the blind decoding trials of a D2D control information channel or a D2D data channel or both may be reduced.

In order to reduce such a problem, the blind decoding of UE may be introduced only in a D2D control channel so as to prevent a limitation to blind decoding trials attributable to a variation of blind decoding complexity.

Furthermore, there is an advantage that the degree of freedom of scheduling for a D2D data channel may be increased by introducing blind decoding in only a D2D control channel.

That is, although D2D control information and D2D data are placed in the same subframe, if blind decoding is applied to a D2D control channel only, there is no limitation to blind decoding complexity.

Accordingly, although a D2D control channel is periodically transmitted in a specific subframe, a subframe for transmitting a D2D data channel may be determined and allocated even without avoiding a subframe in which the D2D control channel is transmitted.

Assuming that a D2D control channel is detected once and then transmitted in a specific subframe after D2D data associated with the D2D control channel is transmitted, D2D control information does not need to be transmitted again in the transmission opportunity subframe (i.e., a D2D control channel transmission period or PSCCH period) of the D2D control channel during a time interval until a subframe in which the D2D data will be transmitted.

Likewise, from the standpoint of UE, blind decoding (or monitoring) may not be performed on a D2D control channel until a D2D data subframe indicated by D2D control information after blind decoding is performed on the D2D control channel In this case, power consumption of the UE can be reduced. This may be differently configured for each piece of UE.

If the period in which a D2D control channel is transmitted (or a PSCCH period) and a subframe offset are differently configured in each of pieces of UE, each of the pieces of UE may be aware of a subframe in which monitoring for D2D control information needs not to be performed.

That is, when each of pieces of UE performs blind decoding on D2D control information in a specific subframe, it may be aware how long it may perform discontinuous reception (DRX) or discontinuous transmission (DTX) by taking into consideration the monitoring subframe period and offset of its own D2D control information.

After receiving and demodulating D2D control information (i.e. scheduling allocation), UE may calculate how long it does not need to monitor D2D control information, that is, it may perform DTX, properly using a specific bit value and D2D control information subframe period (i.e., PSCCH period) information carried on corresponding subframe index, UE ID, or D2D control information.

FIG. 16 is a diagram showing an example of a method for transmitting and receiving D2D control information and D2D data, which is proposed according to an embodiment of the present invention.

In FIG. 16, a C1 1601 is indicative of a resource that belongs to D2D resources allocated to UE1 (or a UE-group 1) and that is used to transmit D2D control information.

The C1 1601 may be obtained through an (E-)PDCCH, an SIB, "preconfigured", or "relaying by UE."

For example, UE may obtain the C1 (or the SCI format 0) through the DCI format 5 transmitted through a PDCCH.

Furthermore, the period of the C1 corresponds to a period #1.

A C2 1602 is indicative of a resource that belongs to D2D resources allocated to UE2 (or a UE-group 2) and that is used to transmit D2D control information.

The period of the C2 corresponds to a period #2.

The periods of the C1 and C2 may be represented as a PSCCH period #1 and a PSCCH period #2, respectively.

In FIG. 16, the first C1 information indicates a parameter related to the transmission of D2D data #1 1603 and indicates various types of information (e.g., scheduling information, such as a DM RS sequence, an MCS, and RA) for reception UE in order to demodulate the D2D data #1.

Furthermore, the first C2 information indicates a parameter related to the transmission of D2D data #2 1604 and indicates various types of information (e.g., scheduling information) for reception UE in order to demodulate the D2D data #2.

In FIG. 16, second C1 information 1605 and second C2 information 1086 indicate parameters (e.g., scheduling information) following the first D2D data #1 1603 and the first D2D data #2 1604, that is, parameters associated with second Data #1 and Data #2 1607.

Each of pieces of UE performs blind decoding on D2D control information, corresponding to each of pieces of UE, with respect to a corresponding subframe because it is previously aware of the location of a subframe for D2D control information where the UE may perform monitoring.

FIG. 17 is a diagram showing another example of a method for transmitting and receiving D2D control information and D2D data, which is proposed according to an embodiment of the present invention.

In FIG. 17, UE may be aware that D2D data (D2D data #1) related to a C1 1701 is delivered in a D2D data #1 subframe 1702 by performing blind decoding on the C1 1701.

Furthermore, if the UE is previously aware that there is no C1 in a subframe 1703 periodically reserved (or allocated) for the purpose of transmitting D2D control information after the C1, the UE may skip the reserved subframe 1703 without performing monitoring or blind decoding.

That is, FIG. 17 shows that UE does not perform additional monitoring and blind decoding on D2D control information in a periodically reserved subframe present between the C1 and the data #1.

In this case, it may be considered that the UE performs a DTX operation in a specific subframe in order to reduce power consumption because it may be previously aware that it does not need to perform monitoring and blind decoding on D2D control information in the specific subframe.

FIG. 18 is a diagram showing yet another example of a method for transmitting and receiving D2D control information and D2D data, which is proposed according to an embodiment of the present invention.

In the example of FIG. 17, UE has skipped blind decoding for all of subframes periodically reserved between the C1 and the data #1.

In contrast, FIG. 18 shows a method for skipping, by UE, a reserved D2D control information subframe from a monitoring subframe only when a previously agreed condition is satisfied without skipping blind decoding for all of reserved D2D control information subframes, if a D2D control information subframe reserved to transmit D2D control information is present between the D2D control information and a D2D data subframe indicated by the D2D control information.

From FIG. 18, it may be seen that UE performs blind decoding in a 1801 and a C13 1803 and skips blind decoding in a C12 1802.

That is, all of the monitoring subframes C11, C12, and C13 of candidate D2D control information between the C11 1801 and data #11 1804 are not skipped.

For example, the UE performs monitoring on the last subframe C13 1803 of the candidate subframes present between the C11 1801 and the data #11 1804 for blind decoding.

In some embodiments, if N D2D control information candidate subframes are present between a D2D control information (or scheduling information) subframe and a D2D data transmission subframe, blind decoding for K candidate subframes placed at the last portion may be skipped.

In this case, the value "k" may be set depending on a system operation.

In some embodiments, if a D2D control information subframe is divided into a subframe used for D2D transmission and a subframe used for D2D reception (i.e., if two types of subframes are present because they cannot be transmitted and received at the same time due to a half-duplex constraint), the blind decoding skip rule may be applied to only the subframe used for D2D transmission.

If there is no distinction between a subframe used for D2D transmission and a subframe used for D2D reception, the blind decoding skip rule may be applied by taking into consideration both the two types (D2D transmission and D2D reception) of subframes.

In some embodiments, if the valid period of D2D control information is present, assuming that additional D2D control information does not arrive during the valid period, UE may neglect D2D control information that arrives between a D2D control information subframe and a D2D data subframe, that is, may apply the blind decoding skip rule.

Furthermore, assuming that D2D control information subframes are used by a plurality of pieces of UE, each of the pieces of UE may calculate a subframe that belongs to the D2D control information subframes and that may be monitored using its own ID or another parameter, such as a D2D subframe index.

In this case, a method for calculating, by each of pieces of UE, its own D2D control information subframe may be performed like a method for calculating a paging subframe that may be monitored by the UE, that is, calculating the index of a subframe that must be received by the UE after waking up from sleep mode using a UE ID and another parameter.

FIG. 19 is a diagram showing an example of a method for configuring D2D control information depending on D2D transmission mode, which is proposed according to an embodiment of the present invention.

FIG. 19 shows that some of resources allocated using each of two D2D resource allocation methods, that is, two types of transmission mode (transmission mode 1 and transmission mode 2), are configured as common resources if the two D2D resource allocation methods are used.

FIG. 19a shows the resource allocation of D2D control information in an in-coverage scenario, that is, transmission mode 1, and FIG. 19b shows the resource allocation of D2D control information in a partial or out-coverage scenario, that is, transmission mode 2.

The resource of control information in transmission mode 1 is indicated by C1 or C2, and the resource of control information in transmission mode 2 is indicated by P or S.

From FIG. 19, it may be seen that the resources C1 and P have been configured to be aligned in the same time resource or the same frequency resource or both.

That is, FIG. 19 shows that the resources C1 and P have been configured as common resources (e.g., cell-specific or UE group-specific).

In the resource configurations of FIG. 19, if UE changes a resource allocation method, it may use the common resource subframe as a fallback subframe in which a D2D control channel may be monitored.

That is, common resources configured using different resource allocation methods may mean candidate subframes in which UE is obliged to monitor D2D control information when mode of a resource allocation method switches.

Accordingly, pieces of UE to which resources have been allocated according to transmission mode 1 or pieces of UE to which resources have been allocated according to transmission mode 2 may need to perform blind decoding on the resource P or C1 corresponding to common resources.

In this case, pieces of UE within a cell may have different resource allocation methods, that is, different types of transmission mode. Resources may be configured so that one piece of UE has the two types of transmission mode.

Transmission mode 1 and transmission mode 2 do not mean only a resource allocation method for D2D communication, but may be concepts indicative of a resource allocation method for D2D discovery.

That is, from the standpoint of a piece of UE, a D2D discovery resource may be set as transmission mode 1 and a D2D communication resource may be set as transmission mode 2, and vice versa.

From the standpoint of a plurality of pieces of UE, transmission mode 1, transmission mode 2, D2D discovery, and D2D communication combinations may be configured in various ways.

In this case, previously designated UE (e.g., a UE group, all of types of UE within a cell, or all of types of D2D-enabled UE) may be defined to monitor a common resource set by defining the concept of a default resource set or common resource set in transmission mode 1 or transmission mode 2.

Timing relations between a Scheduling Grant (SG) (or DCI), Scheduling Assignment (SA), and D2D data transmission in D2D communication, which are proposed according to an embodiment of the present invention, are described in detail below.

A Scheduling Grant (SG) used hereinafter is indicative of Downlink Control Information (DCI) transmitted from an eNB to D2D UE and may mean a parameter related to D2D communication.

The scheduling grant may be transmitted in a PDCCH/EPDCCH and may be represented as a DCI format 5.

Furthermore, the Scheduling Assignment (SA) may be indicative of D2D control information and may mean control information transmitted and received between pieces of D2D UE, including resource allocation information for the transmission and reception of D2D data.

The Scheduling Assignment (SA) may be transmitted through a PSCCH and may be represented as an SCI format 0.

First, contents related to a method for notifying UE of a resource used for D2D data transmission and a resource used for Scheduling Assignment (SA) transmission for transmitting D2D data transmission-related scheduling information are described with reference to Table 8 below.

Furthermore, a method described with reference to Table 3 is only an embodiment, and D2D data transmission and SA transmission may be performed using methods other than the method of Table 8.

In some embodiments, scheduling allocation may be performed and data resources may be allocated using the dynamic control signal (e.g., a PDCCH, an EPDCCH, or a MAC CE) of an eNB.

In some embodiments, resource pools may be previously allocated through an SIB, and UE may be notified of (time-frequency resources) detailed resource allocation information (SA resources and D2D data resources) through a dynamic control signal within the allocated resource range.

In this case, the SA for direct communication may deliver the detailed resource allocation information (e.g., using relative location information or offset information) used in direct data communication.

That is, UE may receive SA and data resource pools through an SIB and may receive detailed SA and data transmission resources through the SA.

If a plurality of resource pools has been previously allocated to UE, SA may be used to indicate one or some of the allocated resource pools.

TABLE 8

| | | Signaling methods | |
|---|---|---|---|
| | | Resource (or resource pool) indication methods (to be used for the following transmission) Being transmitted | |
| Resource Allocation | Scenarios | For Scheduling Assignment | For Data communication |
| Mode 1 (eNB schedules) | In-coverage | SIB (or (E)PDCCH) (This may be triggered by a D2D scheduling request (D-SR)) | SIB (or (E)PDCCH) (This may be triggered by a D2D scheduling request (D-SR)) |
| | Edge-of-coverage | Via other forwarding UE(s) SIB or other sig. forwarding | Via other forwarding UE(s) SIB or other sig. forwarding |
| | Out-overage | Pre-configured or other | Pre-configured or other |
| | | A semi-static resource pool restricting the available resources for data or control or both may be needed | |
| | | D2D communication capable UE shall support at least Mode 1 for in-coverage | |
| Mode 2 (UE selects) | In-coverage | SIB (or (E)PDCCH) | SIB (or (E)PDCCH) |
| | Edge-of-coverage | Via other forwarding UE(s) SIB or other sig. forwarding | Via other forwarding UE(s) SIB or other sig. forwarding |
| | Out-coverage | Pre-configured or other | Pre-configured or other |
| | | The resource pools for data and control may be the same | |
| | | A semi-static and/or pre-configured resource pool restricting the available resources for data or control or both may be needed | |
| | | D2D communication-capable UE shall support Mode 2 for at least edge-of-coverage and/or out-of-coverage | |

In Table 8, Mode 1 and Mode 2 in a D2D resource allocation method may be divided as follows.

From a transmitting UE perspective, UE may operate in the two types of mode for resource allocation:

Mode 1: an eNodeB or rel-10 relay node schedules exact resources used by UE to transmit direct data and direct control information Mode 2: UE on its own selects resources from resource pools to transmit direct data and direct control information Referring to Table 8, resource allocation used for SA transmission and D2D data transmission in Mode 1 and Mode 2 may be implemented through an SIB in the case of the in-coverage scenario. That is, an eNB may notify UE of resource allocation for SA transmission and D2D data transmission through an SIB.

In Table 8, in the case of the out-coverage scenario, UE may be aware of SA resource pools and data resource pools based on resource configuration information that has been pre-configured or received from coverage UE.

In this case, if the UE has to determine detailed resources for SA transmission and D2D data transmission, it may autonomously select SA resources.

Thereafter, the UE may include resources allocated in relation to D2D data transmission in SA contents and transmit the SA contents to D2D reception UE so that the D2D reception UE is aware of a resource region in which D2D data is received.

In this case, in order to reduce information included in the SA contents, resource region information (e.g., time and frequency index) in which SA has been detected may be used as part of D2D data resource allocation information.

That is, the final resource region is calculated using both the SA resource-related information and the SA contents information.

For example, an SA (transmission) resource-related parameter may be used to obtain only time domain information (e.g., a time domain parameter and a subframe index) of a D2D data resource region, and information delivered in SA may be used to provide notification of frequency domain information (e.g., a frequency domain parameter and an RB index).

In some embodiments, the SA resource-related parameter may be used to designate the absolute locations (e.g., time and frequency indices) of D2D data resources, and resource allocation information included in SA contents may be used to provide notification of the relative locations of D2D data resources.

In some embodiments, the SA (transmission) resource-related parameter may be used to provide notification of a random back-off or transmission probability value.

Furthermore, signaling contents transmitted from an eNB to D2D transmission UE may include a resource configuration, an MCS, etc. for direct scheduling allocation.

The signaling contents may be represented as Downlink Control Information (DCI) or a Scheduling Grant (SG).

The timing relation between an eNB-dynamic control signal and an SA transmission time is described in detail below.

If a D2D resource pool is allocated through a System Information Block (SIB) and UE autonomously determines SA resources and resources for D2D data transmission based on the allocated D2D resource pool, an eNB-dynamic control signal, such as a PDCCH/EPDCCH, may not be required.

In a situation in which all resources are managed by an eNB as in the in-coverage scenario, however, if an eNB controls D2D SA and resource allocation for direct data in real time, the utilization of the resources may become further efficient. In this case, an eNB-dynamic control signal is necessary.

Accordingly, a method using an eNB-dynamic control signal (e.g., a scheduling grant or an MAC CE using DCI) and when D2D transmission UE that has received an eNB-dynamic control signal (i.e., an eNB scheduling grant for SA and/or data for D2D) will transmit SA to D2D reception UE need to be clearly defined.

As described above, an eNB may transmit an SG to D2D UE for (1) scheduling regarding SA transmission and (2) scheduling regarding data transmission.

In this case, the scheduling may mean scheduling related to D2D transmission, and scheduling information may include resource allocation information, an MCS, an RV, and an NDI.

In some embodiments, an eNB may transmit a single SG to D2D UE in order to indicate whether it is scheduling regarding SA transmission or scheduling regarding D2D data transmission.

In this case, an implement may be possible so that an implicit association between SA and data is formed and D2D UE is capable of estimating each of pieces of (SA, data) scheduled information.

For example, D2D UE may receive an SG related to SA transmission from an eNB and check the location or approximate location of D2D data transmission resources having linkage to the SA (or the same is true of scheduling information).

In some embodiments, D2D UE may receive an SG related to data transmission from an eNB and check a resource location and relation information related to SA transmission having linkage to data.

A method 1 to a method 4 below shows timing relations between a dynamic control signal transmitted from an eNB to D2D transmission UE and SA transmitted from D2D transmission UE to D2D reception UE.

That is, the timing relation between the reception of a Scheduling Grant (DCI) from an eNB and the transmission of Scheduling Assignment (SA) or data or both from D2D transmission UE to D2D reception UE is described in detail below in connection with the method 1 to the method 4.

Method 1

FIG. 20 is a diagram illustrating an example of the timing relationship between SG reception and SA transmission in a D2D UE proposed in this specification.

FIG. 20 shows that, if D2D SA (scheduling assignment) SFs (subframes) 2001 and 2002 are periodically configured, when a D2D transmission UE receives a scheduling grant (SG) from an eNB during the D2D SA SF period (or PSCCH period) (S2010), the D2D transmission UE transmits a scheduling assignment in the first D2D SA SF 2002 that comes after the received SG SF (S2020).

Method 2

FIGS. 21 and 22 are a flowchart illustrating an example of the timing relation between SG reception and SA transmission in D2D UE, which is proposed according to an embodiment of the present invention.

FIG. 21 shows a method for transmitting, by D2D transmission UE, SA to D2D reception UE by taking into consideration the processing time of UE (or a system) after receiving an SG from an eNB.

That is, the D2D transmission UE receives SG from the eNB, configures an SA based on the received SG, and transmits the SA to the D2D reception UE by taking into consideration the time taken to transmit the SA, that is, processing delay.

In this case, if the processing delay is taken into consideration, the SA transmission of the D2D transmission UE may be performed in a fourth subframe #n+4 after an SG subframe (subframe #n) received from the eNB.

That is, when D2D transmission UE receives an SG in a subframe #n at step S2101, it may transmit SA to D2D reception UE in a fourth subframe #n+4 2101 at step S2102.

In this case, if the fourth subframe #n+4 2201 is not a D2D SA subframe, the D2D transmission UE may transmit the SG in a D2D SA subframe 2202 that first arrives after the fourth subframe #n+4.

In contrast, if the D2D transmission UE receives the SG from the eNB in the subframe #n and a D2D SA SF that first arrives subsequently is present in the fourth subframe #n+4, the D2D transmission UE determines that the D2D SA SF is not valid or available.

Accordingly, the D2D transmission UE transmits the D2D SA in a subsequent (or next period) available D2D SA SF.

The n+4 is an embodiment and may be generalized as "n+k", that is, D2D SA is transmitted in a k-th SA SF after the SG is received.

The value "k" may be configured by taking into consideration the development of the future technology, performance of UE and so on.

Furthermore, the value "k" may be differently configured for each piece of UE depending on the capability of the UE.

FIG. 21 shows an example of a method for transmitting SA in a subframe #n+k, and FIG. 22 shows an example of a method for transmitting SA in an SA SF that is first reaches after a subframe #n+k.

In relation to the configuration of the value "k", it is different from an LTE (-A) system in that resources are not explicitly allocated, but a D2D resource pool is determined. In this case, resources are selected and transmitted, and different values are configured between pieces of UE if a collision between resources is permitted.

The method of FIGS. 21 and 22 may be identically applied to D2D data transmission.

That is, when D2D UE receives control information (or scheduling information) related to D2D data transmission from an eNB in a subframe n, the D2D UE may transmit D2D data in a subframe n+k' by taking into consideration the processing time of the D2D UE.

The control information related to the D2D data transmission may be an SG or SA related to the resource allocation of the D2D data transmission.

The k' value may be configured differently from a value "k" at an SA transmission time point.

In general, a k'> (or =) k relation may be established by taking into consideration a probability that D2D data transmission may occur a bit later.

Method 3

An operation when SA SFs are configured as a group, that is, a plurality of SFs is allocated for SA and operated, is described below.

FIG. 23 is a diagram showing another example of the timing relation between SG reception and SA transmission in D2D UE, which are proposed according to an embodiment of the present invention.

FIG. 23 shows a method for transmitting, by D2D transmission UE, SA to D2D reception UE in the first SA SF after a subframe n+4 when it receives an SG (or resource allocation DCI) from an eNB in a subframe SF #n.

In this case, if the first SA SF after the subframe n+4 is a group of M contiguous SA SFs, when the D2D transmission UE receives the SG in the subframe SF #n at step S2310, it transmits the SA in the SA SF group that is first met after the subframe n+4 at step S2330.

What the SA will be transmitted in which one of the M SFs of the SA SF group may be finally aware through the SG at step S2320.

Furthermore, if an SA or data transmission subframe (SF) includes a plurality of subframes, a specific bit (or specific field) of a DCI format may be used to determine the location of the SA or data transmission subframe.

For example, a bit to determine the DCI formats 0/1, a hopping bit, or some of or all of RA bits may be used to determine the location of the SA or data transmission subframe.

Furthermore, the SG may be divided for SA and data purposes and may be further divided for special purposes, if necessary.

Accordingly, a bit to determine the DCI formats 0/1, a hopping bit, or some of or all of RA bits may be used to divide the purposes of an SG.

Method 4

A method for providing notification of the location of an SA SF through Radio Resource Control (RRC) is described below.

FIG. 24 is a diagram showing yet another example of the timing relation between SG reception and SA transmission in D2D UE, which is proposed according to an embodiment of the present invention.

FIG. 24 shows a method of previously providing notification of the location of an SA SF through RRC at step S2410 and simply using an SG (e.g., PDCCH DCI) as an activation purpose in which the SA SF may be used at step S2420.

In this case, a special index may be defined so that an association between RRC signaling and activation DCI may be checked.

That is, DCI indicative of the activation of an SA SF may be defined to denote the RRC of which index.

DCI, that is, an SG, accurately indicates the activation of an SA SF or SF set transmitted through RRC. In this case, an RRC set including a series of indices mapped to the DCI may be previously designated.

Furthermore, D2D transmission UE transmits SA to D2D reception UE through the SA SF whose activation has been indicated by the SG at step S2430.

A method for providing notification of the time location of SA resources or D2D data resources or both through the RRC signaling of FIG. 24 is described in detail later.

The timing relation between SA transmission and D2D data transmission in D2D UE, which is proposed according to an embodiment of the present invention, is described in detail below with reference to FIGS. 26 to 28.

FIG. 25 is a diagram showing an example of the timing relation between D2D SA transmission and D2D data transmission, which is proposed according to an embodiment of the present invention.

Regarding the timing between a D2D SA SF and a D2D data SF, D2D data may be implicitly transmitted and received according to a predetermined rule.

FIG. 25 shows a method for transmitting, by D2D transmission UE, SA to D2D reception UE in a subframe #n at step S2510 and transmitting D2D data to the D2D reception UE in an available D2D data SF 2501 that first arrives after a subframe "n+k" at step S2520, as in the timing relation between SG transmission and SA transmission.

Likewise, the value "k" is configurable and a different value "k" may be configured for each piece of UE.

Furthermore, as in the timing relation between SG transmission and SA transmission, UE may be notified of an available D2D data SF group, and a specific SF (e.g., a subframe #m) within the D2D data SF group may be separately indicated.

In this case, a parameter "k" indicative of the specific SF may be included in SA contents.

The value "k" of the indication parameter may be differently interpreted depending on the following conditions.

That is, the value "k" of the indication parameter may be differently interpreted depending on each pieces of UE, the location of a resource region, a UE group or the scenario (i.e., in-coverage, out-coverage, and edge-of-coverage) or both.

FIG. 26 is a diagram showing another example of the timing relation between D2D SA transmission and D2D data transmission, which are proposed according to an embodiment of the present invention.

Unlike in the method of FIG. 25, FIG. 26 shows a method for transmitting a D2D data SF within "n+k" (2601) at step S2620 when a D2D SA SF is determined (a subframe #n) at step S2610.

In this case, although D2D data is transmitted in a subframe right after the D2D SA SF, there is no problem if UE is previously notified of such a fact.

In this case, D2D reception UE may decode the D2D data by preparing data SF buffering received subsequently along with SA SF buffering by taking into consideration the processing time (or processing latency).

In this case, the value "k" is configurable and may be differently configured for each piece of UE.

FIG. 27 is a diagram showing yet another example of the timing relation between D2D SA transmission and D2D data transmission, which is proposed according to an embodiment of the present invention.

That is, FIG. 27 shows a method for directly indicating a D2D data SF explicitly through SA.

Assuming that D2D reception UE receives SA in a subframe #n at step S2710, D2D transmission UE may calculate a value "k" based on some of SA contents or an SA transmission resource parameter and explicitly notify the D2D reception UE of the calculated value "k" in a subframe #n+k in which D2D data is received at step S2720.

A method for transmitting D2D data related to the valid period of SA contents is described below.

SA contents may indicate an MCS value, whether frequency hopping has been applied, and SA information to or in which resource allocation related to frequency hopping has been applied or configured in a resource region for SA transmission.

FIG. 28 is a flowchart illustrating an example of a method for transmitting and receiving D2D data, which is proposed according to an embodiment of the present invention.

In the method of FIG. 28, if a D2D SA SF is periodically configured, it is assumed that D2D data between SA SF transmission periods is transmitted using the same SA value.

In this case, D2D reception UE that receives D2D data may receive a plurality of D2D data through the SA value once received from D2D transmission UE.

That is, the D2D reception UE may determine that the same one SA value is applied to multiple data subframes.

Referring to FIG. 28, the D2D reception UE receives SA from the D2D transmission UE through a periodically configured SA subframe at step S2810.

The D2D reception UE receives at least one D2D data from the D2D transmission UE using the received SA for a specific time interval at step S2820.

The specific time interval may be an SA period or SA contents valid time interval in which the SA has been received.

The SA contents valid time interval may be previously determined, may be simply defined as an SF index, or may be defined as a multiple of an SA SF period.

Furthermore, the SA contents valid time interval may be defined as a combination of an SA SF and a normal SF or may be defined as a D2D data SF period or a multiple of the D2D data SF period.

In this case, the SF may mean a normal SF index or a D2D SF index.

In this case, if a plurality of D2D data is present for the specific time interval, the SA includes resource allocation information related to the plurality of D2D data.

That is, the D2D reception UE may receive a plurality of D2D data based on the SA received at step S2810 even without additionally receiving SA for the specific time interval.

In another embodiment, D2D control information may be separated from control information transmitted through SA and control information embedded (or included) in D2D data and transmitted.

That is, (1) control information, such as RA or an MCS, and (2) control information, such as an NDI, may be separated through direct SA and direct data, respectively, based on the attributes of the control information and transmitted.

FIGS. 29 to 32 are diagrams showing examples of methods for providing notification of the locations of SA resources or D2D data resources or both, which are proposed according to embodiments of the present invention.

FIGS. 29 and 30 show methods for transmitting and receiving SA or D2D data or both using a subframe pattern in which SA resources or D2D data resources or both may be transmitted and received.

A subframe pattern in which the SA resources or the D2D data resources or both may be transmitted and received may be represented as a Resource Pattern for Transmission (RPT).

The RPT means time resources or frequency resources or both for guaranteeing a plurality of transmission opportunities for D2D data Transport Blocks (TBs).

Accordingly, the RPT may be divided into a Time-RPT (T-RPT) and a Frequency RPT (F-RPT).

Specifically, FIG. 29 shows a method for explicitly notifying D2D UE of a subframe pattern related to SA resources or D2D data resources or both. FIG. 30 shows a method for implicitly transmitting a subframe pattern related to SA resources or D2D data resources or both to D2D UE.

UE uses some of all of UL subframes as D2D subframes.

That is, the UE performs communication with an eNB in the remaining UL subframes other than the D2D subframes.

Accordingly, eNB-to-UE transmission and the transmission of D2D Tx UE-D2D Rx UE are not generated at the same time.

If UE transmits a D2D signal to another UE in a D2D subframe, it may not receive a D2D signal from another UE in the same band of the D2D subframe. The reason for this is that the D2D signal transmitted by the UE is greatly subjected to strong interference when the UE receives a D2D signal from another UE.

In order to solve such a problem, a subframe pattern (or configuration) between a D2D transmission subframe in which a D2D signal is transmitted and a D2D reception subframe in which a D2D signal is received may be differently configured.

Furthermore, in order to solve an interference problem attributable to the transmission and reception of D2D signals by one UE and to reduce interference between two pieces of adjacent UE by reducing a probability that the two pieces of UE use redundant time resources at the same time, the patterns of subframes in which the two pieces of UE transmit D2D signals may be differently configured.

Specifically, an eNB can solve an interference problem which may be generated between pieces of UE by configuring a subframe pattern to be used for D2D transmission by each of the pieces of UE by taking into consideration the distance between the pieces of UE (by checking the degree of mutual interference).

In this case, the eNB explicitly notifies D2D UE of D2D transmission subframe patterns 2910 through high layer signaling, such as RRC signaling.

In this case, the eNB may dynamically configure the D2D transmission subframe pattern in the D2D UE through an EPDCCH or a PDCCH. That is, if a D2D transmission subframe pattern is transmitted to D2D UE through an EPDCCH or PDCCH, there is an advantage in that the D2D transmission subframe pattern can be configured by rapidly handling a change of the location of UE.

According to another method, in order to reduce a signaling burden of an eNB, the eNB may not determine a D2D (transmission) subframe pattern and notify UE of the D2D (transmission) subframe, but the UE may autonomously select a required D2D (transmission) subframe pattern.

That is, such a method is a method for implicitly obtaining, by D2D UE, a D2D subframe pattern.

In this case, the D2D UE may select the D2D subframe pattern using a similar random method based on its own UE ID (or a UE-specific parameter having a similar characteristic).

In some embodiments, D2D UE may receive minimum signaling information from an eNB and select a subframe pattern using a similar random method using the minimum signaling information as a factor for determining a similar random value.

If such an implicit subframe pattern selection method is used, the aforementioned interference between pieces of UE can be reduced because proper subframe patterns (or subframe sets) are given and a subframe pattern is randomly selected from the proper subframe patterns (or subframe sets).

As shown in FIG. 29, an eNB may deliver the candidate group 2910 of subframe patterns related to D2D transmission, which may be potentially used by specific UE, through high layer signaling, such as RRC signaling, and transmit (or designate) one or more subframe patterns 2920 to be actually used for D2D transmission at a specific point of time through an Enhanced PDCCH (EPDCCH) or a PDCCH.

Specifically, the eNB transmits previously defined N subframe patterns, that is, a candidate group of N subframe patterns (e.g., a subframe pattern #0, a subframe pattern #1, a subframe pattern #2, . . . , ), to D2D UE through high layer signaling, such as RRC signaling.

Thereafter, the eNB specifies one or more of the N subframe patterns 2910 as a D2D transmission subframe pattern 2920 and transmits the D2D transmission subframe pattern 3020 to the D2D UE through a PDCCH or an EPDCCH.

In this case, in the process for transmitting the previously defined N subframe patterns to the D2D UE, the eNB may assign that the actual pattern of the subframe pattern #k (k=0, 1, 2, . . . , ) has what form in the bitmap form of a subframe which is repeated in a specific cycle, for example, an SF pattern #0 (10001010) or an SF pattern #1 (00111001).

Furthermore, as shown in FIG. 30, the eNB may transmit the candidate group 3010 of subframe patterns related to D2D transmission, which may be potentially used, to specific UE through high layer signaling, such as RRC signaling. D2D UE that has received the candidate group 3010 may select the subframe pattern 3020 to be used for actual transmission at a specific point of time using a UE identification parameter (e.g., a UE ID 3010).

In this case, the UE identification parameter (or seed) 3110 may be previously allocated by the eNB.

Thereafter, the D2D UE may perform D2D transmission and reception through the selected subframe pattern.

FIGS. 31 and 32 are diagrams showing examples of methods for changing a subframe pattern related to SA resources or D2D data resources or both, which are proposed according to embodiments of the present invention.

FIG. 31 shows a method for explicitly providing notification of a changed subframe pattern, and FIG. 32 shows a method for implicitly providing notification of a changed subframe pattern.

FIGS. 31 and 32 show operations for changing, by D2D UE, a subframe pattern allocated thereto using the methods of FIGS. 29 and 30.

FIGS. 31 and 32 show a subframe pattern repeated in a cycle of 8 ms (i.e., 8 subframes). An eNB may previously transmit a subframe pattern #0{10001010} and a subframe pattern #1{00111001} 3110 to D2D UE through high layer signaling.

In this case, the value "1" is a subframe related to D2D transmission, and it means that a signal related to D2D transmission may be transmitted and received in a corresponding subframe.

Furthermore, the value "0" is a subframe not related to D2D transmission, and this means that a signal related to D2D transmission may not be transmitted and received in a corresponding subframe.

The meanings of the value "0" and the value "1" may be reversed.

Thereafter, the eNB designates a D2D subframe pattern (e.g., an SF pattern #0 3120) that will be actually used by D2D UE through a PDCCH. The D2D UE operates based on the designated D2D subframe pattern.

Thereafter, the eNB transmits D2D subframe pattern change information 3130, providing notification of a changed D2D subframe pattern, to the D2D UE through a PDCCH (or another piece of control information or another message or RRC signaling) if the D2D subframe pattern has been changed.

The D2D subframe pattern change information may designate a changed subframe pattern using some fields within a PDCCH or EPDCCH.

If existing DCI for an UL grant is reused for DCI for D2D, it may be used as subframe pattern change information to designate a changed subframe pattern using a field that belongs to DCI fields and that is not used.

The field that belongs to the DCI fields and that is not used may include an indicator to determine the DCI formats 0/1A, a CQI request field, and an NDI field.

Some of a DM RS cyclic shift field or MCS/RV field using a plurality of bits may be used.

If resources for SA transmission and resources for D2D data transmission are designated to UE through a single PDCCH or EPDCCH at the same time, a subframe pattern for the SA and a subframe pattern for the D2D data may be allocated to respective states designated by the fields within the DCI.

In the method of FIG. 32, D2D UE may randomly select a D2D subframe pattern (e.g., an SF pattern #0 3220) that belongs to the candidate group of D2D subframe patterns and that will be actually used using a UE ID and operate based on the selected D2D subframe pattern.

In this case, an eNB may transmit a D2D subframe pattern (change) indicator, indicating that a D2D subframe pattern has been changed, to the D2D UE through a PDCCH (or another piece of control information or another message or RRC signaling).

In this case, the D2D UE may randomly reselect a D2D subframe pattern (e.g., an SF pattern #1 3230) using a pseudo-random selection parameter (seed, a D2D UE identification parameter) using a UE ID.

In this case, the eNB may previously notify the D2D UE of the UE ID through RRC signaling.

That is, if the D2D UE selects or reselects a subframe pattern using a similar random method, the eNB may previously deliver a parameter or seed value for determining a similar random value to the D2D UE.

Furthermore, the D2D UE may determine the index of a D2D transmission subframe using a similar random value without a pattern.

In this case, the eNB may deliver a parameter or seed value to determine the similar random value to the D2D UE.

Furthermore, the D2D UE may determine a subframe pattern or the index of a subframe based on only signaling information for determining such a similar random value. A unique value of the D2D UE may be included in the signaling information, and the subframe pattern or the index of the subframe may be determined.

By way of example, a method for obtaining, by D2D reception UE, the transmission bandwidth of SA in order to detect the SA transmitted by D2D transmission UE is described below.

In this case, the transmission bandwidth of the SA may be previously fixed so that the D2D reception UE is aware of the transmission bandwidth of the SA.

In this case, a portion that belongs to a resource allocation field included in an SG and that corresponds to the number of allocated RBs may be fixed as a predetermined value, such as "0", or may be defined as the previously fixed transmission bandwidth of SA.

A field (or bits) included in the SG related to the transmission bandwidth of the SA may be used for other purposes (e.g., for the purpose of designating the location of an actual SA SF within an SA SF group) in addition to the transmission bandwidth of SA.

The UE scheduling of eNB-to-D2D transmission (Tx) (and/or D2D reception (Rx)) for D2D transmission is described below.

FIG. 33 is a flowchart illustrating an example of a UE scheduling method for D2D transmission, which is proposed according to an embodiment of the present invention.

First, the eNB performs a Scheduling Grant (SG) procedure along with D2D transmission (Tx) UE or D2D reception (Rx) UE (Step#1, S3310).

That is, the eNB transmits an SG related to D2D transmission to the D2D Tx UE or the D2D Rx UE.

The SG procedure (Step#1) may be basically divided into the following two methods.

The first method Method#1 is a method for allocating D2D transmission-related resources through RRC signaling and then dynamically controlling a detailed operation, such as the activation/release of the allocated resource, through a physical/MAC control channel (e.g., a PDCCH).

The second method Method#2 is a method for controlling a D2D operation by transmitting resource allocation related to D2D transmission or scheduling information related to D2D transmission or both through a physical/MAC control channel In the methods (1) and (2), the D2D UE may receive scheduling information (e.g., an MCS, an RV, or a DM RS parameter) related to D2D communication from the eNB and determine D2D transmission-related resources based on the scheduling information, or the D2D UE may autonomously determine a D2D transmission-related resource.

Resource allocation information may be included in the scheduling information, and the scheduling information and the resource allocation information may be separately interpreted.

If the D2D UE receives scheduling information related to D2D transmission from the eNB according to the method (1), it may receive the scheduling information through an RRC signal or a control channel, such as a PDCCH, or both.

In this case, if the D2D UE receives the scheduling information from the eNB through RRC signaling, the DCI format of the PDCCH may not include fields, such as an MCS, RV, and DM RS parameter related to D2D transmission.

Accordingly, if fields related to D2D transmission are defined to be included in the DCI format of a PDCCH, a total length of the DCI format may be reduced by obviating the unnecessary fields or a DCI format may become a DCI format having the same length by applying a technology, such as zero padding and transmitted.

Likewise, if the D2D UE directly determines scheduling information, such as an MCS or an RV, contents fields related to scheduling information, such as an MCS and an RV, are not required in a PDCCH transmitted in the method (1) or (2).

Accordingly, a method for obviating the unnecessary fields or applying the zero padding may be adopted.

The method (1) is described in more detail later with reference to FIG. 34, and the method (2) is described in more detail later with reference to FIG. 35.

Thereafter, the D2D transmission UE performs a scheduling procedure related to D2D data transmission for the transmission and reception of D2D data along with the D2D reception UE (Step#2, S3320). That is, the D2D transmission UE performs an SA transmission procedure.

Step#2 may be used along with the methods used in Step#1.

In this case, pieces of information which may be included in SA may be as follows. In particular, pieces of information related to resources for D2D data reception may be included in the SA.

Scheduling information (including resource allocation information) related to SA transmission may be construed as being transmitted from the eNB to the D2D transmission UE (through an SG). The SA transmission may be construed as being transmitted from the D2D transmission UE to the D2D reception UE.

Information related to resources for data reception: information related to resources for D2D data reception RB Allocation: RB Allocation Information Number and pattern of retransmissions: information about the number and pattern of retransmissions Frequency hopping pattern: information about a frequency hopping pattern SPS (including periodicity) of data: information about the periodicity of data Target ID: ID information of D2D reception UE MCS/RV of data Timing advance of data A method for receiving, by D2D transmission UE, an SG from an eNB and determining a point of time at which the D2D transmission (Tx) UE transmits SA to D2D reception (Rx) UE is described below.

The received SG may include scheduling information (including resource allocation information) related to the SA.

First, it is assumed that the eNB is aware of a D2D transmission subframe in which the D2D transmission UE may transmit the SA.

The eNB transmits the SG to the D2D transmission UE in an n−k1 (k1 is an integer) subframe of an SA transmission subframe(n), so the D2D transmission UE may transmit the SA to the D2D reception UE.

The value "k1" may be about 4 when the receive processing capability of UE is taken into consideration in an LTE (-A) system.

The value "k1" may be 2 or 3 according to the evolution of the technology.

The D2D transmission UE that has received the SG may also check the location of a D2D data transmission subframe through the received SG.

That is, the SG may be used for SA scheduling and also for a point of time (subframe) at which D2D data is transmitted and frequency resource allocation, which involve D2D data transmission.

A method for receiving, by D2D transmission UE, an SG from an eNB and transmitting SA to D2D reception UE in a SA transmission-valid resource after a specific time is described below.

The received SG may include scheduling information related to SA transmission.

The eNB transmits the SG to the D2D transmission UE based on a point of time at which D2D transmission resources were requested from the D2D transmission UE without checking an SA transmission valid subframe in detail.

That is, when the D2D transmission UE receives the SG from the eNB, it generates SA based on the received SG.

Thereafter, the D2D transmission UE checks an SA-available subframe in which the generated SA may be transmitted and transmits the generated SA to the D2D reception UE in an available or valid D2D subframe (i.e., a subframe valid from an SA transmission viewpoint).

In this case, the D2D transmission UE receives the SG from the eNB, but may not immediately transmit the SA to the D2D reception UE although a next subframe is available.

The reason for this is that time corresponding to "n+k2" is required in order for the D2D transmission UE to receive the SG, perform reception processing, generates SA using the SG, that is, information related to the received SA, and prepare D2D data transmission.

In this case, k2 has an integer value. The value "k2" may be 2 or 3 according to the evolution of the technology. That is, the value "k2" may have various values, such as 1, 2, 3, or 4 depending on the reception capability of UE.

If k2=4, the D2D transmission UE receives an SG from the eNB and transmits SA to the D2D reception UE after 4 subframes.

If there is no available subframe for the SA transmission right after the 4 subframes, the D2D transmission UE transmits the SA to the D2D reception UE in a next subframe.

If a next available subframe is not present, the D2D transmission UE may transmit the SA to the D2D reception UE in a next subframe.

That is, it may be interpreted that the SA is transmitted in the earliest SA-available subframe of subframes subsequent to a subframe n+4.

In this case, all of subframes not designated as D2D transmission may correspond to a subframe in which SA transmission is impossible.

In some embodiments, a subframe in which a synchronization signal is transmitted, such as subframes 0 and 5, may be excluded from the SA-available subframe.

In some embodiments, a subframe in which a paging subframe is transmitted, such as subframes 0, 4, 5, and 9, may also be excluded from the SA-available subframe.

In this case, although a specific D2D subframe (e.g., a WAN synchronization signal and a channel similar to a BCH) has been designated as a D2D subframe, if a channel for delivering D2D-essential information is determined in a specific D2D subframe, the specific D2D subframe may be excluded from the SA-available subframe.

In some embodiments, a dedicated subframe for SA transmission may have been configured, and SA may be transmitted only in such an SA-dedicated subframe.

That is, the D2D transmission UE receives the SG from the eNB (in a subframe n) and may transmit the SA to the D2D reception UE in an SA (transmission)-available subframe after n+k3 subframes.

In this case, the D2D UE which has received the SG may also check the location of a data transmission subframe. That is, the SG may also be used for a point of time (subframe) at which data is transmitted and frequency resource allocation, involving data transmission, in addition to SA scheduling.

Thereafter, the D2D transmission UE transmits D2D data to the D2D reception UE based on the SA (Step#3, S3330).

In this case, the D2D transmission UE may transmit required control information along with the D2D data.

The control information may be transmitted in a piggyback form along with the D2D data.

The validity of SG is described below.

If D2D UE receives an SG1 from an eNB and then receives an SG2 from the eNB, the D2D UE may determine that the received SG1 is no longer valid.

A point of time at which the validity of SG is determined may be applied after an n+k4 subframe since a subsequent transmitted SG, that is, since the SG2 is received (in a subframe n).

In this case, the value "k4" is an integer. If a point of time at which the SG2 may be applied is taken into consideration, the value "k4" may have a value of 2, 3, or 4.

Furthermore, the eNB may transmit the SG1 and the SG2 to the D2D UE at the same time.

In this case, the SG1 and the SG2 may be merged into a single DCI format and transmitted.

If separate channel coding is performed on each of the SG2 and SG2, a probability that the D2D UE may successfully receive each SG may be increased.

As described above, the D2D UE may feed the results of the reception of each SG back to the eNB and use a PUCCH as a channel for feeding the results of the reception of each SG back.

Furthermore, control of transmission power of the D2D UE may be implemented through the SG.

In this case, the eNB may control transmission power of the D2D UE by transmitting a TPC command to the D2D UE using a TPC field or the DCI formats 3/3A.

If the DCI formats 3/3A are used, the eNB may reserve a specific field of a corresponding format for D2D power control and use the correspond format.

This may be previously partitioned that it is for D2D power control or for LTE (-A) power control through RRC signaling.

Furthermore, a valid time when the SG is available may be determined.

That is, after a lapse of a specific time (or a specific number of subframes) or after a specific number of D2D subframes since the D2D UE receives the SG from the eNB, the D2D UE may automatically discard the received SG.

In some embodiments, an SG timer may be newly defined. When the SG timer expires, an SG may be considered to be invalid.

In some embodiments, a previous SG may be defined to be valid until the D2D UE receives a next SG.

In some embodiments, after receiving an SG, the D2D UE discards the received SG after a specific time or a specific number of subframes. If another SG has been previously received from the eNB, the D2D UE may discard the previously received SG although a specific time elapses.

FIG. 34 is a diagram showing an example of a UE scheduling method for D2D transmission using RRC signaling, which is proposed according to an embodiment of the present invention.

That is, FIG. 34 shows a detailed method of step S3310 in FIG. 33.

Steps S3420 and S3430 of FIG. 34 are the same as steps S3320 and S3330 of FIG. 33, and thus only differences between them are described below.

First, an eNB performs a Scheduling Grant (SG) procedure along with D2D Tx UE or D2D Rx UE (Step#1, S3410).

As described above with reference to FIG. 33, step S3410 may be implemented through two methods.

The first method Method#1 is a method for allocating D2D transmission-related resources through RRC signaling and additionally controlling a detailed dynamic operation for the allocated resources, such as activation/release, through a physical/MAC control channel (e.g., a PDCCH).

The second method Method#2 is a method for controlling a D2D operation by transmitting resource allocation and/or scheduling information related to D2D transmission through a physical/MAC control channel The method Method#1 of (1), that is, scheduling (e.g., semi-static scheduling) for SA (and data) based on an RRC signal and a dynamic control signal (e.g., an (E)PDCCH or a PHICH), is described in more detail below.

The method (1) may be divided into 1) RRC signaling transmission for overall resource configuration/allocation for SA (and/or data) transmission S3411 and 2) a dynamic control information transmission (S3412) method for the activation/release of SA (and data) resources allocated through 1).

First, RRC signaling transmission is described.

RRC Signaling: Overall Resource Configuration/Allocation for SA (and Data)

As in an LTE Semi-Persistent Scheduling (SPS) scheduling method, an eNB allocates a specific resource region (or a specific resource set/group) related to D2D transmission to D2D UE through RRC signaling.

Furthermore, the eNB may allocate a monitoring resource for D2D reception to the D2D UE in a similar way.

The specific resource region may be a subframe(s) or a set of resource blocks.

Accordingly, the D2D UE may perform blind demodulation (or blind decoding) on D2D data or SA by monitoring the specific resource region.

The monitoring resource may mean a resource that provides notification of monitoring so that the D2D UE performs blind decoding on SA or D2D data (Tx-to-Rx for D2D) or both.

The meaning of "A and/or B" used in an embodiment of the present invention may be construed as having the same concept including at least one (A, B, and A&B) of A and B.

The method (1) may be used to provide notification of a data resource region, that is, for D2D data scheduling in addition to SA scheduling.

That is, the method (1) means an operation for allocating resources related to D2D transmission through RRC and dynamically activating or releasing the resources using a physical layer and an MAC layer control channel, like Semi-Persistent Scheduling (SPS).

For more detailed contents of the operation, reference may be made to FIGS. 28 to 32.

Thereafter, steps S3420 and S3430 are performed.

FIG. 35 is a diagram showing an example of a UE scheduling method for D2D transmission using a physical layer channel, which is proposed according to an embodiment of the present invention.

That is, FIG. 35 shows a detailed method of step S3310 in FIG. 33.

Steps S3520 and S3530 of FIG. 35 are the same as steps S3320 and S3330 of FIG. 33, and thus only differences between them are described below.

First, an eNB performs a scheduling grant procedure along with D2D Tx UE or D2D Rx UE (Step#1, S3510).

Likewise, Step#1 may be implemented through two methods.

The first method Method#1 is a method for allocating D2D transmission-related resources through RRC signaling and additionally controlling a detailed dynamic operation for the allocated resources, such as activation/release, through a physical/MAC control channel (e.g., a PDCCH).

The second method Method#2 is a method for controlling a D2D operation by transmitting resource allocation and/or scheduling information related to D2D transmission through a physical/MAC control channel The meaning of "A and/or B" used in an embodiment of the present invention may be construed as having the same concept including at least one of A and B.

The method (2), that is, an (Enhanced) PDCCH transmission method based on dynamic scheduling, is described below with reference to FIG. 35.

The method (2) refers to a method for notifying the D2D Tx UE (or the D2D Rx UE or both) of an MCS, an RV, an NDI, power control and/or a PMI for D2D data demodulation in addition to resource allocation using a channel (e.g., an EPDCCH, PDCCH, PHICH, or new channel) for delivering control information in a physical layer (or including an MAC layer) instead of transmitting scheduling information (including resource allocation) related to D2D transmission through RRC (S3511).

The resource allocation, MCS, RV, NDI, power control, or PMI may be called scheduling information related to D2D transmission.

Furthermore, the use of SG may be variously defined in addition to the aforementioned uses.

For example, the SG may be used to provide notification that the contents of scheduling information related to D2D transmission have been changed.

The meaning of the change includes a modification, deletion, and addition.

In this case, there are a case where the same signaling format as that of the SG is used and a case where a signaling format different from that of the SG is used.

Scheduling information included in the SG may mean a change of a D2D transmission-related resource region in which RC signaling has been designated, a change of resources that need to be used by the D2D Tx UE (or the D2D Rx UE or both) in a corresponding resource region, a change of a resource region substantially allocated by the SG, a change of a resource region group, or a change of some of or all of SA contents.

The SA contents include a variety of types of scheduling information in addition to RA. The D2D Tx UE (or the D2D Rx UE or both) is notified of a change of the contents of one or more of the variety of types of scheduling information, including the RA, through the SG.

The eNB may generate a new SG of a compact type by reducing the bit field of the SG and use the new SG.

Furthermore, as in resource reallocation related to D2D transmission, a method for implementing SG/SA updates includes using a PHICH in addition to a PDCCH and an EPDCCH.

That is, the eNB may use PHICH resources to notify the D2D UE whether there is a change of an SG/SA.

The D2D UE may monitor a PHICH including information indicative of a change of an SG/SA and receive the changed SG/SA.

The D2D UE receives a modified SG/SA after a time previously designated by the eNB or in a previously designated time interval through an SG/SA modification notification.

In this case, the modification notification may have two meanings.

The first meaning is that the D2D UE is notified that SA will be changed and the D2D UE needs to receive the changed SA by monitoring an SG in order to be aware of the changed SA.

The second meaning is that the D2D UE is notified that an SG has been changed or will be changed at a specific predetermined point of time and thus the D2D UE needs to receive the SG that has been changed or will be changed.

As described above, the SG may be used for data scheduling in addition to SA scheduling.

Thereafter, steps S3520 and S3530 are performed.

FIG. 36 is a flowchart illustrating an example of a method for performing an HARQ procedure for an SG, which is proposed according to an embodiment of the present invention.

Steps of S3610, S3630, and S3640 of FIG. 36 are the same as steps S3310 to S3330 of FIG. 33, and thus only differences between them are described below.

After step S3610, D2D UE and an eNB performs an SG Hybrid Automatic Retransmission reQuest (HARQ) procedure at step S3620.

That is, the D2D UE may transmit a response to a received SG to the eNB between a point of time at which the D2D UE receives the SG from the eNB and a point of time at which the D2D UE transmits SA to another D2D UE. The response may be ACK or NACK.

As described above, the SG may be control information or resource allocation information related to the SA or the D2D data transmission or both, as in the activation/deactivation of allocated resources in SPS.

The control information or resource allocation information related to the SA or the D2D data transmission or both may be indicated as scheduling information related to D2D transmission.

The SG HARQ procedure in step S3620 can prevent the deterioration of performance or the generation of a situation in which communication is impossible, which is generated because the D2D UE does not transmit SA to another D2D UE or does not apply a change of SA contents that have already been transmitted and thus continues to transmit the SA prior to the change if the D2D UE does not receive the SG from the eNB.

Accordingly, there is a need for confirmation regarding whether an SG has been received. In this case, an UL ACK/NACK mechanism may be used.

That is, the D2D UE may transmit a response (i.e., ACK or NACK) to the SG to the eNB using an existing PUCCH structure or in an existing embedded PUCCH to PUSCH form (i.e., in an UCI piggyback form).

In this case, if the SG complies with a mechanism, such as a PDCCH or EPDCCH format, a response to the SG may be easily used using a PUCCH resource connected to each DCI index of the PDCCH or EPDCCH.

In this case, if information included in the SG is separated into information for SA scheduling and information for D2D data scheduling and received by the D2D UE, the D2D UE may feed a response regarding whether each SG has been received back.

Furthermore, since the response to the SG may have a maximum of four types, the size of the response may be represented as 1 bit to 2 bits.

In this case, the response to the SG may be fed back through a PUCCH.

Hereinafter, methods for transmitting and receiving SA and/or D2D data proposed in this specification will be described in detail with reference to FIGS. 37 to 41.

FIG. 37 is a diagram showing a D2D operation procedure proposed in this specification and an example of a signaling transmission/reception method related thereto.

FIG. 37 shows a D2D operation procedure in D2D communication Mode 1 controlled by an eNB and a method for performing D2D communication by transmitting and receiving information related thereto.

As illustrated in FIG. 37, an SA (Scheduling Assignment) resource pool 3710 and/or data resource pool 3720 related to D2D communication may be pre-configured, and the pre-configured resource pools may be transmitted from an eNB to D2D UEs via high layer signaling.

The high layer signaling may be RRC signaling.

The expression 'A and/or B' used herein is intended to mean at least one between A and B, that is, A alone, B alone or A and B in combination.

The SA resource pool and/or data resource pool refers to resources reserved for a D2D (UE-to-UE) link or D2D communication.

The UE-to-UE link also may be called a sidelink.

Specifically, the SA resource pool refers to a resource region for SA transmission, and the data resource pool refers to a resource region for D2D data transmission.

The SA may be transmitted in accordance with an SA periodicity 3730, and the D2D data may be transmitted in accordance with a data transmission periodicity 3740.

The SA periodicity and/or the data transmission periodicity may be transmitted from the eNB to a D2D UE by a D2D grant.

Alternatively, the SA periodicity may be transmitted by a D2D grant, and the data transmission periodicity may be transmitted by an SA.

The D2D grant refers to control information used for the eNB to transmit an SA (Scheduling Assignment) required for D2D communication to the D2D UE.

The D2D grant may be represented in DCI format 5, and carried on a physical layer channel such as PDCCH, EPDCCH, etc., or a MAC layer channel The D2D grant may contain information related to data transmission, as well as information related to SA transmission.

For example, the SA may include RA (Resource Allocation), MCS, NDI(New Data Indicator), RV(Redundancy Version), etc.

As stated previously, the SA resource pool for SA transmission may be transmitted via RRC signaling.

Moreover, the SA may be carried on a PSCCH (Physical Sidelink Control Channel), and the D2D data may be carried on a PSSCH (Physical Sidelink Shared Channel).

A D2D transmission UE may receive SA information, particularly, resource allocation (RA) information for SA transmission (hereinafter, 'SA RA'), from the eNB by a D2D grant.

In this case, the D2D transmission UE may send to a D2D reception UE the SA RA information as it is received from the eNB, or may generate new SA RA information with reference to the received SA RA information and then send the newly generated SA RA information to the D2D reception UE.

If the D2D transmission UE generates new SA RA, the D2D transmission UE has to perform SA resource allocation only within a resource region (resource pool) indicated by a D2D grant RA.

That is, only part (SA RA) of the resource region (D2D grant RA) which the eNB permits the use of may be selected for SA transmission.

On the contrary, the D2D transmission UE may use the D2D grant RA as it is assigned by the eNB.

In this case, however, the D2D transmission UE transmits dummy data even if there is no D2D data to be transmitted, or occupies D2D SFs (subframes) without D2D data transmission, which may lead to a waste of D2D SFs.

Resource pools related to D2D communication may be in the following relationship.

RRC configured D2D resource pool (A)
D2D grant RA indicating resource pool (B)
SA RA indicating resource pool (C)

If the relationship among the resource pools satisfies A>=B>=C, it prevents D2D SFs from being indiscriminately occupied for D2D transmission. As a result, resources for WAN data transmission may be protected.

FIG. 38 is a flowchart showing an example of a method for transmitting downlink control information according to an embodiment of the present invention.

First of all, an SA resource pool and/or D2D data resource pool are configured by a high layer (S3810).

Afterwards, an eNB transmits the SA resource pool and/or D2D data resource pool to a D2D UE via high layer signaling (S3820).

Thereafter, the eNB transmits SA-related control information and/or D2D data-related control information separately or together to the D2D transmission UE by a D2D grant (S3830). The control information includes SA and/or D2D data scheduling information in the SA resource pool and/or D2D data resource pool. For example, the control information may include RA, MCS, NDI, RV, etc.

After that, the D2D transmission UE transmits SA and/or D2D data to a D2D reception UE based on the information received in the step S3830 (S3840).

The SA transmission and the D2D data transmission may be performed simultaneously, or the D2D data transmission may be performed after the SA transmission.

Next, D2D-related resource allocation using SPS (semi-persistent scheduling) will be discussed.

In this case, D2D communication-related resources (the SA resource pool and/or data resource pool) may be reserved and allocated in advance for a D2D UE via RRC signaling, as shown in FIGS. 37 and 38.

Afterwards, the D2D UE may receive from the eNB a D2D grant indicating whether the reserved and allocated D2D communication-related resources are available.

That is, the eNB may activate the use of the resources reserved and allocated for the D2D UE through (E)PDCCH, etc. or stop or release the use of the resources.

Here, the eNB may indicate the release of use of D2D communication-related resources by setting all SA RAs to '0' and transmitting them to the D2D UE.

In another method, a specific value (e.g., '0') may be set to the TPC and MCS fields to indicate the release of use of D2D communication-related resources if a specific condition is met by a combination of a number of fields.

In yet another method, only the MSB (Most Significant Bit) of the MCS may be set to '1' and the other bits to '0', as in '10000 . . . 0000' to indicate the release of use of D2D communication-related resources.

Next, the activation/release of use of each resource type when SA resource information and D2D data resource information are separately transmitted will be described.

In an example, if a SA resource-related portion and a data resource-related portion are separated within a specific field, the eNB may indicate the activation and release of use of each resource type to the D2D UE.

The specific field may be the TPC field, and a description will be given by taking the TPC field as an example.

Moreover, the eNB may indicate the release of resource use from different locations by taking the SA transmission periodicity and the data transmission periodicity into account.

This method may be implemented by transmitting different types of information (SA resource information and data resource information) in different TPCs, or by allocating different bit sequences for two TPCs.

Alternatively, the release of resource use may be indicated by notifying the D2D UE of the number of the first data resource released since the release of SA resources.

Next, a method of updating SA RAs will be described.

If a D2D UE receives SA RA information from an eNB, the point in time of actual SA transmission by the D2D UE is in synchrony with the periodicity of SA transmission.

Here, the eNB transmits SA RA information to the D2D UE by a D2D grant at the point in time when the D2D UE transmits an SA. Thus, the update time for SA RA information is in phase with the SA periodicity for SA transmission.

Specifically, the minimum update interval of SA RA information may correspond with the SA periodicity.

That is, in a case where SA transmission occurs even if there is no update of SA RA information, the update interval of SA RA information and the SA periodicity may be interpreted as identical.

In contrast, the update of TPC information, which corresponds to transmission power control information, may be designed differently from the SA RA information.

If the eNB transmits TPC information to the D2D transmission UE in every SA period, the TPC information may be updated in each SA period.

However, in view of the fact that the D2D UE can transmit multiple SAs or data in between SA periods, the update interval of the TPC information should be shorter than the SA periodicity in order to perform efficiently or optimize controlling power for transmission of the SA or data.

To this end, a DCI format for transmitting TPC information only may be newly defined, the newly defined DCI format may be transmitted in between SA periods.

The newly defined DCI format contains TPC information.

For example, if the SA (transmission) periodicity is 100 ms, the TPC information periodicity may be set to 10 ms, so that the TPC information can be updated in accordance with the channel state.

In this method, however, transmitting TPC information only may lead to inefficient use of resources. Thus, the eNB may transmit to the D2D UE control information (e.g. HARQ information) that reflects the channel state, together with the TPC information.

That is, the eNB may transmit TPC, HARQ, MCS, RV, PMI, etc. more frequently at shorter intervals than the SA periods so that this information can be updated to properly reflect the channel state.

Here, the above-described methods may be interpreted in a different way.

For example, the SA periodicity may be 10 ms, the actual transmission (or update) of SA RA information may occur at 100 ms intervals, and control information (TPC, HARQ information, etc.) that reflects the channel status may be generated at 10 ms intervals (or units).

That is, once the SA periodicity is set, the SA RA update periodicity, TPC update periodicity, and HARQ update periodicity may be set to an integer multiple of the SA periodicity.

Here, the SA RA update periodicity occurs more frequently than the TPC and HARQ update periodicities.

Accordingly, the SA RA update periodicity, TPC update periodicity, and HARQ update periodicity may be preset, and may be transmitted to the D2D UE via RRC signaling.

Alternatively, the eNB may explicitly or implicitly transmit information related to the SA RA update periodicity, TPC update periodicity, HARQ update periodicity, etc. to the D2D UE by a D2D grant.

Here, the SA periodicity may be configured via RRC signaling, and the TPC periodicity and/or HARQ periodicity may be configured by a D2D grant.

Alternatively, the SA periodicity, TPC periodicity, and HARQ periodicity may be set to default. That is, all the periodicities may have the same default value.

As previously stated, the TPC information refers to information for controlling the transmission power of the D2D transmission UE.

Here, the D2D transmission UE may control the transmission power for both SA and data based on a single piece of TPC information.

Alternatively, the D2D UE controls transmission power according to the characteristics of each signal by taking the characteristics of SA and data each into account.

In this case, the eNB may transmit TPC information for SA and TPC information for data, individually, in a D2D grant, or transmit different D2D grants for different pieces of TPC information, respectively.

That is, the D2D grant may allocate the TPC information for SA and the TPC information for data to different regions.

The TPC information for SA is used to indicate the transmission power control for SA, and the TPC information for data is used to indicate the transmission power control for data.

Here, each piece of TPC information may indicate the absolute Tx power value or the transmission power value (delta Tx power) relative to the previous Tx power value.

In another method, when two TPC fields (an SA TPC field and a data TPC field) are used to control SA transmission power and data transmission power, the value of one of the TPC fields and an offset may be used to indicate the value of the other TPC field.

For example, if the first TPC field indicates the (absolute) transmission power value for SA and the second TPC field indicates the (absolute) transmission power value for data, the second TPC field is not transmitted individually, but may be obtained by using a value (offset) relative to the absolute transmission power value of the first TPC field.

That is, the first TPC field may indicate the absolute value of transmission power for SA or data, and the second TPC field may be represented by using an offset for the value of the first TPC field.

That is, this method is a method that indicates the relative difference in power between SA and data.

In this method, it is highly likely that changes in transmission power between SA and data will occur in almost the same direction. Thus, if the power value is set using an offset, the transmission power for SA and data may be controlled by using fewer bits.

In general, an SA power control parameter set and a data power control parameter set may be set independently.

That is, transmission power information for SA and D2D data are set with different parameters, so they may be transmitted with different powers.

Especially, SA is more important than D2D data. Thus, the SA transmission power may be set higher than the data transmission power, or SA may be transmitted using more resources.

Moreover, D2D data should be transmitted by taking into account HARQ operation as well as channel coding. Thus, it may be preferable that D2D data is controlled with different transmission power from SA.

However, even if SA and data are set to different transmission power values (initial values, etc.), TPC transmitted by a D2D grant may use a single value to control the transmission power for SA and data.

In this case, even if a D2D UE receives the same TPC information from the eNB, the D2D UE applies different criteria for interpretation so that the transmission power for SA and data may be calculated in different ways.

In this case, the different criteria the D2D UE uses to interpret the transmission power for SA and data for a single TPC may be preset.

For example, if the transmission power for SA can be adjusted in the range from X_SA(dB) to Y_SA(dB) in a 2 bit TPC table, the transmission power for D2D data may be set to range from X_data to Y_data.

Although only the range of transmission power adjustment indicated by the value of the TPC bit field has been described with an example, it may be also possible to calculate the final transmission power for each of different power control parameters by using different definitions, different initial values, and different default values as shown in the example.

Next, the configuration of D2D grant RA information and SA RA information will be described more specifically.

Here, the D2D grant RA may refer to information related to an SA to be used for D2D communication, especially, resource allocation information, and may be represented as a SG (Scheduling Grant) or DCI format 5.

The SA RA information may refer to resource allocation information related to actual SA transmission, and may be represented as PSCCH.

Specifically, the SA RA information may refer to a method as to how the D2D grant RA will be exploited for SA transmission when the D2D transmission UE configures (D2D-related) RA information transmitted by a D2D grant.

As previously described, assuming that there exists an RRC-configured resource pool, the eNB selects a restricted set from the original RRC-configured resource pool and transmits an RA to the D2D UE by a D2D grant.

The D2D transmission UE receives the selected D2D grant RA set from the eNB, and transmits it to a D2D reception UE as it is received or re-selects (or creates) some resources of the selected D2D grant RA set and transmits information on these resources to the D2D reception UE.

Hereinafter, a method for a D2D transmission UE to select part of an RA set received by a D2D grant and transmits the SA to a D2D reception UE through the selected resources will be described in detail with reference to FIG. 36.

FIG. 39 is a flowchart showing an example of a method for transmitting downlink control information, which is proposed in this specification.

That is, FIG. 39 explains a method in which a D2D transmission UE transmits a D2D-related packet to a D2D reception UE through resources selected by itself and receives a D2D-related packet from the D2D reception UE through resources selected by itself.

First, the D2D transmission UE receives reserved and allocated resources related to D2D communication from an eNB (S3910).

The reserved and allocated resources related to D2D communication may be an SA resource pool and/or data resource pool, and may be transmitted via RRC signaling.

Afterwards, the D2D transmission UE selects or determines some of the reserved and allocated resources related to D2D communication that are to be used for actual transmission (S3920).

Since the D2D UE usually transmits and receives a small amount of D2D packets, the amount of resources used by it is smaller than the amount of reserved and allocated resources (or D2D grant RA) received through the eNB.

Afterwards, the D2D transmission UE transmits SA and/or D2D data to the D2D transmission UE through the determined resources (S3930).

As stated above, the SA and/or D2D data may be transmitted simultaneously, or the SA may be transmitted first and then the D2D data.

Here, the D2D UE may operate in Rx mode (listens to other signals) in the resource segments not used for D2D communication, or may enter DTX (Discontinuous Transmission) state and perform energy saving or power saving operation.

By this operation, the D2D transmission UE operating in half-duplex may expand the resource regions it can receive, and therefore may receive resources from more D2D UEs.

Moreover, the D2D reception UE may monitor D2D-related resources (D2D SFs) only in particular (or restricted) SFs (subframes) and receive resources.

In addition, the D2D reception UE also may perform energy saving by performing DRX (Discontinuous reception) in the other D2D SFs without monitoring.

Likewise, the D2D reception UE may secure more resources it can transmit to other D2D UEs, thereby increasing the opportunity of D2D transmission and sending more D2D-related packets.

As shown in FIG. 39, in the method in which the D2D UE uses as many resources as the number of D2D-related packets to be actually transmitted, the D2D transmission UE and the D2D reception UE may adjust the size of resources transmitted or received by them as needed through a negotiation process for signal transmission and reception.

This can increase the efficiency of packet transmission between D2D UEs in a D2D network constructed entirely of meshes.

Here, in the process for adjusting the size of resources to be transmitted or received, signals transmitted or received between D2D UES may be implemented using a high layer signal as well as a physical layer signal.

Next, a method for a D2D transmission UE to transmit an SA to a D2D reception UE by an SA RA will be described in detail with reference to FIG. 40.

FIG. 40 is a flowchart showing an example of a method for transmitting downlink control information according to an embodiment of the present invention.

FIG. 40 relates to a method in which, when there are multiple D2D data transmission resources (or opportunities) in between SA periods, a D2D transmission UE notifies a D2D reception UE of the number of D2D data transmission resources that can be used in between the SA periods.

First, as stated above, the D2D transmission UE receives SA and/or data transmission-related resource allocation information from an eNB by a D2D grant RA (S4010).

Afterwards, the D2D transmission UE transmits configuration information related to the D2D data transmission resources to the D2D reception UE by an SA (S4020).

Hereinafter, the configuration information related to the D2D data transmission resources will be described more specifically.

The configuration information related to the D2D data transmission resources includes indication information that indicates D2D SFs (or D2D data SFs) in which D2D data can be carried.

The indication information may indicate the number of contiguous D2D SFs or indicate an integer multiple of D2D SFs.

If the indication information indicates contiguous D2D SFs, the D2D transmission UE transmits D2D data to the D2D reception UE in contiguous K SFs immediately subsequent to an SA period (S4030).

Afterwards, the D2D transmission UE stops the transmission of D2D data after the contiguous K SFs (S4040).

Offset information may be used as another way to transmit D2D data.

That is, the D2D transmission UE transmits D2D data to the D2D reception UE in contiguous K D2D SFs, starting from the SF which is at an offset from an SA period, rather than the SF immediately next to the SA period, based on the offset information related to D2D data transmission, and then may stop the transmission of D2D data in the subsequent SFs.

If the offset value is too large to secure contiguous D2D SFs within the SA period, the D2D data transmission in the non-secured SFs may be neglected or negated.

Alternatively, the D2D data transmission in the non-secured SFs may be passed to the next SA period, and as many SFs as those not secured, starting from the first SF in the next SA period, may be designated as SFs for D2D data transmission.

Here, it is preferable that indication information (or indication bits) for indicating D2D SFs for D2D data transmission is set by taking into account SA and data resource allocation periods.

For example, if the SA periodicity is 100 ms at maximum and the data transmission periodicity is 10 ms, there are 10 opportunities for data transmission in between the SA periods.

The number of all cases (combinations) as to how many contiguous SFs out of 10 SFs can be contiguously designated should be taken into account, and the indication information requires a field with as many bits as required to support all the combinations.

For example, if an indication is require for 8 cases, the indication information may have a size of 3 bits, and if an indication is required for 10 cases, the indication information may have a size of 4 bits.

The start position and length of an SF related to D2D data transmission may be indicated as another method to indicate a D2D data SF. This method may be implemented by using the UL RA method of LTE(-A).

With the above method of indicating the starting position and length of an SF related to D2D data transmission, the efficiency of resource use may be enhanced since the number of bits of indication information can be reduced.

Next, the use of indication information indicating the position of a D2D data SF in case of an increase of the SA periodicity will be described.

Specifically, if the SA periodicity increases, this may be overcome by repeatedly transmitting indication information indicating the position of a D2D data SF.

For example, if the SA periodicity increases to 400 ms, 4-bit indication information for an SA periodicity of 100 ms and a data transmission periodicity of 10 ms may be re-used four times repeatedly.

Here, the eNB may notify the D2D UE of the position of the D2D data SF while adjusting the number of repetitions of the indication information.

The number of repetitions of a signal used for adjustment of the number of repetitions and or of indication information indicative of the position of the D2D data SF may be predetermined.

In this case, the predetermined value may be transmitted via RRC signaling.

A bitmap pattern may be used as indication information indicative of the position of a D2D data SF.

If the indication information is a bitmap pattern, the D2D data SF may be designated very flexibly.

For example, assuming that the SA periodicity is 100 ms and the data transmission periodicity is 10 ms, 10-bit indication information is needed to indicate all combinations of 10 data transmission periods, as stated above.

If the SA periodicity is 400 ms and the data periodicity is 40 ms, 10-bit indication information with a bitmap pattern is needed. If the data periodicity is 10 ms, 40-bit bitmapped indication information is needed.

However, varying the length of indication information in accordance with the SA and/or data periodicity is difficult in the design of control information.

Accordingly, it is preferable that the size of indication information, that is, the length of a bitmap, is fixed.

To this end, an SA periodicity and data transmission periodicity that can be used as reference are selected, and the size of indication information, that is, the length of a bitmap, is determined in accordance with the selected SA periodicity and data transmission periodicity.

Here, if the number of cases for indicating the position of the D2D data SF increases due to a change in the SA periodicity and data transmission periodicity, the reference bitmapped indication information (reference bitmap) may be repeatedly used.

On the contrary, if the number of cases for indicating the position of the D2D data SF decreases, some of the combinations may be truncated.

For example, if the SA periodicity is 400 ms and the data transmission periodicity is 10 ms, the bitmapped indication information used with the SA periodicity of 100 ms and the data transmission periodicity of 10 ms may be used 4 times repeatedly, thereby indicating the position of the D2D data SF in accordance with the SA periodicity of 400 ms.

The bitmapped indication information used with the SA periodicity of 100 ms and the data transmission periodicity of 10 ms may be referred to as reference indication information or a reference bitmap.

If the SA periodicity is 400 ms and the data transmission periodicity is 20 ms, there are 20 opportunities for data transmission at 400 ms. Thus, 10 bits of the reference bitmap may be repeatedly used two times, thereby indicating the position of the D2D data SF.

On the other hand, if the SA periodicity decreases to 50 ms and the data transmission periodicity is 10 ms, only the highest 5 bits of the 10-bit bitmap indicating the D2D data SF are used (as valid information), and the lowest 5 bits may be neglected or negated.

On the contrary to this, only the lowest 5 bits of the 10-bit bitmap indicating the D2D data SF may be used as valid information, and the highest 5 bits may be neglected or negated.

Next, a method for reducing the number of bits of indication information indicative of the position of a D2D data SF (or a bitmap indicative of a D2D data SF) will be described concretely with reference to FIG. 38.

FIG. 41 is a flowchart showing an example of a method for transmitting downlink control information according to an embodiment of the present invention.

An eNB transmits a pre-defined (D2D) subframe pattern set to a D2D transmission UE by a D2D grant RA (S4110).

Afterwards, the D2D transmission UE selects one or more from the received subframe pattern set (S4120).

Specifically, if the eNB transmits 8 resource patterns (or subframe patterns) out of an RRC-configured D2D resource pool to the D2D transmission UE by a D2D grant RA, the D2D transmission UE selects one or more from the received 8 resource patterns and transmits SA and/or data through the selected resources.

Here, a 3-bit field or 3-bit indication information is defined in order to represent the 8 resource patterns.

That is, the eNB may notify the D2D transmission UE of information about the resource patterns by transmitting 3-bit indication information.

Here, the number of SFs for data transmission in between SA periods may be variously selected and used by configuring the subframe patterns in various ways (e.g., K contiguous initial subframes, an offset, interlaced SF patterns, etc.).

Afterwards, the D2D transmission UE transmits SA and/or data to the D2D reception UE using the selected subframe pattern(s) (S4130).

In another embodiment, D2D-related resource patterns (or subframe patterns) may be hierarchically configured and transmitted to a D2D UE.

For example, the resource patterns may be hierarchically configured such that the RRC-configured resource pool exists in the highest layer, multiple resource patterns exist in a tree-shaped structure in the second highest layer, and more types of resource patterns exist in a tree-shaped structure in the third highest layer.

In this case, the eNB selects one or more from the 2nd layer resource patterns by using RRC-configured 1st layer information and transmits the selected resource pattern(s) to the D2D transmission UE by a D2D grant.

Afterwards, the D2D transmission UE selects one from the 3rd layer resource patterns underlying the received 2nd layer resource patterns and transmits SA and/or data to a D2D reception UE.

Such a hierarchical (tree-shaped) structure of D2D resources and a method of interpreting the same should be shared among the eNB and D2D UEs.

Next, the SA update time will be discussed.

As stated previously, upon receiving a D2D grant from the eNB, the D2D transmission UE transmits an SA to the D2D reception UE in accordance with the SA periodicity by referring to the received D2D grant.

If the D2D transmission UE receives information related to a new SA from the eNB in between SA periods, the existing SA information is valid until the next SA period arrives.

That is, the D2D transmission UE updates the SA in the next SA transmission period. Then, the D2D transmission UE transmits the updated SA to the D2D reception UE in the corresponding SA transmission period.

In this way, the method of updating new control information in the next period may apply equally to TPC information, etc.

The above-described update method involves the activation of D2D resources.

However, the release of D2D resources may be configured differently from the above-described activation of D2D resources.

That is, the D2D transmission UE releases D2D resources immediately upon reception of release-related information from the eNB.

Accordingly, the D2D transmission UE stops the transmission of SA and/or data in the resources that are indicated to be released.

Specifically, when the D2D transmission UE receives information indicative of the release of D2D resources from the eNB in between SA periods, the D2D transmission UE releases D2D resources immediately without waiting for the next SA period to arrive.

Alternatively, in a case where the SA periodicity is configured and the SA update periodicity is configured to be longer than the configured SA periodicity, the following D2D operation may be performed.

That is, if the SA update periodicity and the SA periodicity are configured differently and the SA update periodicity is longer, the activation of D2D resources may be configured for each SA update period, and the release of D2D resources may be configured for each SA transmission, that is, for each SA period.

D2D Format for D2D Scheduling

Hereinafter, the present invention proposes a method of configuring the DCI format of a D2D grant (or sidelink grant).

In other words, the present invention proposes a method of configuring the DCI format of a D2D grant when Mode 1 (i.e., scheduling of resources used for an eNB to transmit data for D2D direct communication or control information) is used, out of the above-explained resource allocation methods for D2D direct communication.

As for Mode 1, again, the eNB configures resource pools required for D2D direct communication. Here, the resource pools required for D2D communication may be divided into a control information pool and a D2D data pool. When the eNB schedules control information and D2D data transmission resources within the resource pools configured for a D2D Tx UE by using a PDCCH or ePDCCH, the D2D Tx UE transmits control information and D2D data using allocated resources.

The D2D Tx UE sends the eNB a request for D2D data transmission resources, and the eNB schedules resources for transmission of control information and D2D direct communication data. The transmission UE transmits a scheduling request (SR) to the eNB, and then a BSR (Buffer Status Report) procedure is performed so that the eNB determines the amount of resources requested by the transmission UE.

D2D Rx UEs monitor the control information pool, and may selectively decode D2D data transmission related to the corresponding control information by decoding control information related to them As described above, a D2D grant serves to deliver control information such as resource allocation, MCS, etc.,—scheduling information—required for the D2D Tx UE to transmit SA and data.

As described above, the D2D control information the D2D Tx UE transmits to the D2D Rx UE may be represented as sidelink control information (SCI). Also, the SCI may be transmitted and received through a PSCCH (Physical Sidelink Control Channel). Accordingly, in this specification, SA (Scheduling Assignment) may be used interchangeably with SCI and/or PSCCH.

Likewise, D2D data may be transmitted and received through a PSSCH (Physical Sidelink Shared Channel). Accordingly, in this specification, D2D data may be used interchangeably with PSSCH.

The DCI format for a D2D grant proposed in this specification may be used for PSCCH scheduling and PSSCH scheduling.

Also, since the D2D Tx UE and the D2D Rx UE may use an SCI for PSSCH scheduling, the DCI format for a D2D grant proposed in the present invention is used for PSCCH scheduling, and may include the SCI's field information.

As such, the DCI format for a D2D grant involves scheduling both SA transmission (i.e., PSCCH) and data transmission (i.e., PSSCH). This requires a large amount of control information, making it difficult to configure it in a single DCI format.

However, configuring it in two DCI formats, as opposed to what has been stated above, causes a huge signaling burden. In other words, two DCI formats as shown previously in FIG. 7 may be needed to transmit scheduling information about both SA and data. That is, different DCI formats may be needed to carry both SA and data scheduling information.

As a compromise, the present invention proposes a method of scheduling both SA and data in a single DCI format (e.g., DCI format 5) by configuring fields in a proper way.

To integrate these formats into one, interrelated fields may be replaced by a single integrated field and non-interrelated fields may be configured as discrete fields, in the process of observing the characteristic of D2D transmission and controlling SA transmission and data transmission.

Hereinafter, the drawings in this specification illustrate the bit length of each field in the DCI format for a D2D grant assuming that an uplink band (or carrier, cell, etc.) at which D2D SA and data are transmitted is 20 MHz. Accordingly, the bit length of each field in the DCI format for a D2D grant may differ if the uplink band has a bandwidth other than 20 Hz.

Also, the bit length of each field illustrated in the drawings in this specification is merely an illustration for convenience of explanation, and the present invention is not limited thereto. Accordingly, the bit length of each field may be defined differently as necessary.

Although the DCI format for a D2D grant (or sidelink grant) involves scheduling information for both SA and data, as described above, the resource assignment/allocation (RA) field (or information) for SA and the RA field (or information) for data may be configured separately. This will be described below with reference to FIGS. 42 and 43.

FIG. 42 is a diagram illustrating a downlink control information format according to an embodiment of the present invention.

Referring to FIG. 42, the DCI format for a D2D grant may includes a frequency hopping flag (FH) field 4201, a resource allocation (RA) field 4202 for D2D SA, a first RA field 4203 for D2D data, a second RA field 4204 for D2D data, a TPC field 4205, and zero padding (ZP) bit(s) 4206 (if any).

The FH field 4201 indicates whether frequency hopping is applicable in SA and data transmissions. The FH field 4201 may apply commonly to SA transmission and data transmission, so it may consist of a single field.

For example, if the FH field 4201 has a value of '1', the D2D Tx UE performs frequency hopping transmission during SA and data transmissions, and if the FH field 4201 has a value of '0', the D2D Tx UE does not perform frequency hopping transmission during SA and data transmissions.

The SA RA field 4202 (or PSCCH RA field, resource field for PSCCH) indicates resources information for SA transmission. That is, it indicates scheduling information (i.e., resource information) for PSCCH transmission. Accordingly, the D2D Tx UE transmits SA (i.e., PSCCH) in the resources indicated by the SA RA field 4202.

Here, the SA RA field 4202 may include information (or indices) for deriving the positions of time and/or frequency resource regions for SA transmission.

For example, the SA RA field 4202 may indicate the starting position (i.e., index) in resources for SA transmission. In other words, the SA RA field 4202 may indicate the starting indices of subframes and/or resource blocks in which SA is transmitted.

Moreover, the D2D Tx UE may derive time resources (for example, subframe indices) and/or frequency resources (for example, resource block indices) for SA transmission by using a predetermined function (equation) based on the information included in the SA RA field 4202.

Resource allocation information for D2D data transmission may comprise a D2D data first RA field 4203 (or first PSSCH RA field, resource block assignment and hopping resource allocation field) and a D2D data second RA field 4204 (or second PSSCH RA field, time resource pattern field).

The D2D data first RA field 4203 indicates resource information (e.g., resource blocks) for D2D data transmission in the frequency domain. That is, it indicates scheduling information for PSSCH transmission in the frequency domain. Accordingly, the D2D Tx UE transmits D2D data (i.e., PSSCH) in the frequency resources indicated by the D2D data first RA field 4203.

For example, the D2D data first RA field 4203 may indicate the starting position (i.e., starting resource block index) in resource blocks for D2D data transmission and a length in terms of allocated resource blocks, by using RIV only, as in the UL RA method.

Moreover, the D2D data first RA field 4203 may indicate the starting position (i.e., starting resource block index) and last position (i.e., last resource block index) in resource blocks for D2D data transmission, separately by different fields (or information). In this case, more bits (e.g., 1 bit) may be required.

The D2D data second RA field 4204 indicates resource information (e.g., subframes) used for D2D data transmission in the time domain. That is, it indicates scheduling information for PSSCH transmission in the time domain. Accordingly, the D2D Tx UE transmits D2D data (i.e., PSSCH) in the time resources indicated by the D2D data second RA field 4204.

For example, the D2D data second RA field 4204 may indicate a subframe pattern (i.e., time resource pattern) to be used for D2D data transmission. That is, the D2D data second RA field 4204 may include information indicating a time resource pattern used for PSCCH transmission.

Here, the D2D data second RA field 4204 may indicate any one of a plurality of predetermined time resource patterns. For example, n subframes patterns (represented by a bitmap) are defined in advance as an SF pattern #0(10001010), SF pattern #1(00111001), . . . , SF pattern #n(10011001), and this field may indicate any one of the n defined subframe patterns. Here, the value '1' of the bitmap may mean that D2D data is transmitted in the corresponding subframe, and the value '0' of the bitmap may mean that D2D data is not transmitted in the corresponding subframe. Also, these values may mean the opposite.

The TPC field 4205 indicates the transmission power for SA and data transmission by the D2D Tx UE. That is, it indicates transmission power information for PSCCH and PSSCH.

As shown in FIG. 42, the TPC field 4205 may consist of a single field. If the TPC field 4205 consists of a single field, the value of the TPC field 4205 applies commonly to the transmission power for SA and data transmissions.

The ZP 4206 may be filled with control information, or not be used, or not exist as necessary. That is, it may be omitted if not necessary.

The sequence of the fields of the DCI format and the number of bits of each field illustrated above are only an illustration for convenience of explanation, and may be changed.

As compared to the above DCI format 0 of FIG. 7, the DCI format for a D2D grant illustrated in FIG. 39 does not include the MCS field.

If the eNB notifies the D2D Tx UE of the MCS value, it is necessary that the MCS field exists in the DCI format for a D2D grant. However, the MCS value needs to be set by the D2D Tx UE itself, or needs to be provided via high layer signaling (e.g., RRC signaling) or set to a fixed value. Accordingly, the MCS field may not be included as in FIG. 42.

Moreover, the DCI format for a D2D grant illustrated in FIG. 42 neither includes the NDI field nor the RV field. The NDI and RV values may be set by the D2D Tx UE itself, or provided via high layer signaling (e.g., RRC signaling) or set to a fixed value, as is with the MCS value.

Meanwhile, the TPC field may be configured for SA and data transmissions separately. This will be described below with reference to FIG. 43.

FIG. 43 is a diagram illustrating a downlink control information format according to an embodiment of the present invention.

Referring to FIG. 43, the DCI format for a D2D grant may consist of a frequency hopping flag (FH) field 4301, a resource allocation (RA) field 4302 for D2D SA, a first RA field 4303 for D2D data, a second RA field 4304 for D2D data, TPC fields 4305 and 4306, and zero padding (ZP) bit(s) 4307 (if any).

As for the DCI format for a D2D grant as shown in FIG. 43, the fields may be defined the same as what is illustrated previously in FIG. 42, except for the TPC fields 4305 and 4306. Now, only the differences with the illustration of FIG. 42 will be described.

It may be preferable that TPC applies differently to SA and data. Thus, the DCI format may consist of two TPC fields 4305 and 4306, as shown in FIG. 43. That is, the DCI format may comprise a first TPC field (TPC 1) 4305 indicating the transmission power for PSCCH and a second TPC field (TPC 2) 4306 indicating the transmission power for PSSCH.

Here, either of the TPC field indicating the transmission power for PSCCH and the TPC field indicating the transmission power for PSSCH may come first. That is, the TPC field 4305 that comes first may indicate the transmission power for SA transmission, and the TPC field 4306 that comes later may indicate the transmission power for data transmission, or vice versa.

In this case, the TPC fields 4305 and 4306 may include their own TPC information, or one of the TPC fields 4305 and 4306 may include TPC information and the other TPC field may include the corresponding offset TPC information.

The sequence of the fields of the DCI format and the number of bits of each field illustrated above are only an illustration for convenience of explanation, and may be changed.

Meanwhile, the DCI format for a D2D grant may have additional information such as the D2D Rx UE ID because of the D2D characteristics. This will be described below with reference to the drawings.

FIG. 44 is a diagram illustrating a downlink control information format according to an embodiment of the present invention.

Referring to FIG. 44, the DCI format for a D2D grant may consist of a frequency hopping flag (FH) field 4401, a resource allocation (RA) field 4402 for D2D SA, a first RA field 4403 for D2D data, a second RA field 4404 for D2D data, a TPC field 4405, zero padding (ZP) bit(s) 4406 (if any), and an Rx_ID field 4407.

As for the DCI format for a D2D grant as shown in FIG. 44, the fields may be defined the same as what is illustrated previously in FIG. 42, except that the Rx_ID field 4407 is added. Now, only the differences with the illustration of FIG. 42 will be described.

The D2D Tx UE may transmit D2D data in a unicast or multicast fashion. In this case, information for identifying a target UE or a target UE group is needed.

Accordingly, the Rx_ID field 4407 is used to designate a target UE or a target UE group. That is, the Rx_ID field 4407 includes identification information (i.e., target UE ID) for identifying the target UE or identification information (i.e., target group ID) for identifying the target UE group.

The sequence of the fields of the DCI format and the number of bits of each field illustrated above are only an illustration for convenience of explanation, and may be changed.

Meanwhile, the DCI format for a D2D grant may further include MCS information. This will be described below with reference to the drawings.

FIG. 45 is a diagram illustrating a downlink control information format according to an embodiment of the present invention.

Referring to FIG. 45, the DCI format for a D2D grant may consist of a frequency hopping flag (FH) field 4501, a resource allocation (RA) field 4502 for D2D SA, a first RA field 4503 for D2D data, a second RA field 4504 for D2D data, a TPC field 4505, zero padding (ZP) bit(s) 4506 (if any), an MCS field 4507, and an Rx_ID field 4508.

As for the DCI format for a D2D grant as shown in FIG. 45, the fields may be defined the same as what is illustrated previously in FIG. 42, except that the MCS field 4507 and the Rx_ID field 4508 are added. Now, only the differences with the illustration of FIG. 42 will be described.

The MCS field 4507 includes MCS information for D2D SA and/or data transmission (or an index for indicating an MCS value). That is, it indicates MCS information for PSCCH and/or PSSCH.

MCS information determined by the eNB may be included in the DCI format on the assumption that the eNB knows better about a D2D link (i.e., sidelink) than the D2D Tx UE. For example, the eNB may estimate the D2D link's channel status based on a buffer status report BSR received from the D2D Tx UE, and determine the MCS of SA and/or data the D2D Tx UE will transmit.

The MCS field 4507's information may be used for SA and/or data transmission from the D2D Tx UE to the D2D Rx UE. For example, the MCS field 4507's information may be used equally for both SA transmission and data transmission. Also, the MCS for SA transmission may be set to a fixed value, and the MCS for data transmission may be determined based on the information indicated by the MCS field 4507.

The Rx_ID field 4508 is used to designate a target UE or a target UE group. That is, the Rx_ID field 4508 includes identification information (i.e., target UE ID) for identifying the target UE or identification information (i.e., target group ID) for identifying the target UE group.

Although FIG. 45 illustrates that the TPC field 4505 consists of one field, it may be divided into a TPC field for SA and a TPC field for data and included in the DCI format, as illustrated previously in FIG. 43.

The sequence of the fields of the DCI format and the number of bits of each field illustrated above are only an illustration for convenience of explanation, and may be changed.

Meanwhile, the DCI format for a D2D grant may indicate an SA resource region in a different way. This will be described below with reference to the drawings.

FIG. 46 is a diagram illustrating a downlink control information format according to an embodiment of the present invention.

Referring to FIG. 46, the DCI format for a D2D grant may consist of a frequency hopping flag (FH) field 4601, a resource allocation (RA) field 4602 for D2D SA, a first RA field 4603 for D2D data, a second RA field 4604 for D2D data, an Rx_ID field 4605, a TPC field 4606, and zero padding (ZP) bit(s) 4607 (if any).

As for the DCI format for a D2D grant as shown in FIG. 46, the fields may be defined the same as what is illustrated previously in FIG. 42, except that the Rx_ID field 4607 is added and the length of the resource allocation (RA) field 4602 is adjusted to be shorter. Now, only the differences with the illustration of FIG. 42 will be described.

In the resource allocation (RA) field 4602 for SA, an SA resource region is not directly designated, but an indicator for indicating a subframe pattern selected from a pre-designated subframe pattern set may be included. That is, it may include information indicating a time resource (e.g., subframe) pattern used for PSCCH transmission.

For example, n subframes patterns (represented by a bitmap) are defined in advance as an SF pattern #0(10001010), SF pattern #1(00111001), . . . , SF pattern #n(10011001), and this field may indicate any one of the n defined subframe patterns. Here, the value '1' of the bitmap may mean that SA is transmitted in the corresponding subframe, and the value '0' of the bitmap may mean that SA is not transmitted in the corresponding subframe. Also, these values may mean the opposite.

FIG. 46 illustrates that one subframe pattern is selected from a maximum of 8 subframe patterns. In this case, the resource allocation (RA) field for SA may consist of 3 bits. However, the present invention is not limited thereto, and the number of bits in the resource allocation (RA) field 4602 for SA may be determined depending on the total number of subframe patterns.

In this case, the D2D Tx UE determines frequency resources (e.g., resource blocks) for SA transmission randomly or according to a predetermined rule, in a subframe corresponding to a subframe pattern indicated by the resource allocation (RA) field 4602. Also, SA is transmitted in the determined frequency resources (e.g., resource blocks).

The D2D Rx UE may monitor all the resource blocks for the subframe corresponding to the subframe pattern indicated by the resource allocation (RA) field 4602 and receive SA. Also, the D2D Rx UE may monitor frequency resources (e.g., resource blocks) determined by the predetermined rule and receive SA.

The Rx_ID field 4605 is used to designate a target UE or a target UE group. That is, the Rx_ID field 4605 includes identification information (i.e., target UE ID) for identifying the target UE or identification information (i.e., target group ID) for identifying the target UE group.

The sequence of the fields of the DCI format and the number of bits of each field illustrated above are only an illustration for convenience of explanation, and may be changed.

Meanwhile, an MCS field may be added to the DCI format illustrated in FIG. 46. This will be described below with reference to the drawings.

FIG. 47 is a diagram illustrating a downlink control information format according to an embodiment of the present invention.

Referring to FIG. 47, the DCI format for a D2D grant may consist of a frequency hopping flag (FH) field 4701, a resource allocation (RA) field 4702 for D2D SA, a first RA field 4703 for D2D data, a second RA field 4704 for D2D data, an MCS field 4705, a TPC field 4706, zero padding (ZP) bit(s) 4707 (if any), and an Rx_ID field 4708.

As for the DCI format for a D2D grant as shown in FIG. 47, the fields may be defined the same as what is illustrated previously in FIG. 46, except that the MCS field 4705 is added. Now, only the differences with the illustration of FIG. 46 will be described.

As explained previously, the eNB may estimate the D2D link's channel status based on a BSR received from the D2D Tx UE, and determine the MCS of SA and/or data the D2D Tx UE will transmit.

The MCS field 4705's information may be used for SA and/or data transmission from the D2D Tx UE to the D2D Rx UE. For example, the MCS for SA transmission may be set to a fixed value, and the MCS for data transmission may be determined based on the information indicated by the MCS field 4705.

The sequence of the fields of the DCI format and the number of bits of each field illustrated above are only an illustration for convenience of explanation, and may be changed.

Meanwhile, the DCI format for a D2D grant may further include DMRS (demodulation reference signal) CS (cyclic shift) information. This will be described below with reference to the drawings.

FIG. 48 is a diagram illustrating a downlink control information format according to an embodiment of the present invention.

Referring to FIG. 48, the DCI format for a D2D grant may consist of a frequency hopping flag (FH) field 4801, a resource allocation (RA) field 4802 for D2D SA, a first RA field 4803 for D2D data, a second RA field 4804 for D2D data, an MCS field 4805, a TPC field 4806, zero padding (ZP) bit(s) 4807 (if any), a DMRS CS field 4808, and an Rx_ID field 4809.

As for the DCI format for a D2D grant as shown in FIG. 48, the fields may be defined the same as what is illustrated previously in FIG. 47, except that the DMRS CS field 4808 is added. Now, only the differences with the illustration of FIG. 47 will be described.

The DMRS CS field 4808 includes DMRS CS information for SA and/or demodulation. That is, the DMRS CS field 4808 may include a CS value (or an index for indicating it) for identifying a DMRS. Also, the DMRS CS field 4903 may include orthogonal cover code (OCC) information, along with the CS value, or may include an index for indicating it.

DMRS refers to a signal for demodulating SA and/or data transmitted by the D2D Tx UE. A cyclically shifted DMRS sequence may be generated by cyclically shifting a base sequence by the CS value indicated by the DMRS CS field 4808. Also, DMRS may be mapped and transmitted on the same resource region (e.g., resource blocks) where SA and/or data is transmitted.

The sequence of the fields of the DCI format and the number of bits of each field illustrated above are only an illustration for convenience of explanation, and may be changed.

Meanwhile, the foregoing FIGS. 42 through 48 illustrate that the RA field for SA and the RA field for data are configured separately and the information included in the respective RA fields indicates resources for SA and resources for data, respectively.

It should be noted that the RA information for SA transmission and the RA information for data may correlate to each other.

Assuming that the RA field for SA is 'RA 1' and the RA fields for data (the first RA field for D2D data and/or second RA field for D2D data as shown in FIGS. 42 through 48) are 'RA 2', transmission may occur in such a manner that RA 1 indicates the position of a SA resource region and information obtained by a combination of RA 1 and RA 2 indicates the position of a data resource region.

That is, the correlation between the SA and data resource regions may be taken into account and used for RA field configuration to configure indication bits in such a manner as to involve the correlation between the RA field information.

In this case, the D2D Tx UE may determine the SA resource region based on the information included in the RA 1 field and determine the data resource region based on the information obtained by the combination of the RA 1 field and the RA 2 field.

On the contrary, transmission may occur in such a manner that RA 2 indicates the position of a data resource region and information obtained by a combination of RA 1 and RA 2 indicates the position of a SA resource region.

In this case, the D2D Tx UE may determine the data resource region based on the information included in the RA 2 field and determine the SA resource region based on the information obtained by the combination of the RA 1 field and the RA 2 field.

More specifically, for example, the RA 2 field may indicate the resource regions (positions of time/frequency resources for data transmission) to be actually transmitted, and the RA 1 field may indicate the positions of resources for SA transmission, which are at a certain offset from the positions of time/frequency resources in the RA 2 field, that is, offset information. Contrariwise, the RA 1 field may indicate the positions of resource regions for SA transmission, and the RA 2 field may indicate the positions of resources for data transmission, which are at a certain offset from the positions of resources in the RA 1 field, that is, offset information.

Meanwhile, the RA field for D2D SA transmission may be omitted from the DCI format for a D2D grant. This will be described below with reference to the drawings.

FIG. 49 is a diagram illustrating a downlink control information format according to an embodiment of the present invention.

Referring to FIG. 49, the DCI format for a D2D grant may consist of a frequency hopping flag (FH) field 4901, an MCS field 4902, a DMRS CS field 4903, a first RA field 4904 for D2D data, a second RA field 4905 for D2D data, a TPC field 4906, and zero padding (ZP) bit(s) 4907 (if any).

The FH field 4901 indicates whether frequency hopping is applicable in SA and data transmission. The FH field 4901 may apply commonly to SA transmission and data transmission, so it may consist of a single field.

The MCS field 4902 includes an MCS value for D2D SA and/or data transmission (or an index for indicating the MCS value).

The MCS field 4902's information may be used for SA and/or data transmission from the D2D Tx UE to the D2D Rx UE. For example, the MCS field 4902's information may be used equally for both SA transmission and data transmission. Also, the MCS for SA transmission may be set to a fixed value, and the MCS for data transmission may be determined based on the information indicated by the MCS field 4902.

The DMRS CS field 4903 may include a CS value (or an index for indicating it) for identifying a DMRS. Also, the DMRS CS field 4903 may include orthogonal cover code (OCC) information, along with the CS value, or may include an index for indicating it.

A cyclically shifted DMRS sequence may be generated by cyclically shifting a base sequence by the CS value indicated by the DMRS CS field 4903. Also, DMRS may be mapped and transmitted on the same resource region (e.g., resource blocks) where SA and/or data is transmitted.

Resource allocation information for D2D data transmission may comprise a D2D data first RA field 4904 (or first PSSCH RA field, resource block assignment and hopping resource allocation field) and a D2D data second RA field 4905 (or second PSSCH RA field, time resource pattern field).

The D2D data first RA field 4904 indicates resource information (e.g., resource blocks) for D2D data transmission in the frequency domain. That is, it indicates scheduling information for PSSCH transmission in the frequency domain. Accordingly, the D2D Tx UE transmits D2D data (i.e., PSSCH) in the frequency resources indicated by the D2D data first RA field 4904.

For example, the D2D data first RA field 4904 may indicate the starting position (i.e., starting resource block index) in resource blocks for D2D data transmission and a length in terms of allocated resource blocks, by using RIV only, as in the UL RA method.

Moreover, the D2D data first RA field 4904 may indicate the starting position (i.e., starting resource block index) and last position (i.e., last resource block index) in resource blocks for D2D data transmission, separately by different fields.

The D2D data second RA field 4905 indicates resource information (e.g., subframes) used for D2D data transmission in the time domain. That is, it indicates scheduling information for PSSCH transmission in the time domain. Accordingly, the D2D Tx UE transmits D2D data (i.e., PSSCH) in the time resources indicated by the D2D data second RA field 4905.

For example, the D2D data second RA field 4905 may indicate a subframe pattern (i.e., time resource pattern) to be used for D2D data transmission. That is, it may indicate any one of a plurality of predetermined time resource patterns.

The time/frequency resource regions for SA transmission may not be configured. That is, the D2D Tx UE may randomly select resources from an SA resource pool configured via high layer signaling (e.g., RRC signaling) and transmit SA. In this case, the D2D Rx UE may monitor the entire SA resource pool and receive SA from the D2D Tx UE.

Moreover, the positions of time/frequency resource regions for SA transmission may be derived from the time/frequency resources for data transmission. For example, the positions of time/frequency resource regions for SA transmission may be derived from the time/frequency resources for data transmission according to a predetermined rule or by using predetermined offset values.

The TPC field 4906 indicates the transmission power for SA and data transmissions by the D2D Tx UE.

The ZP 4907 may be filled with control information, not be used, or not exist as necessary. That is, it may be omitted if not necessary.

The sequence of the fields of the DCI format and the number of bits of each field illustrated above are only an illustration for convenience of explanation, and may be changed.

FIG. 50 is a diagram illustrating a downlink control information format according to an embodiment of the present invention.

Referring to FIG. 50, the DCI format for a D2D grant may consist of a frequency hopping flag (FH) field 5001, an MCS field 5002, a DMRS CS field 5003, a first RA field 5004 for D2D data, a second RA field 5005 for D2D data, a TPC field 5006, zero padding (ZP) bit(s) 5007 (if any), and an Rx_ID field 5008.

As for the DCI format for a D2D grant as shown in FIG. 50, the fields may be defined the same as what is illustrated previously in FIG. 49, except that the Rx_ID field 5008 is added. Now, only the differences with the illustration of FIG. 49 will be described.

The Rx_ID field 5008 is used to designate a target UE or a target UE group. That is, the Rx_ID field 5008 includes identification information (i.e., target UE ID) for identifying the target UE or identification information (i.e., target group ID) for identifying the target UE group.

The sequence of the fields of the DCI format and the number of bits of each field illustrated above are only an illustration for convenience of explanation, and may be changed.

A Resource Pattern for Transmission (RPT) field for transmitting SA and data to the DCI may be formed in one.

The eNB transmits D2D grant (or sidelink grant) and enables the D2D Tx UE to perform D2D transmission to the D2D Rx UE using a value indicated in Table 9.

Table 9 illustrates a DCI format according to an embodiment of the present invention.

Table 9 is an illustration for a description of the present invention and a field name, a length, and usage may be different.

TABLE 9

| Field Name | Length | Use in D2D-Data-grant |
|---|---|---|
| Flag for format0/format1A differentiation | 1 | RPT index |
| Hopping flag | 1 | Use as is |
| NUL_hop | 1 (1.4 MHz) | Use as is |
| | 1 (3 MHz) | |
| | 1 (5 MHz) | |
| | 2 (10 MHz) | |
| | 2 (15 MHz) | |
| | 2 (20 MHz) | |

TABLE 9-continued

| Field Name | Length | Use in D2D-Data-grant |
|---|---|---|
| Resource block assignment | 5 (1.4 MHz) | Use as is for resource of data. Resource of SA is derived from this field. |
| | 7 (3 MHz) | |
| | 7 (5 MHz) | |
| | 11 (10 MHz) | |
| | 12 (15 MHz) | |
| | 13 (20 MHz) | |
| MCS and RV | 5 | Use as is for data |
| NDI (New Data Indicator) | 1 | RPT index |
| CQI request (1 bit) | 1 | RPT index |
| TPC | 2 | Use as is |
| Cyclic shift for DM RS | 3 | Use as is (or 1-2 bit can be used for other purpose like RPT or target ID) |
| UL index (TDD only) | 2 | Reserved |
| Downlink Assignment Index (DAI) | 2 | Reserved |

Referring to Table 9, a flag (Flag for format0/format1A differentiation) field for distinguishing a DCI format 0 and a format 1A, a New Data Indicator (NDI) field, a CQI (or CSI) request field may be replaced with a time resource pattern (or subframe pattern)(i.e., RPT) field for D2D data and SA.

Finally, a DCI format for D2D grant may be formed with a frequency hopping flag (FH) field, an RA field (including a frequency hopping type indication bit (NUL_hop) for D2D data, a MCS and RV field, a TPC field, a resource pattern of transmission (RPT) field for D2D data and SA, a DMRS CS field, an UL index field (existing in only TDD), and a downlink allocation index (DAI) field (existing in only TDD).

As a result, the DCI format for the D2D grant may include a frequency hopping flag (FH) field, a RA field (including a frequency hopping type indication bit N_UL_hop) for D2D data, MCS and RV fields, a TPC field, a transmission resource pattern (RPT) for D2D data and SA, a DMRS CS field, a UL index field (existed only in TDD) and a DL allocation index (DAI) field (existed only in TDD).

In this case, a field that indicates a SA resource is not included in a DCI format, but a location of a SA resource may be derived based on a predetermined rule (or function) from the RA field for D2D data.

For example, the RA field for D2D data may indicate a start location (i.e., start resource block index) and a length of an allocated resource block of a resource block for D2D data transmission using one value of an RIV, as in an UL RA method.

Further, the RA field for D2D data may classify and notify a start location (i.e., start resource block index) and an end location (i.e., final resource block index) of a resource block for D2D data transmission into a separate field (or information).

The RA field for D2D data may include a bit NUL_hop that indicates a frequency hopping type. In this case, in bits constituting the RA field for D2D data, 1 bit or 2 bits of a MSB (or high order bit) are used as a bit NUL_hop that indicates a frequency hopping type, and the remaining bits may be used for indicating an RA for D2D data.

A bit NUL_hop that indicates a frequency hopping type may be formed with 1 bit or 2 bits according to an uplink bandwidth, as described above and indicates a frequency hopping type 1 or 2 (see Tables 5 and 6).

The MCS and RV field includes MCS information (or an index that indicates a MCS value) and redundancy version (RV) for D2D data transmission. That is, the MCS and RV field indicates MCS information and an RV value for transmitting a PSSCH.

The TPC field indicates transmission power for transmitting SA and data in the D2D Tx UE. That is, the TPC field indicates transmission power information of the PSCCH and the PSSCH.

The DMRS CS field includes CS information of the DMRS for demodulating SA and/or data. That is, the DMRS CS field may include a CS value (or an index that indicates the CS value) for distinguishing the DMRS. Further, the DMRS CS field may include orthogonal cover code (OCC) information together with the CS value or may include an index that indicates the OCC information.

Here, 1 bit or 2 bits of the DMRS CS field may be used for a RPT field for D2D data and SA or a target ID field (separately formed when a target ID field exists) for indicating target ID.

The UL index field and DAI field may be included in the DCI format under only a TDD operation. For example, the UL index field may exist in only a TDD operation according to an uplink-downlink configuration 0, and the DAI field may exist in only a TDD operation according to an uplink-downlink configuration 1-6.

The RPT field for D2D data and SA indicates resource information (e.g., subframe) used for SA and/or D2D data transmission in a time domain. That is, the RPT field indicates scheduling information in a time domain for transmitting a PSCCH and/or a PSSCH.

A detailed description of the RPT field for D2D data and SA will be described later.

Further, some changes are added to a structure of Table 9, DMRS related information is deleted, and an entire bit of a corresponding field may be used for designating an RPT.

TABLE 10

| Field Name | Length | Use in D2D-Data-grant |
|---|---|---|
| Hopping flag | 1 | Use as is |
| NUL_hop | 1 (1.4 MHz) | Use as is |
| | 1 (3 MHz) | |
| | 1 (5 MHz) | |
| | 2 (10 MHz) | |
| | 2 (15 MHz) | |
| | 2 (20 MHz) | |
| Resource block assignment | 5 (1.4 MHz) | Use as is for resource of data. Resource of SA is derived from this field. |
| | 7 (3 MHz) | |
| | 7 (5 MHz) | |
| | 11 (10 MHz) | |
| | 12 (15 MHz) | |
| | 13 (20 MHz) | |
| MCS and RV | 5 | Use as is for data |
| TPC for PUSCH | 2 | Use as is |
| RPT indication | 6 | New field |
| UL index (TDD only) | 2 | Reserved |
| Downlink Assignment Index (DAI) | 2 | Reserved |

Table 10 is different from Table 9 in that 3 bits of a cyclic shift field for a DMRS are used as an RPT field, compared with Table 9. In this case, a DCI format structure of Table 10 may be generated, and an RPT field for D2D data and SA may be used as total 6 bits.

When simply representing this, FIG. 51 is shown. This will be described in detail with reference to the drawings.

FIG. 51 is a diagram illustrating a downlink control information format according to an embodiment of the present invention.

Referring to FIG. 51, a DCI format for D2D grant may include a frequency hopping flag (FH) field 5101, a RA field (including a frequency hopping type indication bit NUL_hop) 5102 for D2D data and SA, a RPT field 5103 for D2D data and SA, and a TPC field 5104 for SA and data transmission.

FIG. 51 simply illustrates only necessary fields and may include other fields. For example, a MCS field and a DMRS CS field may be further included, and the TDD may further include an UL index field and a downlink allocation index (DAI) field.

The FH field 5101 and the TPC field 5104 are the same as a description of Table 9 and therefore a detailed description thereof will be omitted.

First, the RA field 5102 for D2D data and SA will be described.

In order to represent both a SA transmission location (i.e., resource block location) and a data transmission location, the RA field 5102 for D2D data and SA requires many bits. The SA transmission location and the data transmission location are actually important for D2D transmission and reception, but because the bit number required for transmitting D2D is not small, it has a great influence on a control channel performance to reduce the bit number. Therefore, as a method for integrating two kinds of RA into one RA, a method of estimating (deriving) another RA information from one RA information is suggested. This will be described in detail with reference to the drawings.

FIG. 52 is a diagram illustrating a method of deriving a resource block for SA transmission according to an embodiment of the present invention.

Referring to FIG. 52, it is assumed that the D2D Tx UE received allocation of RB x, RB x+1, . . . , RB x+a−1 as a resource block for D2D data transmission from the RA field 5102 of FIG. 51.

In this case, an RB used for SA transmission may be represented as follows. Hereinafter, for convenience of description, it is assumed that the number of RBs used for D2D data transmission is a and that the number of RBs used for SA transmission is b.

Here, the RB number (b) used for SA transmission may be previously fixed and determined or may be determined by high layer signaling or system information (e.g., SIB or MIB) such as RRC signaling. Further, the RB number (b) used for SA transmission may be derived from the RB number (a) used for data transmission using a predetermined rule (or equation).

First, as shown in FIG. 52A, when an RB (i.e., data RA) for data transmission is allocated from the RA field 5102, a start location of the RB for SA transmission is the same as a start location of data RA and may occupy the b number of RBs. Therefore, the SA RB index may be represented with x, x+1, x+b−1.

Here, an actual transmission subframe of SA may be the same subframe as data and may be a different subframe.

Further, similarly, as shown in FIG. 52B, b RB may be occupied from a final location of an RB (i.e., data RA) for data transmission. Therefore, SA is transmitted from an RB index (x+a−1)−b location to a b RB band. That is, the SA RB index may be represented with x+a−b−1, x+a−b, x+a−1.

As shown in FIG. 52C, the SA RB index may be located at an intermediate portion of a data RA, and in this case, the SA RB index may be represented with $$x + \left\lceil \frac{a-b}{2} \right\rceil, x + \left\lceil \frac{a-b}{2} \right\rceil + 1, \ldots, x + \left\lceil \frac{a-b}{2} \right\rceil + b - 1.$$

In this case, the center of the SA RB may not be the center of the data RB, and in some case, the center of the SA RB may be deviated by 1 or 2 RB from the center of the data RB. In such a phenomenon, when the number of the data RB is an even number and when the number of the SA RB is an odd number, an SA RB location may not be located at the center of the data RB location and thus a location of one more index or one less index based on the center of the data RB may be the center of the SA RB. When the number of the data RB is an odd number and when the number of the SA RB is an odd number, the entire of two resource areas may have the same center. However, when the number of the data RB is an odd number, but when the number of the SA RB is an even number, the center is deviated by 1 RB.

In short, when the data RB number and the SA RB number are equally an even number or an odd number, the centers of two allocation resource areas are the same, and the SA RB may be located at the center of the data RB. However, when any one of the data RB number and the SA RB number is an even number and the other one is an odd number (or vice versa), the centers of two allocation resource areas are not the same, and the SA RB may not be located at the center of the data RB.

Therefore, in this case, a special rule is required. In order words, when an RB located at the center of the data RB is 'RB x_c', it should be previously determined whether to set 'RB x_c−1' having an index smaller than 'RB x_c' to the center of the SA RB or whether to set 'RB x_c+1' having an index larger than 'RB x_c' to the center of the SA RB.

This is a fixed value and may be previously determined by a rule. Further, because it may be changed according to a bandwidth size used for D2D signal (i.e., SA and/or data) transmission, a resource size allocated to a D2D signal (i.e., SA and/or data) transmission or a rate of a resource allocated for SA and data transmission, a transmission mode, and an operation mode and may be set by superordinate layer signaling.

Further, blind decoding is performed to find a location of SA based on the center of the data RB and may be used for determining a transmission and/or operation mode based on information obtained from location information of the center of the detected SA RB.

SA resource allocation is not available in an entire RB index and there may be a restriction that SA resource allocation should be located at, for example, only an RB index, which is the multiple of C. That is, in the RB index, an SA resource may be allocated at only the multiple of C. In this way, when a restriction exists at a start time point (location) of the SA RB (i.e., when the start of the RB index is the multiple of C), an index of an SA RB start point may be defined to $$C \left\lceil \frac{a - x + \left\lceil \frac{a-b}{2} \right\rceil}{C} \right\rceil.$$

As described above, in a transmitting method of including an RB in which the SA is transmitted in an RB in which data are transmitted, when SA and data are transmitted to the same subframe, the SA may be punctured or may be rate matched to data.

Meanwhile, in the above description, a method for a resource position allocated for the SA transmission being determined has been described based on the resource position allocated for the D2D data transmission, but the present invention is not limited thereto. However, the method may be performed in opposite manner. That is, in the case that a resource allocation position for the SA transmission is determined and a receiver side knows it, the resource position (i.e., RA) for the D2D data transmission may be derived based on the information. For example, as the same as the method described above, the starting position of an SA resource may be determined to be the starting position of the D2D data resource.

Hereinafter, resource allocation information transferred in the RA field 5102 will be described in detail.

As described above, the LTE/LTE-A system supports a method of notifying a resource indication value (RIV) in a method (i.e., downlink resource allocation type 2 or uplink resource allocation type 0) of allocating a resource formed with a continuous resource block among resource allocation methods.

In this case, the RIV notifies an RB_start and an RB_length by a preliminary formula (i.e., conversion table). Therefore, in this case, a used parameter may be applied to the equation.

That is, the D2D Tx UE derives an RB_start and an RB_length in which an RIV value indicates based on a predetermined conversion table. In an illustration of FIG. 52, an RB_start index corresponds to 'x', and the RB_length corresponds to 'a'.

Therefore, the D2D Tx UE may identify an RB for data transmission using an RIV transferred in the RA field 5102 and derive an RB for SA transmission from the RB used for data transmission based on the above-described rule.

Further, in consideration that a location of the RB to which the SA is transmitted is included in an RB band to which data are transmitted, an RB used for SA transmission may be indicated using a subset of RIV.

That is, by the above-described rule, a location of an SA RB is not determined, an RIV for data and an RIV for SA may be each transferred in the RA field 5102. This will be described in detail with reference to the drawings.

FIG. 53 is a diagram illustrating a method of designating a resource block for transmitting a D2D signal according to an embodiment of the present invention.

FIG. 53A illustrates an RIV table for determining an RB for data transmission, and FIG. 53B illustrates an RIV table for determining an RB for SA transmission.

Referring to FIG. 53A, when an RIV value (RIV_data='16') for data of 5RB bandwidth (BW) is indicated in the RA field 5102, an RB_start of the RB for data transmission is '1' (i.e., RB index 1) and an RB_length of the RB is '4'. That is, an RB 5301 used for data transmission starts from the RB index 1 and corresponds to total four RBs.

Because a data transmission band is 4RB and SA is transmitted within the band, an RIV_SA table based on 4RB as one method that indicates the SA is formed as shown in FIG. 53B and RIV_SA may be indicated to correspond to the table. That is, when a data transmission band is determined, an RIV table corresponding to the bandwidth is generated, and the eNB determines and transmits an RIV for SA. For example, the eNB determines the number (bandwidth) of D2D data transmission RBs allocated to the D2D Tx UE and generates an RIV_SA table according to the number (bandwidth) of a corresponding transmitting RB. The eNB transmits an SA RIV value for indicating an SA transmission resource to a corresponding D2D Tx UE.

In reverse order, the D2D Tx UE may receive a data RIV, find a start location and a length of a data RB, receive an SA RIV, and find a start location and a length of an SA RB.

Referring to FIG. 53B, because a data RB transmission band is 4RB (RB 1, RB 2, RB 3, and RB 4), the SA should be transmitted within data RB (RB 1, RB 2, RB 3, and RB 4).

FIG. 53B illustrates a table for analyzing RIV=4, which is SA resource area information, and the table is obtained from a table for analyzing RIV=16, which is data resource area information.

Here, an RIV table for SA may be variably determined. For example, when an SA RB length is maximum 3, an RB start index may be '0', '1', and '2', as shown in FIG. 53B. However, when the SA RB length is maximum 2, the RB start index may be '0', '1', '2', and '3'. Further, in contrast, a maximum value of an RB length may be determined according to the RB start index. That is, an RB start index and an RB length of the RIV table may be relatively determined.

Here, an RB start index of the RIV table for SA may indicate an actual RB index value. For example, in the RIV table for SA of FIG. 53B, the RB start index '0' may indicate an RB index '0'.

Alternatively, a start index value of SA RB of the RIV table for SA may be a relative value of a data RB index. For example, in an RIV table for SA of FIG. 53B, the RB start index '0' may indicate '1', which is a first RB index of the RB 5301 used for data transmission.

When '4' is indicated as an RIV value (RIV_SA='4') for SA, an RB_start of an RB for SA transmission is '1' and an RB_length of the RB is '2'. That is, an RB 5302 used for SA transmission starts from an RB index '2' and corresponds to total two RBs.

As described above, in order to determine an RB for SA transmission from an SA_RIV table, an RIV value of the SA should be transmitted to the D2D Tx UE. For this reason, the RA field 5102 of FIG. 51 may include both an RIV of data and an RIV of SA. For example, several high order bits on the RA field 5102 may indicate an RIV of SA, and the remaining bits may indicate an RIV of data. Further, an RIV of SA may represent an RIV value, but may represents offset with an RIV value of data.

Additionally, because an RIV table (RIV_SA table) for SA is determined based on an RIV (RIV_data) value for data, even if the RIV_SA value changes, a length thereof may be known and thus there is no difficulty in decoding. If some bits are not used as a variable length, the RIV table is filled with a predetermined specific bit value and may be used for improving a coding gain.

Hereinafter, a resource pattern of transmission (RPT) field 5103 for D2D data and SA will be described.

An RPT that notifies a time domain resource allocation pattern of an SA subframe and a data subframe as well as RA may derive SA and data RPT from a single RPT field. That is, it is preferable that the RPT (Data, SA) field 5103 simultaneously notifies SA RPT as well as data, as in the DCI format illustrated in FIG. 51.

It is assumed that an SA transmission subframe pattern (i.e., SA RPT pattern) set exists and that a plurality of RPTs exist within a corresponding set. Similarly, it is assumed that a data transmission subframe pattern (i.e., data RPT pattern) set exists and that a plurality of RPTs exist within a corresponding set. This is represented as follows.

SA RPT set={SA_pattern-1, SA_pattern-2, . . . SA_pattern-N}

Data RPT set={Data_pattern-1, Data_pattern-2, . . . Data_pattern-M}

For example, in the RPT field 5103 of the D2D grant DCI format, when a value RPT=0010 is indicated, the D2D Tx UE recognizes the value as '2', selects an SA_pattern-2 in the SA RPT set, and selects Data_pattern-2 at the data RPT set.

However, the SA_pattern-2 and the Data_pattern-2 do not mean the same thing. That is, because each pattern is a pattern selected from a defined independent subframe pattern set to correspond to an object, even if the RPT field 5103 indicates the same value, an RPT pattern applied to SA and data is differently designated.

Here, information about an SA pattern set and a data pattern set is previously fixedly determined and thus both the UE and the eNB may know the information. Further, the eNB may previously notify the UE of information about an SA pattern set and a data pattern set with a high layer signal such as RRC signaling or system information (e.g., SIB or MIB).

There is a very high possibility that the number of SA transmission subframe pattern (i.e., SA RPT pattern) candidates may be small, compared with the number of data transmission subframe pattern (i.e., data RPT pattern) candidates.

In this way, if the number of SA transmission subframe pattern (i.e., SA RPT pattern) candidates is small, by performing modulo calculation of an RPT value of a DCI format using the maximum number N of the SA RPT pattern candidate, the obtained value may be used as an SA RPT value.

For example, in a situation in which the number of SA RPT pattern candidates is 4 and in which the number of RPT pattern candidates of data is 8, when it is assumed that an RPT index='6' is indicated with D2D grant, a value (i.e., mod (6,4)=2)) in which a receiving terminal (i.e., D2D Tx UE) performs modulo calculation using 6 as the total number of SA pattern candidates may be used as an RPT pattern index and in data, a value 6 may be used as a data RPT pattern index.

That is, because a field of the DCI format and a signaling format are determined according to the number of data RPT pattern indexes, when the value exceeds the SA RPT pattern index, a value in which modulo calculation is performed may be used for determining the SA RPT pattern index.

Further, an SA transmission subframe pattern (i.e., SA RPT pattern) set and a data transmission subframe pattern (i.e., data RPT pattern) set may exist in the several number.

That is, the subframe pattern set may exist in the several number as in 1, 2, 3, . . . , N and the eNB may notify through a signal whether to use which subframe pattern set. That is, the eNB may previously notify an SA RPT pattern and/or a data RPT pattern set in which the D2D Tx UE is to use through RRC signaling.

The D2D Tx UE receives SA RPT pattern and/or data RPT pattern set information from the eNB through RRC signaling and determines an SA RPT pattern and/or a data RPT pattern based on a value that indicates in the RPT field 5103 of the DCI format within a corresponding RPT pattern set.

An RPT field for D2D data and/or SA may be divided into two portions and may be defined. This will be described in detail with reference to the drawings.

FIG. 54 is a diagram illustrating a downlink control information format according to an embodiment of the present invention.

Referring to FIG. 54, a DCI format for D2D grant may be formed with a frequency hopping flag (FH) field 5401, a RA field (including frequency hopping type indication bit NUL_hop) 5402 for D2D data, an MCS (or MCS and RV) field 5403, a TPC field 5404, a resource pattern of transmission (RPT) field 5405 for D2D data and SA, an UL index field (existing only in TDD) 5406, and a downlink allocation index (DAI) field (existing only in TDD) 5407.

In a DCI format for D2D grant of FIG. 54, compared with an illustration of Table 9, the DCI format is different from that of Table 9 in that a DMRS CS field is excluded and a corresponding bit is used as an RPT field and other fields may equally be defined.

The FH field 5401, the MCS (or MCS and RV) field 5403, the TPC field 5404, the UL index field 5406, and the DAI field 5407 are the same as those in a description of Table 9 and therefore a detailed description thereof will be omitted.

The RA field 5402 for D2D data may be equally formed with a field described with reference to FIGS. 51 to 53 and therefore a detailed description thereof will be omitted.

A bit that belongs to the RPT field 5405 (hereinafter, RPT field) for D2D data and SA may be again classified into two portions (i.e., a first portion (part 1) and a second portion (part 2).

The part 1 and the part 2 may be divided into superordinate several bits and the remaining bits on the RPT field 5405. For example, when the RPT field 5405 is 6 bits, high order (i.e., MSB) 2 bits may belong to the part 1 and the remaining 4 bits may belong to the part 2.

Further, the part 1 and the part 2 may be divided by a status/state (or a value) in which one RPT field 5405 represents. For example, when the RPT field 5405 is 6 bits, the RPT field 5405 may indicate total 64 statuses/states (or values). In this case, 16 statuses/states (or values) may belong to the part 1, and the remaining 48 statuses/states (or values) may belong to the part 2.

First, the part 1 will be described in detail.

The part 1 grants whether D2D data transmission is allowed in several subframes among subframes in which entire D2D signal can be transmitted.

For example, 2 bits of the RPT field 5405 may be used for granting whether D2D transmission is allowed.

The eNB may previously notify a location of a D2D available subframe in which SA of one time is applied through system information (e.g., system information block (SIB) or master information block (MIB)) or a high layer signal (e.g., RRC signaling). Thereby, each UE may determine the number of a D2D signal transmittable subframe that becomes a target of a corresponding SA.

For example, the number of subframes configured as a subframe in which D2D data transmission is available between two adjacent SA cycles may correspond thereto. In an illustration of FIG. 37, 5 subframes in which D2D data transmission is available within one SA cycle 3730 may correspond thereto.

Here, it is assumed that the total A number of subframes is configured as a subframe in which D2D data transmission is available.

The UE, having received D2D grant may determine that among subframes in which the A number of D2D data transmission is available, the B number of subframes allow data transmission of an actual corresponding UE through 1 bit of the part 1 of the above-described RPT field 5405.

As a detailed method of determining the number of subframes in which D2D transmission is allowed by the actual corresponding UE through the part 1 of the RPT field 5405, the following methods can be performed.

1) The number of actual D2D subframes designated on each status/state (or value) basis of a corresponding part 1 may be previously determined.

For example, the subframe number of one, two, three, and four may be connected (or mapped) to '00', '01', '10', and '11', respectively, which are each status/state (or value) of the part 1 of the RPT field 5105.

2) The number of actual D2D subframes designated on each status/state (or value) basis of the part 1 of the RPT field 5405 may be previously determined as a rate of an entire D2D available subframe.

For example, when the number of an entire D2D available subframe is the A number, the subframe number of the floor (A/X) number, the floor (2A/X) number, the floor (3A/X) number, and the floor (4A/X) number may be connected (or mapped) to '00', '01', '10', and '11', respectively, which are each status/state (or value) of the part 1. Here, X represents a predetermined numeral. In this way, X may be analyzed as operation that allocates subframes of the numeral corresponding to 1/X, 2/X, 3/X, and 4/X among approximately the entire A number of D2D available subframes with actual data transmission through each status/state (or value). Here, a floor (x) is a function that outputs a maximum value among integers smaller than or equal to x.

3) The number of actual D2D subframes designated on each status/state (or value) basis of the part 1 of the RPT field 5405 may be previously designated as a high layer signal such as RRC signaling or system information (e.g., SIB or MIB).

Thereby, the UE may know that D2D data transmission is allowed in the B number of subframes among the entire A number of subframes.

In an illustration of FIG. 37, two subframes in which D2D data transmission is allowed within one SA cycle 3730 correspond thereto.

In the subframe number in which D2D data transmission is allowed and designated with the above-method, a plurality of candidate subframe patterns may be generated based on a predetermined rule. Each candidate pattern determines a method of transmitting D2D data in the B number of subframes among the A number of subframes.

Such a candidate subframe pattern may be determined by a rule in which both the UE and the eNB previously know according to the subframe number in which D2D data transmission is allowed. Further, the eNB may previously notify the UE of candidate subframe pattern information according to the subframe number in which D2D data transmission is allowed with a high layer signal such as RRC signaling or system information (e.g., SIB or MIB).

The eNB may designate a pattern in which a corresponding UE actually uses among candidate patterns using the part 2 of a bit to which the RPT field 5405 belongs. For example, 4 bits may be used as the part 2, and in this case, the eNB may operate to designate one of maximum 16 candidate subframe patterns.

The eNB may dynamically adjust the number of subframes in which each UE uses for D2D data transmission at each SA cycle with the above methods, and particularly, the value may be adjusted according to a D2D data traffic amount of a corresponding UE.

Signaling of the number B of subframes allowed to transmit an actual corresponding UE may be applied to only D2D data transmission (i.e., PSSCH transmission). In SA transmission, because it is preferable not to adjust the number of transmission subframes according to a traffic situation, the number of subframes used for SA transmission may be previously fixed to a high layer signal such as RRC signaling or system information (e.g., SIB or MIB).

Further, for adjustment of the same form as that of D2D data, a bit field that designates the subframe number allowed with actual SA transmission (i.e., PSCCH transmission) of a corresponding UE is reused, and by applying the forgoing principle, the subframe number allowed for SA transmission may be dynamically adjusted. That is, the subframe number allocated for SA transmission and data transmission may be designated through the part 1 of the RPT field 5405, and a subframe pattern for SA transmission and data transmission may be designated through the part 2 of the RPT field 5405.

In this case, even if the subframe number allocated for SA transmission and data transmission is simultaneously designated through the part 1 of the RPT field 5405, the subframe number allocated for SA transmission and the subframe number allocated for data transmission may be different. For example, when a value of the part 1 of the RPT field 5405 is '00', '01', '10', and '11', one, two, three, and four subframes allocated for data transmission may be connected (or mapped) thereto. However, when a value of the part 1 of the RPT field 5405 is '00' and '01', one subframe allocated for SA transmission may be connected (or mapped), and when a value of the part 1 of the RPT field 5405 is '10' and '11', two subframes allocated for SA transmission may be connected (or mapped).

Further, similarly, even if a subframe pattern allocated for SA transmission and data transmission is simultaneously designated through the part 2 of the RPT field 5405, a subframe pattern designated for SA transmission and a subframe pattern designated for data transmission may be different.

That is, the subframe number allocated for SA transmission and the subframe number allocated for data transmission may be different, and one subframe pattern among candidate subframe patterns according to the number of each subframe may be determined. For example, for SA transmission, when two subframes are allocated, any one of total four candidate subframe patterns is designated, and for data transmission, when four subframes are allocated, any one of total 16 candidate subframe patterns may be designated.

Even in a case in which A (the number of D2D SA and/or data available subframes that is set through high layer signaling) and B (the subframe number allowed for actual SA and/or data transmission) are determined, subframe pattern sets corresponding thereto may be the several number. This will be described in detail with reference to the drawings.

FIG. 55 is a diagram illustrating a subframe pattern set according to an embodiment of the present invention.

Referring to FIG. 55, it is assumed that an SA cycle (i.e., PSCCH cycle) is set to 40 ms (total 40 subframes) and that a subframe #0 (5501), a subframe #8 (5502), a subframe #6 (5503), a subframe #4 (5504), and a subframe #2 (5505) are set as a subframe in which D2D data transmission is available within one SA cycle.

FIG. 55 illustrates a set A and a set B as different kinds of subframe sets. The set A includes a pattern #1 (5501, 5502), a pattern #2 (5502, 5503), a pattern #3 (5503, 5504), a pattern #4 (5504, 5505), and the set B includes a pattern #1 (5501, 5503), a pattern #2 (5502, 5504), a pattern #3 (5503, 5505), and a pattern #4 (5501, 5504).

The subframe pattern set may exist in several numbers, as in 1, 2, 3, . . . , N and the eNB may notify a subframe pattern set to use through a signal. That is, the eNB may previously notify subframe pattern set information in which the D2D Tx UE is to use through RRC signaling.

The D2D Tx UE receives a subframe pattern set information from the eNB through RRC signaling and performs D2D transmission (SA and/or data) using a designated subframe pattern through a part 2 of the RPT field 5405 within a corresponding subframe pattern set.

When SA and data are transmitted in the same subframe, a subframe pattern set and a subframe pattern designated within the corresponding subframe pattern set may be equally applied. Therefore, the eNB may transmit one subframe pattern set information to the D2D Tx UE through RRC signaling and transmit one subframe pattern indication information through the part 2 of the RPT field 5405, as shown in FIG. 54.

Further, when a subframe in which SA is transmitted and a subframe in which data are transmitted are different, a subframe pattern set designated for SA transmission and a subframe pattern set designated for data transmission may be different. In this case, the eNB may transmit subframe pattern set information for SA transmission through RRC signaling and subframe pattern set information for data transmission to the D2D Tx UE. Further, the eNB may transmit one subframe pattern indication information through the part 2 of the RPT field 5405, as shown in FIG. 54, and in this case, subframe patterns for SA and data transmission may be each designated within a corresponding subframe pattern set. For example, it is assumed that a 'set A' is designated as a subframe pattern set for SA transmission to the D2D Tx UE and that a 'set B' is designated as a subframe pattern set for data transmission. When a 'pattern #3' is designated through the part 2 of the RPT field 5405, a 'pattern #3' within the 'set A' is designated as a subframe pattern for SA transmission and a 'pattern #3' within the 'set B' is designated as a subframe pattern for data transmission.

Further, when subframes designated for SA transmission and data transmission are not the same, a subframe pattern set designated for SA transmission and a subframe pattern set designated for data transmission are the same, but a subframe pattern set for SA transmission and a subframe pattern set for data transmission may be different within a corresponding subframe pattern set. In this case, the eNB may transmit one subframe pattern set information to the D2D Tx UE through RRC signaling. As described above, as shown in FIG. 54, a subframe pattern for SA transmission and a subframe pattern for data transmission may be differently determined based on one subframe pattern indication information transmitted through the part 2 of the RPT field 5405.

Further, as described above, signaling of the number B of subframes allowed by transmission of an actual corresponding UE may be applied to only D2D data transmission (i.e., PSSCH transmission). In this case, subframe pattern set information transmitted through RRC signaling and subframe pattern information transmitted through the part 2 of the RPT field 5405 in FIG. 54 may be applied to only D2D data transmission (i.e., PSSCH transmission).

FIG. 56 is a flowchart illustrating a method of transmitting and receiving downlink control information according to an embodiment of the present invention.

Referring to FIG. 56, the base station may transmit data transmittable resource information (i.e., PSSCH transmittable resource information) to a D2D transmitting terminal (S5601).

Here, D2D data transmittable resource information may be the subframe number that can transmit data within one SA cycle.

The base station may not transmit D2D data transmittable resource information to the D2D transmitting terminal. In this case, step S5601 may be omitted.

The base station transmits downlink control information (e.g., DCI format 5) to the D2D transmitting terminal, and the downlink control information includes resource information (i.e., resource information in which PSSCH transmission is allowed) in which data transmission to a corresponding D2D transmitting terminal is allowed (S5602).

Here, resource information in which data transmission is allowed may include a frequency resource (e.g., resource block) and/or a time resource (e.g., subframe).

For example, resource information in which data transmission is allowed may include resource block information allowed to transmit data and may be indicated to an RIV that indicates a start resource block and a length of a resource block.

Further, resource information in which data transmission is allowed may include subframe information allowed to transmit data and may be indicated to a subframe pattern using for transmitting data.

In this case, a subframe pattern using for transmitting data may be determined to anyone subframe pattern within a predetermined at least one subframe pattern set (or candidate).

Further, resource information in which data transmission is allowed may be indicated to the number of subframes to transmit data and a subframe pattern within the corresponding subframe number.

In this case, the number of subframes in which data transmission is allowed may be determined according to a data traffic amount in which the D2D transmitting terminal is to transmit.

In more detail, in order to request uplink resource allocation for transmitting a Buffer Status Report (BSR), the D2D transmitting terminal transmits a scheduling request to the base station. When the base station allocates an uplink resource for transmitting the BSR to the corresponding D2D transmitting terminal, the D2D transmitting terminal transmits the BSR to the base station through the allocated uplink resource. That is, the D2D transmitting terminal reports a data traffic amount to transmit through a D2D link to the base station. The base station may determine a data traffic amount in which the D2D transmitting terminal is to transmit through the BSR and determine the subframe number to allocate to the corresponding D2D transmitting terminal.

The D2D transmitting terminal derives an SA transmission resource (i.e., PSCCH transmission resource) from resource information in which data transmission is allowed by downlink control information (S5603).

Here, the D2D transmitting terminal may derive resource information in which data transmission is allowed, i.e., frequency and time resources used for SA transmission from a frequency resource (e.g., resource block) and a time resource (e.g., subframe).

For example, a resource block used for SA transmission may be determined to the predetermined number of resource blocks from a first or final resource block of a resource block used for data transmission. Further, a central resource block used for SA transmission may be located at a central resource block used for data transmission and may be determined to the predetermined number of resources.

Further, when the resource block number for data transmission is an odd number and the resource block number for SA transmission is an even number or vice versa, the central resource block for SA transmission may be determined to a resource block smaller or larger by one index than that of the central resource block for data transmission.

Further, an RIV table for SA transmission is determined according to the resource block number for data transmission, and a start resource block and a length of a resource block used for SA transmission may be determined based on the determined RIV table.

Further, a subframe pattern used for transmitting SA may be determined based on subframe pattern indication information for transmitting data within a subframe pattern set (or candidate) for transmission of a predetermined at least one SA.

The D2D transmitting terminal transmits SA (i.e., PSCCH) and/or data (i.e., PSSCH) to a D2D receiving terminal (S5604).

That is, the D2D transmitting terminal transmits SA through a resource derived at stet S5603 and transmits data through a resource indicated in downlink control information received at step S5602.

D2D Grant Format

Meanwhile, in the drawings and/or description in relation to the D2D grant format (i.e., DCI format for the D2D grant) described above, the TPC field may not be used in the D2D grant format. Or, the TPC field may not be included in the D2D grant format. This is because a power control may be implemented by using DCI format 3/3A.

The bit resource secured as such may be additionally allocated to a resource allocation (RA). Since many resources (i.e., bits) are required for the RA of the SA and data, it is preferable to use the resource for the SA and the RA of data.

Through a single RA field of the D2D grant, both of the SA resource and the Data resource may be allocated. In this case, the RA field may indicate the SA resource, and the Data resource may be determined based on the SA resource index. In addition, on the contrary, the RA field may indicate the Data resource, and the SA resource may be determined based on the Data resource index.

In addition, a single RA field may be configured, but the SA resource and the Data resource may be independently indicated in a single RA field. For example, a part of the higher/lower bit of the RA field may indicate the SA resource and the remaining bits may indicate the Data resource.

As such, particularly, in the case that the SA resource and the Data resource are independently allocated, the bit number used in the RA for the SA and the bit number used in the RA for the Data may be identically configured, but may also be differently configured.

In addition, an indication granularity of the SA frequency/time resource and an indication granularity of the Data frequency/time resource may be differently configured. For example, the SA frequency resource may be indicated by a unit of 2 RBs and the Data frequency resource may be indicated by a unit of 1 RB.

For example, while configuring the RB indication granularity of the SA as one or more RBs such as 2 RBs, the Data may use the RB indication granularity of the smaller size. Of course, on the contrary, the RB indication granularity of the SA may be configured as smaller than the RB indication granularity of the Data.

This is in relation to which RA will be elaborated either SA or Data in the aspect of the system operation. Different sizes of RA bit (resource) are used by putting a weight on the SA RA and the Data RA depending on the importance.

For example, in the case that total N_d2d bits are secured for the RA, N_sa bit is used for the SA RA and N_data bit is used for the Data RA. Herein, N_sa+N_data=N_d2d. The sizes of N_sa and N_data may be configured by the high layer signaling (e.g., RRC/MAC signaling), and so on. Here, a mapping relationship between the number of bits of N-sa and/or N_data and the indication granularity of the SA and/or the Data in the D2D grant may be predefined or configured for a UE. In this case, when a UE is configured as the number of bits of N-sa and/or N_data through the high layer signaling (e.g., RRC/MAC signaling), and so on, the UE may derive the indication granularity of the SA and/or the Data based on it.

In addition, as described above, in the case that an RA field indicates the SA resource and the Data resource is determined based on an SA resource index, the Data resource may be determined based on the SA resource index and the indication granularity of the SA/Data resource. Or, on the contrary, even in the case that an RA field indicates the Data resource and the SA resource is determined based on a Data resource index, the SA resource may be determined based on the DATA resource index and the indication granularity of the SA/Data resource.

Here, the indication granularity of the SA and/or the Data resource may be identical to the actual resource allocation unit (or transmission unit) of the SA and/or the Data resource, but may be different. For example, the indication granularity of the SA resource may be 2 RBs, but the allocation unit (or transmission unit) of the SA resource may be 1 RB. In this case, the SA resource position in the corresponding resource indication granularity may be predefined or configured to a UE through the high layer signaling (e.g., RRC/MAC signaling), system information (e.g., SIB, MIB, etc.), a broadcasting channel (e.g., PSBCH, etc.), PDCCH/EPDCCH, or the like.

In addition, the bit additionally secured from a TPC may be used for indicating a time domain resource.

As such, in the case of introducing a time (domain) resource pattern (Resource Pattern for Transmission (RPT)) for the time domain RA, the bit additionally secured from a TPC may be used for forwarding the information.

For example, the bit secured from a TPC may be used for indicating an index set of the Data and/or the SA subframe.

Through a single RPT field of the D2D grant, both of the SA time resource (i.e., time-domain resource pattern) and the Data time resource (i.e., time-domain resource pattern) may be allocated. For example, the time-domain resource pattern for the SA may be predefined and indexed for each time-domain resource pattern. In addition, the time-domain resource pattern for the Data may be predefined and indexed for each time-domain resource pattern. A value indicated in a single RPT field may indicate each of the time-domain resource pattern for the SA and the time-domain resource pattern for the Data.

In addition, a single RPT field may be configured, but the SA time resource and the Data time resource may be independently indicated in a single RPT field. For example, like the above example, the time-domain resource pattern for the SA and the time-domain resource pattern for the Data may be predefined, a part of the higher/lower bit of the RA field may indicate the SA time resource and the remaining bits may indicate the Data time resource.

For example, the time-domain resource pattern for the SA and/or the Data may be constructed by a bitmap of a predetermined size, and may correspond to subframe indexes in an order of the bit position of bitmap, and the bit value may indicate whether the resource is allocated in the corresponding subframe index. While the time-domain resource pattern bitmap is repeated in the SA and/or the Data resource pool, the time domain resource for the SA and/or the Data transmission may be indicated.

Or, the RPT field may be used for indicate the subframe number available for the SA and/or the Data transmission. In other words, when the RPT information is included in the D2D grant, the use (e.g., part 1 in FIG. 54 above) for indicating the subframe number available in the given interval (e.g., the SA and/or the Data transmission) and the use (e.g., part 2 in FIG. 54 above) for indicating the subframe that is going to be used for a transmission actually may be separately used. In this case, the additionally secured TPC field (i.e., a bit additionally secured by not using the TPC field) may be used for one of the uses.

Table 11 below exemplifies a field configuration in the case that the TPC bit field is used for the time domain resource allocation (i.e., RPT) when it is assumed that the D2D grant is designed based on the existing DCI format 0.

TABLE 11

| | DCI format 0 | | D2D grant | | |
|---|---|---|---|---|---|
| 0/1A | 1 | | | X | Used for RPT |
| FH | 1 | | FH | 1 | Use as it is |
| MCS/RV | 5 | | MCS/RV | 5 | Use as it is |
| NDI | 1 | | | X | Used for RPT |
| TPC | 2 | | | X | Used for RPT |
| DM RS CS | 3 | | | X | Used for RPT |
| CQI | 1 | | | X | Used for RPT |
| ZP | 1 | | ZP | 1 | Use as it is |
| RA | 13 (20 MHz) | | RA | 13 | Used for RA |
| | | | TD.pattern1 | 4 | Used for RPT |
| | | | TD.pattern2 | 4 | Used for RPT |
| (TDD) | | | (TDD) | | |
| | 28 | | | 28 | |

Referring to FIG. 11, the D2D grant includes a hopping flag (HF) field, a modulation and coding scheme and redundancy version (MCS/RV) field, a zero padding (ZP), an RA field, a TD.pattern1 field and a TD.pattern2 field. Here, 'TD.pattern' means a time-domain resource pattern.

The 8 bits for constructing a flag 0/1A for distinguishing DCI format 0 and format 1A in DCI format 0, a new data indicator (NDI), a transport power control (TPC), a cyclic shift for DMRS (DM RS CS) and a channel state information request (CQI) field may be used for designating the RPT in the D2D grant.

Each of the TD.pattern1 field and the TD.pattern2 field may indicate the time-domain resource pattern available for the D2D and the time-domain resource pattern used for the SA and/or the Data transmission actually. In addition, each of the TD.pattern1 field and the TD.pattern2 field indicate the time-domain resource pattern for the SA and the Data. Each of the TD.pattern1 field and the TD.pattern2 field may be constructed as the same bit (e.g., 4 bits).

In the RA field, the bit length used for the SA RA and the Data RA may be differently defined according to the RA technique.

Table 12 below exemplifies a field configuration in the case that the TPC bit field is used for the time domain resource allocation (i.e., RPT) when it is assumed that the D2D grant is designed based on the existing DCI format 0.

TABLE 12

| | DCI format 0 | | D2D grant | | |
|---|---|---|---|---|---|
| 0/1A | 1 | | | X | Used for RPT |
| FH | 1 | | FH | 1 | Use as it is |
| MCS/RV | 5 | | MCS/RV | 5 | Use as it is |
| NDI | 1 | | | X | Used for RPT |
| TPC | 2 | | | X | Used for RPT |
| DM RS CS | 3 | | | X | Used for RPT |
| CQI | 1 | | | X | Used for RPT |

TABLE 12-continued

| | DCI format 0 | | D2D grant | | |
|---|---|---|---|---|---|
| ZP | 1 | | ZP | 1 | Use as it is |
| RA | 13 (20 MHz) | | RA | 13 | Used for RA |
| | | | TD.pattern1 | 6 | New field, RPT |
| | | | TD.pattern2 | 2 | New field, RPT |
| (TDD) | | | (TDD) | | |
| | 28 | | | 28 | |

Referring to Table 12, similar to Table 11 above, the 8 bits for constructing a flag 0/1A for distinguishing DCI format 0 and format 1A in DCI format 0, a new data indicator (NDI), a transport power control (TPC), a cyclic shift for DMRS (DM RS CS) and a channel state information request (CQI) field may be used for designating the RPT in the D2D grant.

However, different from Table 11 above, two types of RPT fields indicating the time domain resource pattern may be configured as different sizes.

For example, like the case of Table 11, (6 bits, 2 bits) is used instead of (4 bits, 4 bits). This is just an example, but the bit configuration such as (5 bits, 3 bits) and (7 bits, 1 bit) may be also possible in the case of being configured asymmetrically.

Meanwhile, as shown in the example of FIG. 56 above, a D2D transmission UE may derive the SA transmission resource from the Data transmission permissible resource (i.e., the resource allocated for transmitting Data) included in the downlink control information. In the case that the D2D transmission UE repeatedly transmit the SA in the time domain, the D2D transmission UE should be able to derive the time-domain resource for each of the SAs that are repeatedly transmitted. This will be described with reference to the drawing below.

FIG. 57 is a diagram exemplifying a method for indicating a time domain resource for the D2D scheduling grant according to an embodiment of the present invention.

In FIG. 57, it is assumed the case that an SA resource pool includes 8 subframes (i.e., subframe (SF) indexes 0 to 7) in the time domain, and the resource pattern is repeated with a specific period.

And, for example, when it is assumed that the SA information is repeatedly transmitted (e.g., 2 times) for adequately securing the transport coverage of the SA within the SA resource pool, the number of basic resource (i.e., SA time resource unit) for the SA transmission is determined to be 4 (=8/2).

In FIG. 57, although two consecutive subframes are defined as an SA time resource unit, discontinuous subframe may be defined as an SA time resource unit.

As such, assuming the SA repeated two times for 8 subframes which is the SA resource pool, the SA time resource unit (TU) indexes such as 0, 1, 2, and 3 are given to each SA time resource unit.

In the case that the time-domain resource pattern of transmission (T-RPT) Y of data is signaled as Y=5 and this value is defined or configured to a UE for the use of designating the SA time-domain resource, it may be interpreted that (5 mod 4)=1 by applying the modulo operation and number 1 of the SA TU index is designated.

Different from the method for generating Y using all of the Data RPT values and determining the SA resource based on it, only a part of the Data RPT values (e.g., a part of bits of upper/left or lower/right) may be used for determining the SA resource. For example, when the lower 3 bits of the Data RPT have the value of 1, 5 or 9, it may be interpreted that (5 mod 4)=1 by applying the method above and number 1 of the SA TU index is designated.

This may be in relation to the total number of the SA time resource units. This is because only the value corresponding to the bit width that expresses the value may be used from the Data RPT. For example, the mapping relation between the total number (or a range of total number) of the SA time resource units and the bit width indicating the SA time resource unit in the Data RPT may be preconfigured or configured by the high layer signaling.

As such, when the SA time resource unit is determined based on a part of bits of the Data RPT, the configuration on which part (e.g., upper/left or lower/right) and how much (e.g., bit number) of the Data RPT is to be used should be preconfigured. For example, a BU may notify such a value to a UE through the RRC signaling or the broadcast signaling (e.g., PBCH, system information, etc.).

The description above is described by assuming the case that a single SA resource pool is repeated with a period, but the present invention is not limited thereto.

The description above may also be identically applied to the case that a plurality of SA resource pools is defined. For example, the method proposed above may be individually applied to each SA resource pool. In this case, an index of the SA time resource unit may be individually managed for each SA resource pool. In addition, throughout a part of the whole of a multiple resource pools, an index of a single common SA time resource unit (i.e., common index) may be applied. In this case, the SA time resource unit may be defined throughout a part of the whole allocation resource.

Mapping of SA RB Index and Data RB Index

The resource allocation information (position) of Data may be inferred (or derived) from the resource allocation information of an SA, or on the contrary, the resource allocation information (position) of the SA may be inferred (or derived) from the resource allocation information of the Data. In this case, the D2D grant may include the resource allocation information only for either one of the SA or the Data. For example, the RA field of the D2D grant may include the allocation information of the frequency-domain resource only for either one of the SA or the Data.

However, In order to infer (or derive) the remaining resource allocation information based on the resource allocation information for either one of them, there should be consistent relationship mutually.

Particularly, the transmission unit (or allocation unit/indication unit) of the SA and the transmission unit (or allocation unit/indication unit) of the Data are different, it is preferable that there is consistent relationship between an index of the transmission unit of the SA and an index of the transmission unit of the Data.

Here, the resource allocation information of the SA and the Data may correspond to the frequency-domain resource allocation information (e.g., RB index) or may correspond to the time-domain resource allocation information (e.g., subframe index (set), etc.).

FIG. 58 is a diagram exemplifying a method for a D2D communication according to an embodiment of the present invention.

In FIG. 58, the case is assumed and described that the D2D grant includes the D2D SA resource allocation information only.

Referring to FIG. 58, an eNB transmits D2D SA and D2D Data transmission unit information to a D2D transmission UE (step, S5801).

Here, the transmission unit may be identical to the resource allocation unit (or indication granularity) for an eNB to indicate the resource allocation information.

The SA and/or the Data transmission unit in the frequency-domain may configured as an integer multiple of an RB or an integer multiple of a resource block group (RBG). In addition, the SA and/or the Data transmission unit in the time-domain may configured as an integer multiple of a subframe.

The SA and/or the Data transmission unit may be transmitted through system information (e.g., MIB, SIB, etc.), the high layer signaling (e.g., RRC or MAC signaling), PD2DSCH (or PSBCH), or the like.

Meanwhile, the SA and the Data transmission unit may be predefined and known to both of the eNB and the UE. In this case, step, S5801 may be omitted.

The eNB transmits the downlink control information (DCI; i.e., D2D grant) that includes the D2D SA resource allocation information to the D2D transmission UE through a PDCCH (or EPDCCH) (step, S5802).

Here, the downlink control information (i.e., D2D grant) may be configured as the format described above and may further include other information in addition to the SA resource allocation information.

The D2D transmission UE may infer (derive) the D2D Data resource allocation information from the D2D SA resource allocation information (position) based on the D2D SA and D2D Data transmission unit information (step, S5803).

The detailed description for a method for inferring (or deriving) the D2D resource allocation information from the SA resource allocation information (position) based on the SA and Data transmission unit information will be described below.

The D2D transmission UE transmits the D2D SA through the resource indicated in the D2D SA resource allocation information received in step, S5802, and transmits the D2D Data to the D2D reception UE through the D2D Data transmission resource derived in step, S5803 (step, S5804).

Meanwhile, in the case of mode 2, the D2D transmission UE may determine the SA transmission resource in the SA resource pool arbitrarily. And, the D2D transmission UE may derive the Data transmission resource from the determined SA transmission resource (position) based on the SA and Data transmission unit information.

The D2D reception UE may detect/decode the SA transmitted from the D2D transmission UE by performing a blind decoding the SA resource pool.

And, similar to the D2D transmission UE, the D2D reception UE may derive the Data transmission resource (position) from the SA transmission resource position based on the SA and the Data transmission unit information, and may decode the Data in the derived resource.

In addition, the Data transmission resource information may be included in the SA transmitted from the D2D transmission UE. In this case, the D2D reception UE may detect/decode the SA through the blind decoding as described above, and may obtain the Data transmission resource information included in the SA. And, the D2D reception UE may decode the Data in the resource indicated in the obtained Data transmission resource information.

Hereinafter, a method is examined for deriving the Data resource allocation information from the SA resource allocation information (position) based on the SA and the Data transmission unit information.

Subsequently, for the convenience of description, the resource allocation information of the frequency-domain will be mainly described, but the present invention is not limited thereto.

FIG. 59 is a diagram exemplifying a method for indicating the resource for the D2D data according to an embodiment of the present invention.

From SA#0 RB index, Data#0 RB index may be inferred (or derived), and from SA#k RB index, Data#k RB index may be inferred (or derived).

Like the case of FIG. 59, in the case that the SA transmission unit is fixed such as N_sa=2 RBs and the D2D transmission unit is fixed such as N_data=4 RBs (or configured by an eNB), it leads to the case that SA RB index×2=Data RB index. Or, it may lead to the case that (SA RB index×2)−1=Data RB index.

Here, the SA/Data RB index may be a start RB index, a center RB index or an end RB index of the SA and Data transmission units.

As such, it is simple solution to fix the bandwidth (BW) (i.e., a unit of transmission in the frequency-domain) of the resource allocation unit of the SA and the Data.

However, it is helpful for an efficient use of the resource to make the number of RBs changeable as a resource allocation unit of the SA and the Data.

For example, it may be configured that the SA RB size and the Data RB size are changed in the semi-static manner by indicating the SA RB size and the Data RB size through system information (e.g., SIB, etc.), RRC signaling, PD2DSCH (or PSBCH), or the like.

Such a method includes a method of fixing the SA transmission unit (RB number, e.g., 2 RBs or 4 RBs) and of changing the Data transmission unit (RB number) in the range of 1 RB to 100 RBs, and a method of changing both of the SA and Data transmission units.

First, the case of fixing the SA transmission unit and changing the Data transmission unit will be described.

When it is configured that a transmission unit (or allocation unit) of a single SA is set to 2 RBs and a transmission unit (or allocation unit) of Data is changed to 2, 4, 6 and 8 RBs, the Data RB index may be induced (or derived) from the SA RB index by combining the SA and the Data transmission units.

In the case that the SA transmission unit (=2 RBs) and the Data transmission unit (=2 RBs) are signaled, configured or predefined, the Data RB index=1×SA RB index.

Like the case of FIG. 59 above, in the case that the SA transmission unit (=2 RBs) and the Data transmission unit (=4 RBs) are signaled, configured or predefined, the Data RB index=2×SA RB index (or Data RB index=(SA RB index×2)−1).

In the case that the SA transmission unit (=2 RBs) and the Data transmission unit (=6 RBs) are signaled, configured or predefined, the Data RB index=3×SA RB index (or Data RB index=(SA RB index×3)−2).

In the case that the SA transmission unit (=2 RBs) and the Data transmission unit (=8 RBs) are signaled, configured or predefined, the Data RB index=4×SA RB index (or Data RB index=(SA RB index×4)−3).

In the case that the SA transmission unit (=3 RBs) and the Data transmission unit (=3 RBs) are signaled, configured or predefined, the Data RB index=1×SA RB index.

In the case that the SA transmission unit (=3 RBs) and the Data transmission unit (=6 RBs) are signaled, configured or predefined, the Data RB index=2×SA RB index (or Data RB index=(SA RB index×2)−1).

That is, according to the multiple relation between the SA transmission unit and the Data transmission unit, the multiple relation between the SA RB index (i.e., PSCCH RB index) and the Data RB index (i.e., PSSCH RB index) may be determined.

For example, when the quotient of the Data transmission unit divided by the SA transmission unit is N_map, the Data RB index may be induced (or derived) by multiplying the SA RB index by N_map (or multiplying N_map and subtracting N_map−1).

For the simple implementation, the transmission unit or the allocation unit of the SA and the Data may be defined or configured to a UE such that the transmission unit or the allocation unit in the integer multiple relation. For example, when the SA transmission unit is 2 RBs, it may be defined or configured to a UE such that the Data transmission unit uses only the transmission unit of a multiple of 2 (e.g., 2, 4, 6 and 8) or only the transmission unit (2, 4, 8, 16, . . . ) of the power of 2 (i.e., 2^x).

Such a relation may be predefined, preconfigured or configured through the high layer signaling (e.g., system information, RRC/MAC signaling, etc.), or may be determined by an equation or a calculation of predetermined function. That is, for example, it may be configured that N_map is always an integer. Such a rule may be used for checking an error during signaling or configuration procedure.

As such, the Data RB index may be inferred (or derived) by obtaining an index of the Data RB, and then, by multiplying the SA RB index by N_map value.

Here, various values such as a start RB index, a center RB index, an end RB index of the SA and the Data may be used as the reference RB index.

In addition, in the case that a resource gap (e.g., reserved RB, guard RB, etc.) is introduced during the SA and/or the Data resource allocation procedure owing to the matters that should be additionally considered such as the in-band emission, the SA or Data RB index should be induced by considering the RB used in the resource gap.

In the case that such a resource cap is used, the resource gap should be predefined or configured by the high layer signaling (e.g., system information or RRC/MAC signaling, etc.). That is, in the case that a resource gap is configured by an eNB, together with the SA and Data transmission unit information in step, S5801 in FIG. 58 above, the resource gap information may also be transmitted.

FIG. 60 is a diagram exemplifying a method for indicating the resource for the D2D data according to an embodiment of the present invention.

For example, in the case that the resource gap (reserved gap) of 1 RB is used, the Data RB index should be calculated by assuming that the reserved gap is set to every unit between the Data and/or SA transmission units. FIG. 60 exemplifies the case that two resource gap (reserved gap) of 1 RB or a resource gap (reserved gap) of 2 RBs is configured.

In the case that the SA transmission unit (=2 RBs) and the Data transmission unit (=4 RBs) are signaled, configured or predefined, the Data RB index (i)=2 SA RB index (i)+i× resource RB gap (e.g., 1 RB), i=1, 2, 3, etc.

In addition, such a resource gap may be set only between either one of transmission resource among the SA transmission resource and the Data transmission resource. This will be described with reference to the drawing below.

FIG. 61 is a diagram exemplifying a method for indicating the resource for the D2D data according to an embodiment of the present invention.

FIG. 61 exemplifies the case that two resource gaps (reserved gaps) of 1 RB or a resource gap (reserved gap) of 2 RBs is set only between the SA transmission resources.

As shown in FIG. 61, the resource gap is set only between the SA transmission resources, the SA#k RB index and the Data#k RB index may be identically tuned. In this case, the Data RB index may be derived such as the Data RB index=1×SA RB index or the Data RB index=1×SA RB index+i×resource RB gap (e.g., 1 RB), (i=1, 2, 3, . . . ).

Various rules may be set to derive the Data RB index from the SA RB index according to the SA RB allocation method (including resource gap) in addition to the examples of FIG. 59 to FIG. 61. Accordingly, although it is not described in the present specification, it may be interpreted that various methods for deriving the Data resource allocation information (position) from the SA resource allocation information (position) based on the SA and Data transmission units include the technical feature of the present invention.

As another method, the case may be considered that the SA or the Data of different transmission units is coexisted in the same subframe. In this method, it may be implemented that the Data RB index may be induced from the SA RB index by configuring a plurality of transmission units and dividing the allocation region.

For example, the method is to change the allocation position of the SAs of transmission units of 2 RBs and 3 RBs and to reflect it in the calculation by configuring the boundary. In this case, the method (i.e., equation) for deriving the Data transmission resource position from the SA transmission resource position which is belonged to the frequency-domain in which the transmission unit of 2 RBs is configured and the method (i.e., equation) for deriving the Data transmission resource position from the SA transmission resource position which is belonged to the frequency-domain in which the transmission unit of 3 RBs is configured may be independently determined.

Meanwhile, in the case that the resource block group (RBG) unit or the D2D SA and Data resource allocation units are designated, a method for adjusting the D2D grant to the size of DCI format 0 is proposed by adjusting the allocation unit as follows.

That is, in the case that the D2D SA and the Data resource allocation units (or transmission units) are designated as described above or in the case that the D2D SA and Data resource allocation units are designated in the resource block group (RBG) unit, the allocation unit may be adjusted as follows.

A) The SA bandwidth (BW) (i.e., bandwidth of the SA resource pool) and/or the Data bandwidth (BW) (i.e., bandwidth of the Data resource pool) may be set to a multiple of the RBG.

That is, the transmission unit of the SA and/or the Data may be defined as the RBG or may be configured to a UE, and the SA bandwidth and/or the Data bandwidth may be set to a multiple of the RBG.

The RBG size defined in the LTE/LTE-A system as represented in Table 13 below may be used. As an example, in the case that the RBG size is 3, the SA and/or Data bandwidths may be determined to be a multiple of 3 (e.g., in the case that an uplink bandwidth is 50 RBs, the SA and/or Data bandwidths are 48 RBs, which is a multiple of 3).

Here, the SA bandwidth and the Data bandwidth may be identically configured, but also may be differently configured.

TABLE 13

| System Bandwidth $N_{RB}^{DL}$ | RBG Size (P) |
|---|---|
| ≤10 | 1 |
| 11-26 | 2 |
| 27-63 | 3 |
| 64-110 | 4 |

That is, the SA bandwidth and/or the Data bandwidth may be predefined as a multiple of the RBG or may be configured to a UE through the high layer signaling (e.g., RRC/MAC signaling), system information (e.g., SIB, MIB, etc.), broadcasting channel (e.g., PSBCH, etc.), PDCCH/EPDCCH, or the like.

A size of the RBG may be determined according to an uplink bandwidth (or the bandwidth allocated for the D2D direct communication) as represented in Table 13 above.

B) The RBG unit based on the system bandwidth defined in the LTE/LTE-A system may be reused. That is, the SA and/or the Data transmission units may be configured as the RBG size of 1, 2, 3 and 4 RBs according to the uplink bandwidth or the bandwidth (SA bandwidth and/or Data bandwidth) allocated for the D2D as represented in Table 13 above.

For example, in the case that the uplink bandwidth or the bandwidth (SA bandwidth and/or Data bandwidth) allocated for the D2D is 100 RBs, a single RBG may be set to 4 RBs, and total 25 RBGs may be allocated for the SA and/or the Data.

In the case that each of the start index of an RB and a resource allocation length (i.e., RBG number) is indicated, 5 bits may be required for indicating the start index of the RB, and 5 bits may be required for indicating the resource allocation length, and thus, total 10 bits may be required.

Or, in the case that it is indicated by a resource indication value (RIV), a table is required, similar to the example of Table 53, but a resource may be indicated with 9 bits only.

C) In addition, an integer multiple of RBG unit may be used according to the uplink bandwidth or the bandwidth (SA bandwidth and/or Data bandwidth) allocated for the D2D. For example, according to the uplink bandwidth or the bandwidth (SA bandwidth and/or Data bandwidth) allocated for the D2D, the RBG size of 2, 4, 6 and 8 RBs may be used as the transmission unit of the SA and/or Data.

For example, in the case that the system bandwidth is 100 RBs, an RBG may be set to 8 RBs, and total 12.5 RBGs may be allocated for the SA and/or the Data.

In the case that each of the start index of an RB and a resource allocation length (i.e., RBG number) is indicated, 4 bits may be required for indicating the start index of the RB, and 4 bits may be required for indicating the resource allocation length, and thus, total 8 bits may be required.

Or, in the case that it is indicated by a resource indication value (RIV), a table is required, similar to the example of Table 53, but a resource may be indicated with 7 bits only.

In the case that the resource allocation information for the Data and the SA is independently indicated, 14 bits (=2×7) are required. Comparing it with the case that the RA field of 13 bits is used in DCI format 0 currently, similar bit is required.

D) Considering the case that the SA RB size is smaller than the RBG size, the SA position may be predetermined in a RBG. For example, it is determined to be a start position, a middle position or an end position. Here, the Data transmission unit may be set by the method described above.

In addition, the SA position in a RBG may be configured through the high layer signaling (e.g., RRC/MAC signaling), system information (e.g., SIB, MIB, etc.), broadcasting channel (e.g., PSBCH, etc.), PDCCH/EPDCCH, or the like.

is, the RA field may be classified into RA part 1 and RA part 2, and each part may carry the information as represented in Table 14.

Table 14 exemplifies the RA field of the D2D grant.

TABLE 14

|  | RA part 1 (first resource allocation field) | RA part 2 (second resource allocation field) |
| --- | --- | --- |
| Embodiment 1 | Time-frequency resource allocation information of the first transmission of SA (then, that of the other transmission (e.g. repetition, retransmission) can be derived from RA1) | Time-frequency resource allocation information of the first transmission of Data (then, that of the other transmission (e.g. repetition, retransmission) can be derived from RA2) |
| Embodiment 2 | Time-frequency RA information of the first transmission of SA and/or Data | Information for the other transmission (e.g. repetition, retransmission), except for the first transmission |
| Embodiment 3 | Resource allocation information of the all types of transmission of SA and/or Data | The transmission unit size/granularity of SA and/or Data |

In this case, the SA resource allocation may be indicated by an RBG unit in the D2D grant. Since the SA position is pre-designated in an RBG, a D2D transmission UE may know the SA position in the corresponding RBG indicated in the D2D grant.

E) Different RBG sizes may be used as the Data and SA resource indication units (or transmission units).

For example, a doubled RBG size of Table 13 above may be used as a resource indication unit for the SA, and in this case, RIV 7 bits may be required. And, the RBG size of Table 13 above may be used as a resource indication unit for the Data, and in this case, RIV 9 bits may be required.

Here, a position of the SA may be fixed in an RBG. For example, the position in an RBG may be configured through the high layer signaling (e.g., RRC/MAC signaling), system information (e.g., SIB, MIB, etc.), broadcasting channel (e.g., PSBCH, etc.), PDCCH/EPDCCH, or the like.

In this case, the SA resource allocation in the D2D grant may be indicated in a unit of 2 RBGs, for example. Since the SA position is pre-designated in 2 RBGs, a D2D transmission UE may know the SA position in the corresponding 2 RBGs indicated in the D2D grant.

F) In addition, the bandwidth of the SA and/or Data resource indication units (or transmission unit) that an eNB may allocate may be limited.

In this case, a single value may be configured for the SA. For example, in the case that 2 PRBs are configured, the SA RB index may be set to a multiple of 2.

And, the Data may be indicated as one of the candidate set. For example, in the case that the RBG sizes of 1, 2, 4 and 8 RBs is defined as the candidate set, one of the RBG sizes may be set for the Data.

Here, an implicit mapping is available between the SA resource indication unit (or transmission unit) and the Data resource indication unit (or transmission unit). Or, according to the uplink bandwidth or the bandwidth (SA bandwidth and/or Data bandwidth) allocated for the D2D, the SA resource indication unit (or transmission unit) and/or the Data resource indication unit (or transmission unit) may be determined with being implicitly mapped.

Resource Allocation (RA) for D2D SA and Data

The resource allocation (RA) field for the SA and/or Data of the D2D grant may be classified into two types. That Referring to Table 14, the RA parts 1 and 2 in the case of embodiment 2 and the RA part 1 in the case of embodiment 3 may include only one of the time-frequency resource allocation information between the SA and the Data. In this case, as described above, the resource allocation information which is not included in the D2D grant may be derived from the resource allocation information included in the D2D grant based on the SA and/or the Data transmission units.

The SA Time and Frequency Resource Indication Using PUSCH Hopping Formula

When a potential SA transmission resource is defined as 'TxOP', the TxOP may be determined with a predetermined period and a period pattern. That is, the TxOP means a time-domain resource of the SA which is repeatedly transmitted in the SA resource pool.

For example, when it is assumed the case that a single SA cycle includes TxOP subframe of 4 times, the TxOP may be determined as 4 subframes in the subframe index of a multiple of 4 from a specific subframe. That is, subframes 0, 4, 8 and 12 may be determined as the SA TxOP subframe.

However, the SA TxOP subframe may be determined as an asymmetric pattern. The SA may or may not be transmitted in the TxOP subframe.

However, such a signaling may not be performed owing to the problem of signaling overhead. In this case, a reception UE should decode the SA by performing a blind search for all TxOP subframes that are known. That is, the reception UE should perform blind decoding in the situation of not accurately knowing from which TxOP the SA is transmitted.

In this situation, it is required that a position of frequency domain should be determined.

In the case of mode 1, an eNB indicates the frequency-domain resource allocation information of the SA through the D2D grant.

In this case, the eNB may directly indicate the frequency-domain resource allocation information of the SA in the D2D grant, but may indicate the Data the frequency-domain resource allocation information only, and a UE may derive the frequency-domain resource allocation information of the SA from the Data the frequency-domain resource allocation information.

In the case of mode 2, a UE itself selects and transmits the SA frequency resource according to the predetermined rule.

As described above, since the D2D grant should indicate the SA resource in mode 1, the SA RA information may be included in the D2D grant DCI format. However, since the SA may be transmitted several times in the SA cycle, the subframe index in addition to the position of the frequency domain (RB index) should be notified. Accordingly, for notifying the time and frequency domain for the SA transmission in the D2D grant as such, a method is required for inducing other transmission position based on the first transmission in the cycle.

As an exemplary method for supporting it, the LTE/LTE-A PUSCH hopping formula (PUSCH frequency hopping type 1 or 2) may be utilized. The existing PUSCH hopping formula is defined for every subframe, but the rule is applied to the TxOP subframe configured by an eNB only.

That is, between the resource for $n^{th}$ transmission of the SA and the resource for $(n+1)^{st}$ transmission of the SA, the frequency and/or time hopping may be applied. For example, the frequency and/or time hopping may be applied between the resource for the first transmission of the SA and the resource for the second transmission of the SA.

As another example, the case that an SA cycle includes the TxOP subframe of four times is assumed, and in the case that the $0^{th}$, $4^{th}$, $8^{th}$ and $12^{th}$ subframes are TxOP subframes, the PUSCH hopping rule applied to the existing $0^{th}$, $1^{st}$, $2^{nd}$ and $3^{rd}$ subframes is applied to the $0^{th}$, $4^{th}$, $8^{th}$ and $12^{th}$ subframes.

An advantage of the method is that the PUSCH hopping method may be applied by using the subframe index or the subframe index (e.g., SA resource pool subframe) defined for the D2D and/or a specific identifier (ID of a D2D TX UE and/or D2D RX UE) as a parameter when the PUSCH hopping formula is shared. In addition, the method has an advantage that each SA hopping pattern (time-frequency) has orthogonal characteristics. Of course, an eNB may intentionally configure it to be duplicated.

Or, according to the attribute of a TX UE or an RX UE (e.g. tracking area (TA), a cell size, a Tx power, a service type, etc.), the frequency hopping bandwidth may be separately configured (i.e., limitedly used).

For example, a restriction may be imposed such that a UE having attribute 1 may perform hopping only in the lower half band and a UE having attribute 2 may perform hopping only in the upper half band.

Meanwhile, in the case that an Rx UE knows such an attribute, the Rx UE may perform hopping only in the restricted bandwidth, and accordingly, there is an advantage in the Rx processing and power saving. A Tx UE may receive a part of the whole parameters in relation to the attribute through the high layer signaling (e.g., RRC signaling or SIB, etc.), and this may be applied for determining the time-frequency transmission resource. This is because a transmission resource is changed depending on the attribute.

In addition, the attribute of the TX UE and the RX UE may be linked to the parameter such as PUSCH hopping, mirroring, re-indexing, and the like. For example, the hopping and the mirroring may be configured with being classified according to an attribute of a UE, a service attribute, a timing advance, a power level, and so on. This makes a reception of a UE be simpler.

In addition, the number of retransmission and/or repeated transmission of the SA may be linked to the parameter of the PUSCH hopping formula. That is, depending on the number of retransmission and/or repeated transmission of the SA, the hopping method may be determined. For example, in the case that the retransmission numbers are 2 and 4, a part of the parameters of the PUSCH hopping formula may be differently configured.

Otherwise, depending on the number of retransmission and/or repeated transmission of the SA, the bandwidth itself may be divided with being orthogonal with each other. Or, depending on the number of retransmission and/or repeated transmission of the SA, a bandwidth may be divided on the TxOP subframe of the time domain.

Or, for example, in the case that the number of retransmission and/or repeated transmission of the SA is 2, the starting position may be in other TxOP subframe (e.g., the second/the third TxOP subframe), not the first TxOP in the cycle. This has an object to equally allocate the SA resource to each TxOP subframe as possible.

The transmission resource pattern determined in a cycle may be changed, not fixed. That is, the transmission resource pattern may be changed to other pattern which is predetermined in the following cycle. This may be regarded that hopping is performed between patterns. In other words, since the SA may be repeatedly transmitted in a cycle, consequently, different hoping schemes may be determined for different SAs.

For example, in the case that an index for the whole transmission resource pattern is defined, the hopping between such transmission resource patterns is applied. The pattern may be changed according to a cycle index or may be changed with being linked to a subframe index.

The rule applied to the SA may be used for determining the transmission resource pattern of the Data as it is. That is, a transmission pattern of the SA may be obtained by using an initial transmission value of the SA. After decoding the SA, the initial transmission position of the Data may be obtained. And a time and frequency position of the pattern for other retransmission and/or repeated transmission may be known using the PUSCH hopping formula.

The PUSCH hopping formula may be limited in a position of the frequency domain of the SA, and the time domain pattern may be determined by a separate signal (RPT). The time domain pattern (RPT) may be used for notifying a cycle interval, the TxOP in a cycle and an actual transmission subframe. In this case, the proposed method using the PUSCH hopping formula may be limited to the use of notifying the frequency domain.

In order to determine the SA TxOP subframe and the RB position mentioned above, the LTE PUSCH hopping formula may be used.

The proposed method above may be applied to the D2D data transmission as it is.

Meanwhile, in the case of a repeated transmission of the SA or the Data, the repeated resource region is regarded that an index (new indexing), and the rule may be applied.

Or, regardless of repetition of the SA or the Data, it is available to apply the method as it is based on the subframe index.

Apparatus to which the Present Invention may be Applied

FIG. 62 is a block diagram illustrating a configuration of a wireless communication device according to an embodiment of the present invention.

Referring to FIG. 62, the wireless communication system includes an eNB 6210 and a plurality of UEs 6220 located within an eNB 6210 area.

The eNB 6210 includes a processor 6211, a memory 6212, and a radio frequency unit (RF unit) 6213. The processor 6211 implements a function, a process and/or a method suggested in FIGS. 1 to 61. Layers of a wireless interface protocol may be implemented by the processor 6211. The memory 6212 is connected to the processor 6211 to store various information for driving the processor 6211. The RF unit 6213 is connected to the processor 6211 to transmit and/or receive a wireless signal.

The UE 6220 includes a processor 6221, a memory 6222, and an RF unit 6223. The processor 6221 implements a function, a process and/or a method suggested in FIGS. 1 to 61. Layers of a wireless interface protocol may be implemented by the processor 6221. The memory 6222 is connected to the processor 6221 to store various information for driving the processor 6221. The RF unit 6223 is connected to the processor 6221 to transmit and/or receive a wireless signal.

The memories 6212 and 6222 may exist at the inside or the outside of the processors 6211 and 6221 and may be connected with the processors 6211 and 6221 with well-known various means. Further, the eNB 6210 and/or the UE 6220 may have a single antenna or a multiple antenna.

In the aforementioned embodiments, the elements and characteristics of the present invention have been combined in specific forms. Each of the elements or characteristics may be considered to be optional unless otherwise described explicitly. Each of the elements or characteristics may be implemented in such a way as not to be combined with other elements or characteristics. Furthermore, some of the elements and/or the characteristics may be combined to form an embodiment of the present invention. Order of operations described in connection with the embodiments of the present invention may be changed. Some of the elements or characteristics of an embodiment may be included in another embodiment or may be replaced with corresponding elements or characteristics of another embodiment. It is evident that in the claims, one or more embodiments may be constructed by combining claims not having an explicit citation relation or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and or microprocessors or all of them.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for performing or supporting the D2D communication in a wireless communication system of the present invention has been described mainly with the example applied to 3GPP LTE/LTE-A system, but may also be applied to various wireless communication systems except the 3GPP LTE/LTE-A system.

The invention claimed is:

1. A method for performing a Device-to-Device (D2D) communication in a wireless communication system, the method performed by a first user equipment (UE) and comprising:
   receiving downlink (DL) control information from a base station (BS), the DL control information including resource allocation information for a D2D transmission;
   transmitting D2D control information on a Physical Sidelink Control Channel (PSCCH) to a second UE based on the resource allocation information; and
   transmitting D2D data on a Physical Sidelink Shared Channel (PSSCH) to the second UE based on the resource allocation information,
   wherein frequency hopping is performed between a PSCCH resource for a first transmission of the D2D control information and a PSCCH resource for a second transmission of the D2D control information,
   wherein the resource allocation information includes resource allocation information of only the PSCCH, and
   wherein a PSSCH resource for the transmission of the D2D data is derived from the resource allocation information of the only the PSCCH based on a transmission unit of the D2D control information and a transmission unit of the D2D data.

2. The method of claim 1, wherein performing the frequency hopping applies a Physical Uplink Shared Channel (PUSCH) hopping scheme using one or more parameters of a subframe index in which the D2D control information is transmitted, an identifier (ID) of the first UE and an ID of the second UE.

3. The method of claim 1, wherein a bandwidth of the frequency hopping is configured according to an attribute of the first UE or the second UE.

4. The method of claim 1, wherein a frequency hopping scheme is configured according to a number of repeated transmissions of the D2D control information.

5. The method of claim 1, wherein different hopping schemes are determined for each of different transmissions of the D2D control information.

6. The method of claim 1, further comprising receiving the transmission unit of the D2D control information and the transmission unit of the D2D data from the BS.

7. The method of claim 1, wherein a multiple relationship between a resource block (RB) index of the PSSCH and an RB index of the PSSCH is determined according to a multiple relationship between the transmission unit of the D2D control information and the transmission unit of the D2D data.

8. The method of claim 1, wherein:
   a resource gap is configured at least between transmission units of the D2D control information or between transmission units of the D2D data, and
   the PSSCH resource is derived using the configured resource gap.

9. The method of claim 1, wherein at least the transmission unit of the D2D control information or the transmission unit of the D2D data is configured as a multiple of a resource block group.

10. The method of claim 1, wherein at least the transmission unit of the D2D control information or the transmission unit of the D2D data is configured as a resource block group size predetermined according to a bandwidth allocated for the D2D communication.

11. The method of claim 1, wherein:
the transmission unit of the D2D data is configured as a resource block group; and
the transmission unit of the D2D control information is configured as a predetermined position in the resource block group.

12. The method of claim 1, wherein:
the DL control information further includes a first resource allocation field and a second resource allocation field;
the first resource allocation field includes the resource allocation information of the only the PSCCH for the first transmission of the D2D control information; and
the second resource allocation field includes the resource allocation information of the only the PSCCH for transmissions other than the first transmission of the D2D control information.

13. The method of claim 1, wherein:
the DL control information further includes a first resource allocation field and a second resource allocation field;
the first resource allocation field includes the resource allocation information of the only the PSCCH for all types of transmissions of the D2D control information; and
the second resource allocation field includes the transmission unit of the D2D control information.

14. A first user equipment (UE) for performing a Device-to-Device (D2D) communication in a wireless communication system, the first UE comprising:
a radio frequency (RF) unit configured to transmit and receive wireless signals; and
a processor configured to:
control the RF unit to receive downlink (DL) control information from a base station (BS), the DL control information including resource allocation information for a D2D transmission;
control the RF unit to transmit D2D control information on a Physical Sidelink Control Channel (PSCCH) to a second UE based on the resource allocation information; and
control the RF unit to transmit D2D data on a Physical Sidelink Shared Channel (PSSCH) to the second UE based on the resource allocation information,
wherein frequency hopping is performed between a PSCCH resource for a first transmission of the D2D control information and a PSCCH resource for a second transmission of the D2D control information,
wherein the resource allocation information includes resource allocation information of only the PSCCH, and
wherein a PSSCH resource for the transmission of the D2D data is derived from the resource allocation information of the only the PSCCH based on a transmission unit of the D2D control information and a transmission unit of the D2D data.

15. The first UE of claim 14, wherein the performing the frequency hopping applies a Physical Uplink Shared Channel (PUSCH) hopping scheme using one or more parameters of a subframe index in which the D2D control information is transmitted, an identifier (ID) of the first UE and an ID of the second UE.

16. The first UE of claim 14, wherein a bandwidth of the frequency hopping is configured according to an attribute of the first UE or the second UE.

17. The first UE of claim 14, wherein a frequency hopping scheme is configured according to a number of repeated transmissions of the D2D control information.

18. The first UE of claim 14, wherein different hopping schemes are determined for each of different transmissions of the D2D control information.

19. The first UE of claim 14, wherein the processor is further configured to control the RF unit to receive the transmission unit of the D2D control information and the transmission unit of the D2D data from the BS.

20. The first UE of claim 14, wherein a multiple relationship between a resource block (RB) index of the PSSCH and an RB index of the PSSCH is determined according to a multiple relationship between the transmission unit of the D2D control information and the transmission unit of the D2D data.

* * * * *